US012558869B2

(12) United States Patent
Clemens et al.

(10) Patent No.: US 12,558,869 B2
(45) Date of Patent: Feb. 24, 2026

(54) METHOD AND DEVICE FOR PRODUCING A PLASTICS COMPONENT, AND A PLASTICS COMPONENT

(71) Applicants: LEONHARD KURZ Stiftung & Co. KG, Fürth (DE); PolyIC GmbH & Co. KG, Fürth (DE)

(72) Inventors: Wolfgang Clemens, Puschendorf (DE); Martin Hahn, Herrieden (DE); Andreas Ullmann, Zirndorf (DE); Matthias Heinrich, Nuremberg (DE)

(73) Assignees: LEONHARD KURZ Stiftung & Co. KG, Fürth (DE); PolyIC GmbH & Co. KG, Fürth (DE)

( * ) Notice: Subject to any disclaimer, the term of this patent is extended or adjusted under 35 U.S.C. 154(b) by 674 days.

(21) Appl. No.: 17/767,295

(22) PCT Filed: Oct. 7, 2020

(86) PCT No.: PCT/EP2020/078040
§ 371 (c)(1),
(2) Date: Apr. 7, 2022

(87) PCT Pub. No.: WO2021/069466
PCT Pub. Date: Apr. 15, 2021

(65) Prior Publication Data
US 2023/0024618 A1      Jan. 26, 2023

(30) Foreign Application Priority Data
Oct. 9, 2019    (DE) ......................... 102019127108.8

(51) Int. Cl.
*B32B 1/00*        (2024.01)
*B29C 43/14*       (2006.01)
(Continued)

(52) U.S. Cl.
CPC ............ *B32B 7/022* (2019.01); *B29C 43/146* (2013.01); *B29C 45/14* (2013.01);
(Continued)

(58) Field of Classification Search
None
See application file for complete search history.

(56) References Cited

U.S. PATENT DOCUMENTS

2002/0021086 A1      2/2002   Czak
2007/0069418 A1*     3/2007   Liao ......................... B32B 9/00
                                                                264/238
(Continued)

FOREIGN PATENT DOCUMENTS

CN        101963864 A  *  2/2011
CN        103558934 A  *  2/2014
(Continued)

OTHER PUBLICATIONS

Mechanical translation of JP-2015170536-A dated Sep. 2015. (Year: 2015).*
(Continued)

*Primary Examiner* — Jeffrey A Vonch
(74) *Attorney, Agent, or Firm* — Hoffmann & Baron, LLP

(57)                ABSTRACT

A method for producing at least one plastic component (1), wherein in the method the following steps, preferably in the following sequence, preferably cyclically in the following sequence, are carried out: a) providing at least one film (2) and at least one sensor film (3), wherein the at least one film (2) and/or the at least one sensor film (3) has at least one thermoplastic material or at least one thermoplastic polymer; b) applying the at least one sensor film (3) to at least one first region of a surface of the at least one film (2); c) forming the at least one film (2) having the at least one sensor film (3), wherein one or more formed film bodies (4) are made; d)
(Continued)

punching out one or more film elements (4a) made from at least one second region of the one or more formed film bodies (4), and a device (10) and a plastic component (1).

9 Claims, 4 Drawing Sheets

(51) Int. Cl.

| | |
|---|---|
| B29C 45/14 | (2006.01) |
| B29C 51/14 | (2006.01) |
| B29C 65/50 | (2006.01) |
| B29C 69/00 | (2006.01) |
| B32B 3/28 | (2006.01) |
| B32B 7/02 | (2019.01) |
| B32B 7/022 | (2019.01) |
| B32B 7/025 | (2019.01) |
| B32B 27/08 | (2006.01) |
| B32B 27/36 | (2006.01) |
| G06F 3/041 | (2006.01) |
| B29C 51/12 | (2006.01) |
| B29K 67/00 | (2006.01) |
| B29K 69/00 | (2006.01) |
| B29K 667/00 | (2006.01) |
| B29K 669/00 | (2006.01) |
| B29L 9/00 | (2006.01) |
| B29L 31/00 | (2006.01) |
| B29L 31/34 | (2006.01) |
| B32B 3/04 | (2006.01) |
| B32B 38/18 | (2006.01) |

(52) U.S. Cl.
CPC .... *B29C 45/1418* (2013.01); *B29C 45/14221* (2013.01); *B29C 45/14311* (2013.01); *B29C 45/14688* (2013.01); *B29C 51/14* (2013.01); *B29C 65/50* (2013.01); *B29C 69/001* (2013.01); *B32B 1/00* (2013.01); *B32B 3/28* (2013.01); *B32B 7/02* (2013.01); *B32B 7/025* (2019.01); *B32B 27/08* (2013.01); *B32B 27/36* (2013.01); *B32B 27/365* (2013.01); *G06F 3/041* (2013.01); *G06F 3/0412* (2013.01); *B29C 2045/14237* (2013.01); *B29C 2045/14245* (2013.01); *B29C 45/14639* (2013.01); *B29C 45/14811* (2013.01); *B29C 51/12* (2013.01); *B29C 2793/0018* (2013.01); *B29K 2067/003* (2013.01); *B29K 2069/00* (2013.01); *B29K 2667/003* (2013.01); *B29K 2669/00* (2013.01); *B29K 2995/0005* (2013.01); *B29K 2995/0077* (2013.01); *B29K 2995/0097* (2013.01); *B29L 2009/005* (2013.01); *B29L 2009/008* (2013.01); *B29L 2031/001* (2013.01); *B29L 2031/3475* (2013.01); *B32B 3/04* (2013.01); *B32B 38/1866* (2013.01); *B32B 2307/202* (2013.01); *B32B 2307/54* (2013.01); *B32B 2307/737* (2023.05); *B32B 2307/738* (2013.01); *B32B 2367/00* (2013.01); *B32B 2369/00* (2013.01); *B32B 2457/20* (2013.01); *B32B 2457/208* (2013.01); *G06F 2203/04103* (2013.01); *G06F 2203/04104* (2013.01)

(56) References Cited

U.S. PATENT DOCUMENTS

| | | | | |
|---|---|---|---|---|
| 2010/0090981 | A1* | 4/2010 | Park | G06F 3/041 |
| | | | | 345/173 |
| 2010/0196651 | A1* | 8/2010 | Liao | B29C 45/14778 |
| | | | | 428/524 |
| 2010/0284132 | A1* | 11/2010 | Yi | B29C 45/14688 |
| | | | | 361/679.01 |
| 2012/0032916 | A1* | 2/2012 | Enoki | H03K 17/962 |
| | | | | 29/829 |
| 2012/0038082 | A1 | 2/2012 | Burger et al. | |
| 2012/0111491 | A1* | 5/2012 | Huang | H05K 3/0014 |
| | | | | 156/247 |
| 2012/0237723 | A1* | 9/2012 | Wada | B29C 45/14811 |
| | | | | 428/209 |
| 2013/0062180 | A1* | 3/2013 | Uenomachi | G06F 3/0446 |
| | | | | 200/600 |
| 2013/0135831 | A1* | 5/2013 | Hsu | B29C 45/14467 |
| | | | | 977/932 |
| 2013/0208431 | A1* | 8/2013 | Shinoda | G06F 3/041 |
| | | | | 361/736 |
| 2013/0241855 | A1* | 9/2013 | Kim | G06F 3/041 |
| | | | | 345/173 |
| 2013/0335347 | A1* | 12/2013 | Wu | G06F 3/041 |
| | | | | 345/173 |
| 2013/0335375 | A1* | 12/2013 | Nishikawa | G06F 3/0443 |
| | | | | 264/105 |
| 2014/0036428 | A1* | 2/2014 | Leong | H05K 3/10 |
| | | | | 361/679.01 |
| 2014/0043772 | A1* | 2/2014 | Isoda | H05K 13/04 |
| | | | | 361/728 |
| 2014/0055958 | A1* | 2/2014 | Hsu | B29C 45/14811 |
| | | | | 361/728 |
| 2014/0307181 | A1* | 10/2014 | Tang | G06F 3/0445 |
| | | | | 349/12 |
| 2014/0307182 | A1* | 10/2014 | Kawano | G06F 3/0443 |
| | | | | 349/12 |
| 2014/0367644 | A1* | 12/2014 | Song | H10K 59/8722 |
| | | | | 438/26 |
| 2015/0070309 | A1* | 3/2015 | Kang | G06F 3/0443 |
| | | | | 345/174 |
| 2015/0070604 | A1* | 3/2015 | Chen | G06F 3/0446 |
| | | | | 349/12 |
| 2015/0107881 | A1* | 4/2015 | Mori | B32B 17/10174 |
| | | | | 156/247 |
| 2015/0138041 | A1* | 5/2015 | Hirakata | G09G 5/14 |
| 2015/0145755 | A1* | 5/2015 | Yamazaki | G06F 1/1652 |
| | | | | 361/679.01 |
| 2015/0153862 | A1* | 6/2015 | Nakamura | G06F 3/041 |
| | | | | 345/173 |
| 2015/0160760 | A1* | 6/2015 | Sato | G06F 1/1626 |
| | | | | 345/174 |
| 2015/0185888 | A1* | 7/2015 | Sakashita | G06F 3/041 |
| | | | | 345/174 |
| 2015/0185889 | A1* | 7/2015 | Nakamura | G06F 3/041 |
| | | | | 345/173 |
| 2015/0293558 | A1* | 10/2015 | Hahn | B29C 45/14 |
| | | | | 345/174 |
| 2016/0009056 | A1* | 1/2016 | Watanabe | B32B 27/365 |
| | | | | 264/129 |
| 2016/0034078 | A1* | 2/2016 | Ryu | G06F 1/1652 |
| | | | | 345/174 |
| 2016/0124534 | A1* | 5/2016 | Ahn | B32B 17/06 |
| | | | | 345/173 |
| 2016/0162077 | A1* | 6/2016 | Kiyoshi | C09D 5/24 |
| | | | | 345/174 |
| 2016/0192474 | A1* | 6/2016 | Niskala | B29C 51/14 |
| | | | | 361/679.55 |
| 2016/0239121 | A1* | 8/2016 | Murakami | G06F 3/0443 |
| 2016/0306451 | A1* | 10/2016 | Isoda | B32B 27/36 |
| 2016/0334896 | A1* | 11/2016 | Koike | B32B 27/306 |
| 2017/0066168 | A1 | 3/2017 | Ludwig et al. | |
| 2017/0136727 | A1* | 5/2017 | Miyamoto | B32B 7/12 |
| 2017/0139516 | A1* | 5/2017 | Koike | B32B 27/281 |
| 2017/0192574 | A1* | 7/2017 | Koike | G06F 3/047 |
| 2017/0205957 | A1* | 7/2017 | Park | G06F 3/0443 |
| 2017/0226303 | A1* | 8/2017 | Feng | B29C 51/10 |
| 2017/0249037 | A1* | 8/2017 | Sato | B60K 35/10 |
| 2017/0315636 | A1* | 11/2017 | Stone | G06F 3/0446 |
| 2017/0320292 | A1* | 11/2017 | Isoda | B32B 27/08 |
| 2017/0357113 | A1* | 12/2017 | Yamazaki | G09G 3/3233 |
| 2017/0371452 | A1* | 12/2017 | Endo | H01Q 1/526 |

(56) References Cited

U.S. PATENT DOCUMENTS

| | | | | |
|---|---|---|---|---|
| 2018/0004254 A1* | 1/2018 | Park | G06F 1/1652 |
| 2018/0039127 A1* | 2/2018 | Eom | G06F 3/0412 |
| 2018/0050948 A1* | 2/2018 | Faik | C03B 23/023 |
| 2018/0057943 A1* | 3/2018 | Tsukamoto | H05K 3/181 |
| 2018/0067573 A1* | 3/2018 | Miyamoto | H05K 3/0014 |
| 2018/0200928 A1* | 7/2018 | Wu | B32B 27/08 |
| 2018/0206341 A1* | 7/2018 | Benwadih | H05K 3/10 |
| 2018/0217702 A1* | 8/2018 | Hashida | G06F 3/0445 |
| 2018/0228032 A1* | 8/2018 | Yamazaki | B32B 7/12 |
| 2018/0250912 A1* | 9/2018 | Chen | G06F 1/1637 |
| 2018/0275797 A1* | 9/2018 | Mitsuhashi | G06F 3/0445 |
| 2018/0279471 A1* | 9/2018 | Chen | B32B 27/08 |
| 2018/0329623 A1* | 11/2018 | Usami | B60K 35/26 |
| 2018/0335871 A1* | 11/2018 | Glad | G06F 3/0446 |
| 2018/0348900 A1 | 12/2018 | Heinrich et al. | |
| 2018/0370096 A1 | 12/2018 | Fuchs et al. | |
| 2019/0064961 A1* | 2/2019 | Isoda | B32B 27/32 |
| 2019/0113994 A1* | 4/2019 | Huang | G06F 3/041 |
| 2019/0152196 A1* | 5/2019 | Xu | B32B 27/302 |
| 2019/0184694 A1* | 6/2019 | Yashiro | B29C 51/428 |
| 2019/0235658 A1* | 8/2019 | Tsai | G06F 3/0443 |
| 2019/0270293 A1 | 9/2019 | Varjos et al. | |
| 2019/0302918 A1* | 10/2019 | Kay | G06F 3/044 |
| 2019/0317618 A1* | 10/2019 | Lin | B32B 37/06 |
| 2019/0332225 A1* | 10/2019 | Nakahira | H01B 5/14 |
| 2020/0101646 A1* | 4/2020 | Yamazaki | G06F 1/1637 |
| 2020/0159347 A1* | 5/2020 | Sato | H03K 17/962 |
| 2020/0391491 A1* | 12/2020 | Turner | B29C 55/143 |
| 2021/0089170 A1* | 3/2021 | Datta | G06F 3/0448 |
| 2021/0368627 A1* | 11/2021 | Smits | H05K 1/0393 |
| 2021/0405816 A1* | 12/2021 | Niu | G06F 1/1652 |

FOREIGN PATENT DOCUMENTS

| | | | | |
|---|---|---|---|---|
| CN | 103677404 A | * | 3/2014 | |
| CN | 203600516 U | * | 5/2014 | |
| CN | 103870080 A | * | 6/2014 | |
| CN | 104346017 A | * | 2/2015 | B32B 38/1866 |
| CN | 105094399 A | * | 11/2015 | |
| CN | 105345989 A | * | 2/2016 | B29C 45/14 |
| CN | 105426005 A | * | 3/2016 | |
| CN | 105955549 A | * | 9/2016 | G06F 3/041 |
| CN | 106113481 A | * | 11/2016 | B29C 63/00 |
| CN | 106201080 A | * | 12/2016 | G06F 3/0416 |
| CN | 106201097 A | * | 12/2016 | G06F 3/044 |
| CN | 106527781 A | * | 3/2017 | |
| CN | 107025007 A | * | 8/2017 | G06F 3/0412 |
| CN | 206388158 U | * | 8/2017 | |
| CN | 206479961 U | * | 9/2017 | |
| CN | 109614011 A | * | 4/2019 | G06F 3/0412 |
| CN | 209447138 U | * | 9/2019 | |
| DE | 102009011543 A1 | | 9/2010 | |
| DE | 102009013065 A1 | | 9/2010 | |
| DE | 102013007378 A1 | | 3/2014 | |
| DE | 102012109820 A1 | | 4/2014 | |
| DE | 102014106585 A1 | | 11/2015 | |
| DE | 10 2014 113 227 A1 | | 3/2016 | |
| DE | 102015109597 A1 | | 1/2017 | |
| DE | 102015121195 A1 | | 6/2017 | |
| DE | 10 2016 225 928 A1 | | 6/2018 | |
| DE | 102018009185 A1 | | 4/2019 | |
| EP | 3124197 A1 | | 2/2017 | |

| | | | | |
|---|---|---|---|---|
| JP | 2000207983 A | * | 7/2000 | |
| JP | 2004133765 A | * | 4/2004 | |
| JP | 2005284605 A | * | 10/2005 | |
| JP | 2007111877 A | * | 5/2007 | |
| JP | 2008168613 A | * | 7/2008 | |
| JP | 2008302600 A | * | 12/2008 | G06F 3/041 |
| JP | 2010267607 A | * | 11/2010 | G06F 3/0443 |
| JP | 2013246741 A | * | 12/2013 | |
| JP | 2014112273 A | * | 6/2014 | |
| JP | 2014119984 A | * | 6/2014 | |
| JP | 2014170334 A | * | 9/2014 | |
| JP | 2014241128 A | * | 12/2014 | |
| JP | 2015158840 A | * | 9/2015 | |
| JP | 2015170536 A | * | 9/2015 | |
| JP | 2016132679 A | * | 7/2016 | |
| JP | 2016192005 A | * | 11/2016 | |
| JP | 2017056624 A | * | 3/2017 | |
| JP | 2017062609 A | * | 3/2017 | C08J 5/18 |
| JP | 2020035088 A | * | 3/2020 | G06F 3/041 |
| KR | 20150019204 A | * | 2/2015 | G06F 3/041 |
| KR | 20160140226 A | * | 12/2016 | B32B 27/36 |
| KR | 1020190007072 | | 10/2019 | |
| TW | 201313602 A | * | 4/2013 | H01B 1/02 |
| WO | 9849871 A1 | | 11/1998 | |
| WO | WO-2009139082 A1 | * | 11/2009 | B29C 45/14811 |
| WO | WO-2011076717 A1 | * | 6/2011 | B29C 51/10 |
| WO | WO-2014109372 A1 | * | 7/2014 | B32B 7/022 |
| WO | WO-2014109373 A1 | * | 7/2014 | B32B 27/365 |
| WO | WO-2014185330 A1 | * | 11/2014 | B32B 7/023 |
| WO | WO-2015008735 A1 | * | 1/2015 | B29C 48/0017 |
| WO | WO-2015125338 A1 | * | 8/2015 | G06F 3/04164 |
| WO | WO-2016075988 A1 | * | 5/2016 | B29C 53/04 |
| WO | WO-2017051725 A1 | * | 3/2017 | H01B 5/14 |
| WO | WO-2018012535 A1 | * | 1/2018 | H05K 3/281 |
| WO | WO-2018034291 A1 | * | 2/2018 | G06F 3/0446 |
| WO | WO-2020196010 A1 | * | 10/2020 | G06F 3/041 |

OTHER PUBLICATIONS

Machine Translation of JP-2007111877-A, May 2007 (Year: 2007).*
Machine Translation of JP-2015158840-A, Sep. 2015 (Year: 2015).*
Machine Translation of WO-2016075988-A1, May 2016 (Year: 2016).*
Machine Translation of CN-206388158-U, Aug. 2017 (Year: 2017).*
AZOMaterials, Properties of Polyethylene Terephthalate Polyester, Jun. 2003 (Year: 2003).*
A&C Plastics, Makrolon GP Product Details, Oct. 2010 (Year: 2010).*
Covestro, Makrofol® DE 1-1 000000, Mar. 2012 (Year: 2012).*
Machine Translation of JP2013246741A, Dec. 2013 (Year: 2013).*
Machine Translation of CN105345989A, Feb. 2016 (Year: 2016).*
Covestro, Makrofol® SR906 1-1 040009, Apr. 2016 (Year: 2016).*
Mitsubishi Chemical Group, Comparative data for plastic films, Jul. 2016 (Year: 2016).*
Machine Translation of JP2017062609A, Mar. 2017 (Year: 2017).*
Toyobo, Ester Film, Apr. 2019 (Year: 2019).*
Mitsubishi Chemical Company, MR Film Grade, Jun. 2021 (Year: 2021).*
Examination Report for German Patent Application, No. 102019127108.8 dated Oct. 9, 2019.
PCT International Examination Report dated Jan. 19, 2022.
Chinese Office Action dated May 18, 2024.

* cited by examiner

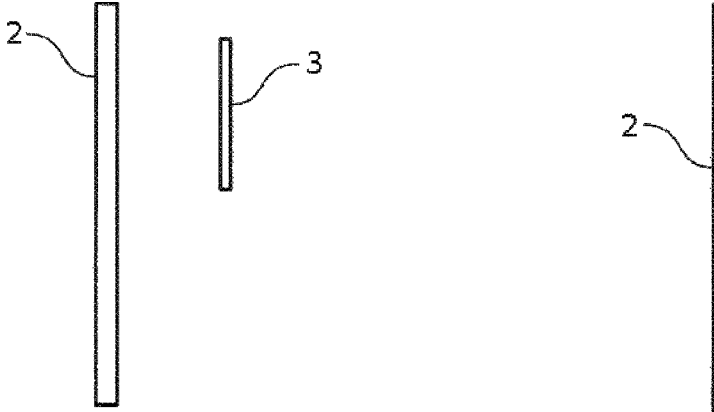
*Fig. 2*          *Fig. 3*
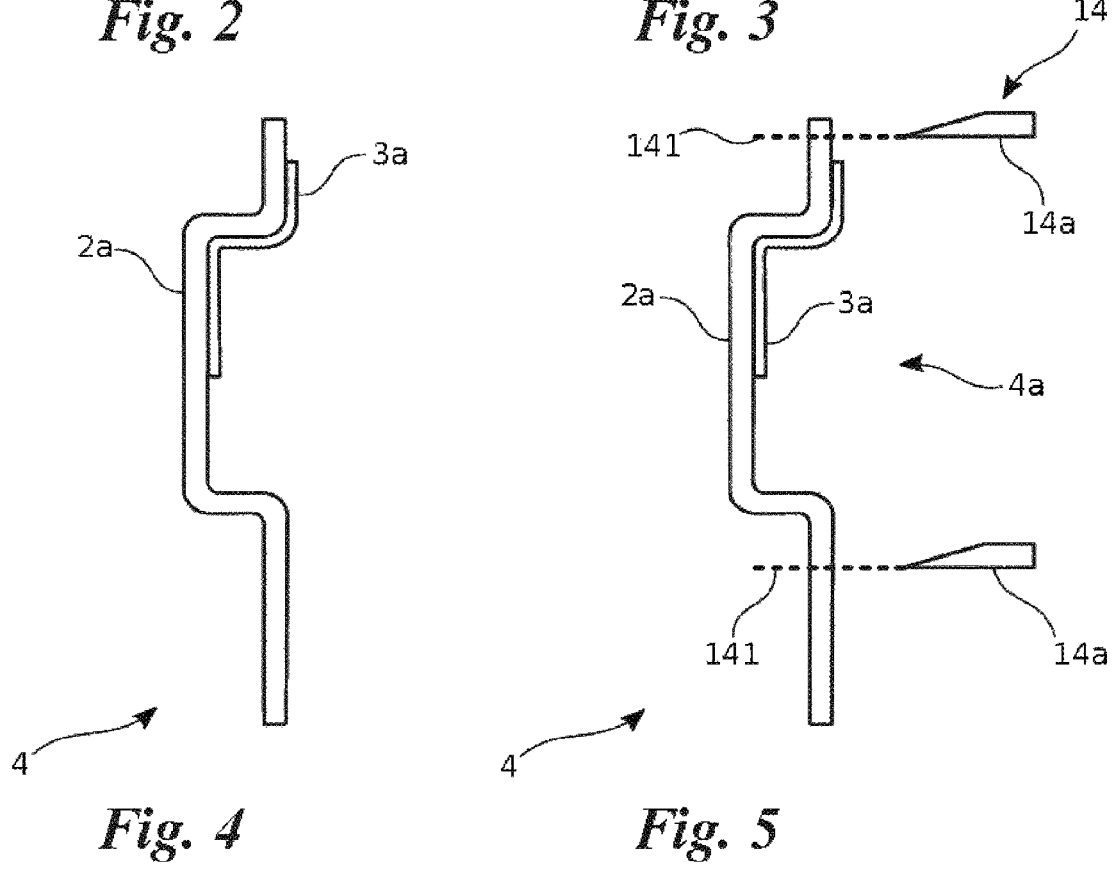
*Fig. 4*          *Fig. 5*

METHOD AND DEVICE FOR PRODUCING A PLASTICS COMPONENT, AND A PLASTICS COMPONENT

This application is a National Stage application based on an International Application filed under the Patent Cooperation Treaty, PCT/EP2020/078040, filed Oct. 7, 2020, which claims priority to DE 102019127108.8, filed Oct. 9, 2019.

BACKGROUND OF THE INVENTION

The invention relates to a method for producing a plastic component and a device for producing a plastic component, and a plastic component.

There is a demand on the part of industry for 3D formed touch-sensitive surfaces, wherein strong deformations (very deep/tall and/or small radii) are desired within these surfaces. However, until now it has not really been possible to deform a touch sensor, for example, in such a way. This is because the PET carriers (PET=polyethylene terephthalate) which contain conductive paths of a touch sensor of this kind, and/or the conductive paths of the touch sensor, are not flexible enough. It is known here to solve this technical problem by printing very thick and/or wide conductive paths onto a flexible substrate. However, there is the disadvantage here that light cannot be shone through the sensors resulting from this, for example, in an unrestricted manner, since an observer detects the thick and/or wide conductive paths.

In general, PET carriers are indeed highly desirable as production carriers, since, for example, they do not stretch very much under the influence of temperature and are thus very stable during processing, in particular during the application of layers to the PET carrier. Further, for example, very fine conductive paths and conductor tracks and other conductive structures can herewith be realized on a PET carrier with very small tolerances. Touch sensors produced in this way can correspondingly also be backlit very well, since the conductive paths can be made correspondingly thin and/or narrow.

PET carriers are suitable for a further processing in an injection-molding process, for example also in conjunction with a decorative film, but insufficiently so. Here, only small deformation depths and only very large radii of the resulting products can be achieved.

In EP 3 124 197 A1, a method for producing a plastic component is disclosed, in which a flexible film is plastically deformed together with an electronic circuit deployed thereon.

DE 10 2013 007 378 A1 discloses a method for producing an emblem for a motor vehicle. In this method, a coated film is formed and then back-injection molded with plastic.

SUMMARY OF THE INVENTION

The object of the present invention is thus to specify an improved method for producing a plastic component, an improved device for producing a plastic component, and an improved plastic component.

The object is achieved by a method for producing at least one plastic component, wherein in the method the following steps, preferably in the following sequence, preferably cyclically in the following sequence, are carried out:

a) providing at least one film and at least one sensor film, wherein the at least one film (2) and/or the at least one sensor film (3) have at least one thermoplastic material or at least one thermoplastic polymer, b) applying the at least one sensor film to at least one first region of a surface of the at least one film, c) forming the at least one film comprising the at least one sensor film, wherein one or more formed film bodies are made, d) punching out one or more film elements made from at least one second region of the one or more formed film bodies, wherein the at least one sensor film and/or the at least one film in step a) has polyethylene terephthalate (PET) as at least one thermoplastic material or as at least one thermoplastic polymer and the thickness of the at least one film in step a) and/or b) is greater than the thickness of the at least one sensor film in step a) and/or b).

The object is further achieved by a device for producing at least one plastic component, in particular for carrying out the above method, wherein the device has at least one feed station, which is designed in such a way that the at least one feed station provides at least one film and provides at least one sensor film, wherein the at least one film and/or the at least one sensor film has at least one thermoplastic material or at least one thermoplastic polymer, wherein the device has at least one applying station, which is designed in such a way that the at least one applying station applies the at least one sensor film to at least one first region of a surface of the at least one film, wherein the device has at least one forming station, which is designed in such a way that the at least one forming station forms the at least one film comprising the at least one sensor film to make at least one formed film body, wherein the device has at least one punching station, which is designed in such a way that the at least one punching station punches at least one film element out of at least one second region of the at least one formed film body, wherein the at least one sensor film and/or the at least one film has polyethylene terephthalate (PET) as at least one thermoplastic material or as at least one thermoplastic polymer and the at least one film has a thickness of from 250 μm to 3000 μm, in particular of from 300 μm to 2000 μm, wherein the at least one sensor film has a thickness of from 25 μm to 150 μm, in particular of from 25 μm to 125 μm.

The object is further achieved by a plastic component, in particular produced according to the above method, preferably produced by the above device, wherein the plastic component comprises a punched-out and back-injection-molded film element comprising at least one formed film and at least one formed sensor film, wherein the at least one formed film and/or the at least one formed sensor film has at least one thermoplastic material or at least one thermoplastic polymer, and wherein the radius of curvature of the plastic component is smaller than 1000 mm, in particular smaller than 200 mm, further preferably smaller than 100 mm, at least in regions, and/or wherein the stretching of the plastic component is greater than or equal to 1%, in particular greater than or equal to 20%, preferably greater than or equal to 50%, in particular preferably greater than or equal to 300%, wherein the at least one formed sensor film and/or the at least one formed film has polyethylene terephthalate (PET) as at least one thermoplastic material or as at least one thermoplastic polymer and the thickness of the at least one film is greater than the thickness of the at least one sensor film.

Such a method and such a device are characterized in that it is possible here, for example, to be able to deform, preferably three-dimensionally, a finely structured touch sensor, through which light can in particular be shone directly, during production better than before.

Tests have shown that deep drawing or forming a laminate comprising, for example, a PET film which comprises a sensor and, for example, a flexible PC film, wherein the flexible PC film preferably has a greater flexibility than the PET film, leads to improved results with respect to the, in particular three-dimensional, deformability of the laminate. It is hereby achieved that, for example, very large deformation depths and very small radii which cannot be achieved with conventional methods can be achieved in the deep-drawn laminate.

A PET film has a high tensile strength. However, the plastic deformability or formability of such a PET film alone is low, which causes the above-described disadvantages during forming. Due to the low plastic deformability, a PET film has a low flexibility during forming. The above-described advantages of a PET film, namely for example the high strength and the high temperature stability with very little stretching in the case of temperature fluctuations, thus cannot be utilized for three-dimensionally designed products which require a higher degree of forming during their production. The joining of a PET film to a further film which has a lower tensile strength but on the other hand a greater plastic formability or flexibility than PET surprisingly has the result that the composite of the two films can be formed substantially more easily and at the same time has almost the same desired mechanical properties after the forming process as a PET film alone. PC has proved to be particularly suitable as material for the further film, which is joined to the PET film in the thickness direction. PC has a much lower tensile strength and a much better plastic formability than PET. However, the film or further film which is joined to the sensor film made of PET is not limited to the material PC. In general, thermoplastic polymers which have a lower tensile strength and a greater plastic formability than PET come into consideration as materials for the film or further film. Suitable based on thermoplastic materials for the film are thus also, for example, also TPU, ABS, ABS-PC or PMMA. The flexible film and the sensor film with higher tensile strength are firmly joined to one another before the forming. For this, the sensor film and the film are arranged one on top of the other. A suitable method for joining the film and sensor film is hot stamping as a particularly firm join, which is also retained during the forming process, is thereby made possible. Of course, other joining methods are also suitable for joining the film to the sensor film, however.

Tests have further shown that a flexible PC film can act at the same time for example as bonding layer for an injection-molding material. It is hereby achieved that this forms a good adhesion to the material to be injection molded.

Tests have further surprisingly shown that the flexible PC film in a composite with a PET film acts as a deformation aid and greatly increases the deformability of the PET film. It is hereby achieved that, for example, the resulting touch sensor is much more deformable than previously known in spite of the presence of the PET film in a composite with the flexible PC film. In the case of such a composite of PET film with PC film, the plastic formability is greatly increased in comparison with a PET film alone. At the same time, the tensile strength and the temperature stability of such a composite is much better than in the case of a PC film alone.

In particular, it is possible to explain this behavior of the composite of the flexible PC film with the PET film by the fact that the "earlier" breaking point of the PET film is here shifted to a "later" breaking point.

By a curvature is meant in particular a local deviation of a curve from a straight line. By the curvature of a curve is preferably meant a change in direction for each traversed length and/or segment of a sufficiently short curved piece or curve progression. The curvature of a straight line is preferably equal to zero everywhere. A circle with a radius r in particular has the same curvature everywhere, namely 1/r. In the case of most curves, the curvature preferably changes from curve point to curve point, in particular the curvature changes continuously from curve point to curve point, with the result that the curves preferably have no kinks and/or points of discontinuity. The curvature of a curve at a point P thus specifies in particular how much the curve deviates from a straight line in the immediate vicinity of the point P. The magnitude of the curvature is referred to in particular as radius of curvature and this preferably corresponds to the reciprocal or the absolute value of the magnitude of a local radius vector. The radius of curvature is preferably the radius of the circle which represents the best approximation in a local vicinity of the boundary point and/or tangent point P of a curve.

By a stretching is meant in particular a ratio between a stretched length and an unstretched length. For example, preferably if the unstretched length of the component and/or of the film and/or of the sensor film is 40 m and the stretched length of the component and/or of the film and/or of the sensor film is 70 m, the stretching of a component and/or of a film and/or of a sensor film is 75%. The stretching generally results in particular from the quotient (stretched length–unstretched length)/(unstretched length) or, in the above example, from the quotient (stretched length–unstretched length)/(unstretched length)=(70 m–40 m)/40 m=75%.

Advantageous designs of the invention are described in the dependent claims.

Preferred embodiments of the method are mentioned below.

The at least one film and/or the at least one sensor film in step a) preferably has polycarbonate (PC) as at least one thermoplastic material or as at least one thermoplastic polymer.

According to the invention, the at least one sensor film and/or the at least one film in step a) has polyethylene terephthalate (PET) as at least one thermoplastic material or as at least one thermoplastic polymer.

It is possible for the at least one film in step a) to have a thickness of from 50 μm to 3000 μm, in particular of from 300 μm to 2000 μm. For example, the at least one film has in particular a thickness of 375 μm.

Further, it is possible for the at least one film in step a) to have a tensile strength of between 20 MPa and 100 MPa, in particular between 20 MPa and 80 MPa.

By "tensile strength" is preferably meant here one strength parameter from a possible number of strength parameters of a material, in particular the maximum mechanical tensile stress which the material bears. The tensile strength is preferably calculated from results of a tensile test, preferably in accordance with the ISO standard 527, in particular as the maximum tensile force reached relative to the original cross section of the standardized tensile specimen. Here, so-called ductile materials such as steel in particular stretch even further in tensile tests of this kind after the tensile strength has been exceeded, wherein however the cross section in particular decreases. In contrast, brittle materials, such as cast iron for example, in particular break when the tensile strength is exceeded. The tensile strength is preferably specified in the dimension "force per unit area", in particular wherein frequently used units of measurement are N/mm$^2$ or MPa (megapascals). In a stress-strain graph, it is possible that the tensile strength can be read directly, preferably as the Y-axis value at the highest point of the corresponding curve in the stress-strain graph.

The at least one film in step a) is preferably flexible at least in regions or over the whole surface.

In particular, the at least one film in step a) is provided as a film composite, which is flexible at least in regions or over the whole surface and/or which comprises one or more films, in particular comprises one or more films flexible at least in regions or over the whole surface.

By punching out is preferably meant here a trimming or a cropping or a clipping of the outer edges or outer dimensions of the film body, in particular by means of processes selected from the group mechanical cutting, laser machining, waterjet machining, milling, mechanical punching.

It is also possible for the film to have one or more decorative layers and/or one or more functional layers. For example, decorative and/or functional layers can be applied over the whole surface and/or partially to one or to both surfaces of the film using one or more processes selected individually or in combination from the group gravure printing, flexographic printing, screen printing, inkjet printing, pad printing, hot stamping, cold stamping, vapor deposition. Such decorative and/or functional layers can in particular be selected individually or in combination from the group protective layers, color varnish layers, metal layers, reflective layers, replication varnish layers, transparent layers, carrier layers and/or layers generating an optically variable effect.

The one or more decorative and/or functional layers preferably have, for example, a printed layer, in particular of an opaque and/or colored ink, which makes a frame around the functional region. The one or more decorative and/or functional layers can cover the sensor film and in particular the functional region over the whole surface or partially and/or be applied in a grid. The one or more decorative and/or functional layers can represent a uniform surface and/or an endless pattern and/or an individual image motif. The one or more decorative and/or functional layers can be opaque and/or semitransparent and/or transparent, in particular dyed transparent, over the whole surface or partially.

If, for example, one or more decorative layers are applied to both sides of the film, these layers can together make a complete decoration. In particular, the film can act as optical spacer for optical depth effects. For example, two overlapping one or more decorative layers can thus complement each other to make a complete design and/or generate moiré effects and/or one decorative layer acts as background for the respectively other decorative layer. In particular, the two decorative layers can be applied registered with one another.

Furthermore, it is possible for the at least one sensor film in step a) to have a thickness of from 25 μm to 500 μm, in particular of from 50 μm to 125 μm. In particular, the at least one sensor film comprises a carrier film, preferably having a thickness of from 50 μm to 75 μm, a layer packet, preferably comprising several layers, and a cover film, in particular comprising PET and/or having a layer thickness of from 12 μm to 20 μm.

The at least one sensor film in step a) preferably has a tensile strength of between 150 MPa and 500 MPa, in particular between 200 MPa and 500 MPa.

It is possible for the tensile strength of the at least one film in step a) and/or b) to be at most the tensile strength of the at least one sensor film in step a) and/or b) multiplied by a factor of 2/3.

The thickness of the at least one film in step a) and/or b) is preferably at least the thickness of the at least one sensor film in step a) and/or b) multiplied by a factor of 1/2. According to this definition the thickness of the film is at least half as large as the thickness of the sensor film. However, the thickness of the film can also be thicker, for example the same size as the thickness of the sensor film. It is particularly advantageous if the thickness of the flexible film is greater than the thickness of the sensor film. In this case, the sensor film is thinner than the film. Such an embodiment can be seen for example in the FIGS. 2, 3, 4 and 5 described in detail below. As previously described, the thickness of the film can, for example, be chosen in a range between 300 μm and 2000 μm, the thickness of the sensor film can favorably be chosen in a range between 50 μm and 125 μm. Thus, the film can, for example, be designed thicker than the sensor film by a factor of 2, 3, 4 or 5. Of course, a factor between the thicknesses of film and sensor film other than those mentioned above can also be chosen. A significant increase in the flexibility of the composite and the plastic formability of the composite can be achieved through a composite of a thicker film, for example made of PC, and a thinner sensor film, in particular made of PET.

Further, it is possible for the at least one film in step a) to be transparent, translucent or opaque at least in regions or over the whole surface and/or for the at least one sensor film in step b) to be transparent, translucent or opaque at least in regions.

By "opaque" is preferably meant a transparency, in particular in the wavelength range visible to humans, of less than 25%, in particular of less than 15%, preferably of less than 5%.

By "translucent" is preferably meant a transparency, in particular in the wavelength range visible to humans, of from 25% to 75%, in particular of from 15% to 85%, preferably of from 5% to 95%.

By "transparent" is preferably meant a transparency, in particular in the wavelength range visible to humans, of at least 75%, in particular of more than 85%, preferably of more than 95%.

It is furthermore possible for the at least one sensor film in step b) to be applied to the at least one film by means of hot lamination and/or by means of hot stamping and/or cold lamination and/or adhesive bonding, in particular cold bonding.

In particular, step b) comprises one or more steps of the following further steps, in particular for producing the at least one sensor film and/or for applying the at least one sensor film to the at least one film, preferably wherein the following further steps are carried out in the following sequence, further preferably wherein the following further steps are carried out in a cyclic sequence:

b1) providing at least one carrier substrate;
b2) applying at least one electrically conductive layer to the carrier substrate, wherein the at least one electrically conductive layer makes an electrical functional structure in at least one functional region, wherein the at least one electrically conductive layer, in at least one contacting region, makes at least one contacting structure for contacting the electrical functional structure;
b3) applying at least one adhesion-promoting layer, for applying the at least one sensor film to the at least one film, in such a way that the adhesion-promoting layer, when observed perpendicular to a plane spanned by the at least one carrier substrate, does not cover the at least one contacting region at least in regions or wherein the at least one adhesion-promoting layer, when observed perpendicular to a plane spanned by the at least one carrier substrate, is applied over the whole surface.

It has proved worthwhile for the at least one electrically conductive layer to be arranged between the carrier substrate and the at least one adhesion-promoting layer. Thus, it is possible for the adhesion-promoting layer to be arranged on the side of the at least one electrically conductive layer facing away from the carrier substrate.

Thus, it is possible for the adhesion-promoting layer to be applied in step b3) in such a way that the at least one electrically conductive layer is arranged between the carrier substrate and the adhesion-promoting layer. Since the adhesion-promoting layer is arranged on the surface of the sensor film, the sensor film can be applied directly to a film, wherein it is further ensured that the electrical functional structure can be contacted reliably.

It is also possible for the adhesion-promoting layer to be arranged on the side of the carrier substrate facing away from the at least one electrically conductive layer. Thus, it is possible for the adhesion-promoting layer to be arranged on the side of the carrier substrate facing away from the at least one electrically conductive layer in step b3).

Here, the adhesion-promoting layer is preferably applied over the whole surface when observed perpendicular to a plane spanned by the carrier substrate. The adhesion-promoting layer is thus advantageously arranged in the functional region and the contacting region. Further, it is possible for the adhesion-promoting layer to be applied to the carrier substrate over the whole surface in such a way that no further layers are arranged between the carrier substrate and the adhesion-promoting layer.

Further preferably, the adhesion-promoting layer covers the functional region at least in regions. Thus, it is possible for the adhesion-promoting layer to be applied in step b3) in such a way that the adhesion-promoting layer covers the functional region at least in regions. It can hereby be ensured that the functional region adheres to the film.

By adhesion is meant here an adhesion of the sensor film to the film in such a way that a predefined minimum adhesive force is achieved, which makes a secure adhesion of the sensor film to the film possible. Here, the adhesive force is at least so strong that the sensor film cannot be separated from the intermediate or end product having the applied sensor film and the film during an intended use. However, the adhesive force is not necessarily so strong that the sensor film cannot be separated from the film using a large amount of force, such as for example in the case of a tearing down. Thus, it is possible for the adhesive force to be such that the sensor film can be mechanically separated from the film without damaging the film or the sensor film.

The adhesive force is preferably specified as tension in Newtons per cm, in particular wherein the unit cm here specifies the width of the film and/or sensor film. The adhesive force is preferably more than 3 N/cm, in particular more than 10 N/cm, preferably more than 30 N/cm. Tearing, for example of the at least one sensor film, preferably shows that the adhesive force in particular is greater than the strength of the at least one film.

The adhesion-promoting layer advantageously covers the functional region by at least 30%, preferably by at least 50%, further preferably by at least 70%.

Further, it is possible that the adhesion-promoting layer does not cover the at least one contacting region over the whole surface. Thus, it is possible that the adhesion-promoting layer does not cover the whole at least one contacting region when observed perpendicular to the plane spanned by the carrier substrate. This makes a reliable and robust contacting of an electrical functional structure, which provides for example the touchpad functionality, possible.

It is advantageous that the adhesion-promoting layer does not cover a region adjoining the at least one contacting region when observed perpendicular to a plane spanned by the carrier substrate.

Further, it is advantageous for the region adjoining the at least one contacting region to have a width of at least 0.2 mm, preferably of at least 0.5 mm, further preferably of at least 1 mm, still more preferably of at least 2 mm. By width is meant here in particular the distance between the interface which is made by the at least one contacting region and the one region adjoining the at least one contacting region and the interface which is made by the adhesion-promoting layer and the one region adjoining the at least one contacting region.

This facilitates a contacting of the electrical functional structure since the region in which the sensor film does not adhere to the film is enlarged. The fact that this region directly adjoins the contacting region makes it possible for example to raise the sensor film in the contacting region during a contacting procedure, as a result of which the contacting structure is more accessible and thus the contacting is further facilitated. A contacting region made in this way is also called a tail. Thus, it is possible for the region adjoining the at least one contacting region to be movable in such a way that the at least one contacting region can be raised.

Preferably, the whole non-adhering length of the contacting region or tail is usually at least 10 mm long, in particular several cm long.

Further, it is possible for the adhesion-promoting layer to be a layer comprising polymers and/or copolymers, in particular polymethyl (meth)acrylate (PMMA), polyester, polyurethane (PU) or polyvinyl chloride (PVC).

Less preferably, the adhesion-promoting layer has natural resins, preferably rosin, phenolic resins, isocyanate (NCO) crosslinked binders, for example melamine-formaldehyde condensation resins (MF), melamine-phenol-formaldehyde resins (MPF), melamine polyesters, melamine-urea-formaldehyde resins (UMF), poly(organo) siloxanes or radiation-curing binders.

By binders is meant here substances using which solids, in particular with a fine degree of fragmentation, can be joined to each other or to a base. Thus, it is possible for the binders to be added to the solids to be bound in liquid form.

Advantageously, the adhesion-promoting layer has a layer thickness of between $0.1\,\mu m$ and $50\,\mu m$, preferably between $0.25\,\mu m$ and $25\,\mu m$, further preferably between $0.5\,\mu m$ and $7\,\mu m$.

Further, it is advantageous if the adhesion-promoting layer comprises one or more layers. Thus, it is possible for the adhesion-promoting layer to comprise two layers, in particular a first adhesion-promoting layer and a second adhesion-promoting layer. It is hereby possible to optimize the adhesion of the sensor film to the film. Thus, the second adhesion-promoting layer, which is in particular arranged between the first adhesion-promoting layer and the film, can be matched, for example, to the material of the film, wherein the first adhesion-promoting layer is matched for the material of the layer of the sensor film adjoining the first adhesion-promoting layer, for example a protective varnish layer. The adhesion of the sensor film to the film can thus be optimized through a suitable choice of the first and the second adhesion-promoting layer.

It is advantageous for the adhesion-promoting layer to consist of a material which is highly transparent after application of the sensor film to the film, in particular for the adhesion-promoting layer to consist of a material which has a transmission of light in the wavelength range between 380 nm and 780 nm of more than 85%, preferably more than 90%, after application of the sensor film to the film. It can hereby be achieved for example that the intensity of light in the wavelength range between 380 nm and 780 nm emitted by the film is not significantly reduced by the adhesion-promoting layer. Further, items of optical information of the film are clearly recognizable through the sensor film applied to the film. It can hereby be achieved, for example, that the resolution and color reproduction of a display or display device to which the sensor film is applied is not altered for a human observer.

In the state not yet applied to the film, the adhesion-promoting layer can in particular have a cloudy optical appearance and thus not (yet) be highly transparent. The cloudy appearance can form for example due to differences in the refractive index of the adhesion-promoting layer and the surrounding air and/or due to surface roughnesses of the adhesion-promoting layer, in particular on the side of the adhesion-promoting layer facing away from the at least one electrically conductive layer. The surface roughnesses can in particular scatter incident light and hereby generate a cloudy impression. Surface roughnesses of this kind can form in particular during the application of the adhesion-promoting layer due to the application methods used. For example, the surface roughnesses can be made by a printing pattern of a gravure printing anilox roll or a screen-printing tool. In contrast, the adhesion-promoting layer is highly transparent after application of the sensor film to the film, since the adhesion-promoting layer is then melted, in particular by means of hot lamination, and/or leveled by means of pressure such that the surface roughnesses of the adhesion-promoting layer no longer appear disruptively. As a result, if the refractive index of the material of the film and the refractive index of the material of the adhesion-promoter layer differ from each other in particular by less than 0.1, the optical interface between adhesion-promoting layer and film is no longer visible.

By transparent is meant here the property of matter to allow light from the wavelength range visible to the human eye, in particular from the wavelength range between 380 nm and 780 nm, to pass through. The term "highly transparent" therefore describes the property of matter to allow light from the wavelength range visible to the human eye, in particular from the wavelength range between 380 nm and 780 nm, to pass through barely diminished and substantially unhindered. For a human observer, a highly transparent layer therefore has substantially no recognizable absorption of light, with the result that the reduction in the light intensity when the light passes through the layer is barely recognizable to a human observer.

By cloudy is meant here the property of matter where light from the wavelength range visible to the human eye, in particular from the wavelength range between 380 nm and 780 nm, is not able to pass through the material unhindered. A cloudy layer, for example through scattering properties, prevents light from being able to pass through it unhindered. Light can also be absorbed and/or reflected in a cloudy layer. A cloudy layer can, for example, generate a milky optical impression for a human observer, with the result that further layers arranged under a cloudy layer are perceived blurred and/or hazy for example.

Further, it is advantageous for the adhesion-promoting layer to consist of a material which is optically clear after application of the sensor film to the film, in particular for the adhesion-promoting layer to consist of a material which, through scattering, deflects light in the wavelength range between 380 nm and 780 nm by less than 8%, preferably by less than 4%, after application of the sensor film to the film. It can hereby be achieved for example that an image and/or movie generated by a film, such as for example a display or a display device, is essentially not influenced for a human observer by the sensor film applied to the film. Due to the low scattering of the material of the adhesion-promoting layer and thus of the adhesion-promoting layer itself, it can thus be ensured that an image generated by a display or display device is not perceived by a human observer as out of focus or blurred when the sensor film is applied to the display or display device. Thus, a brilliant and faithful observation of the image generated by the display or display device through the sensor film can hereby be achieved, in particular in the case of high-resolution displays or display devices with pixel densities of more than 200 ppi (pixels per inch).

As described above, in the state not yet applied to the film the adhesion-promoting layer can in particular have light-scattering properties due to surface roughnesses of the adhesion-promoting layer, and thus a cloudy optical appearance. The adhesion-promoting layer is clear in particular when the sensor film is applied to the film and the adhesion-promoting layer is melted on and/or leveled for example by means of heat and/or pressure supplied by the hot lamination, with the result that the surface roughnesses of the adhesion-promoting layer no longer appear disruptively. This means that the adhesion-promoting layer becomes highly transparent and/or optically clear due to physical and/or chemical changes in the adhesion-promoting layer during or after the application of the sensor film to the film.

It is possible for the adhesion-promoting layer to be made of a hot glue, a cold glue or a radiation-curable adhesive, in particular an adhesive curable by means of electromagnetic radiation and/or electron beam radiation.

Further, it is possible for the adhesion-promoting layer to be designed patterned, in particular in the form of a rectangle, rounded rectangle or motif. Thus, it is possible for the pattern of the patterned adhesion-promoting layer to be adapted to structures of the film.

It is also possible for the adhesion-promoting layer to be applied according to a grid, in particular a one-dimensional or two-dimensional grid. Thus, it is possible for the adhesion-promoting layer to be applied according to a dot or line grid. During the application of the sensor film to the film, the grid made by the adhesion-promoting layer is smoothed, with the result that the transparency of the sensor film is not negatively influenced by the adhesion-promoting layer applied according to the grid.

Advantageously, after application to the film the sensor film has, at least in the one functional region of the at least one electrically conductive layer, a transmission of light in the wavelength range between 380 nm and 780 nm of more than 75%, preferably more than 80%, further preferably more than 85%, still further preferably more than 90%.

Here, the transmission describes the transmissibility of the sensor film for light from the wavelength range between 380 nm and 780 nm. Light incident on the sensor film is partially reflected on the air/sensor film interface and on interfaces of the layers of the sensor film. Further, the light incident on the sensor film is partially absorbed while crossing the sensor film. The remaining portion of light is transmitted through the sensor film and emerges again on the opposite side of the sensor film. To determine the transmittance T the quotient of the light intensity behind the sensor film I and the light intensity in front of the sensor film is calculated. The transmittance T is a measure of the intensity "allowed through" and assumes values between 0 and 1.

The transmission is typically dependent on the wavelength of the incident light. Therefore, the wavelength range is specified along with the transmission values.

As described above, the adhesion-promoting layer can have a cloudy optical appearance before application of the sensor film to a film, for example due to surface roughnesses. In particular during the application process, these surface roughnesses are evened out, with the result that the adhesion-promoting layer is highly transparent and/or clear after application to the film, with the result that the cloudy optical impression of the adhesion-promoting layer disappears and the sensor film as a whole has, at least in the one functional region of the at least one electrically conductive layer, a transmission of light in the wavelength range between 380 nm and 780 nm of more than 75%, preferably more than 80%, further preferably more than 85%, still further preferably more than 90%. As will be explained later, it is advantageous if the sensor film is applied to a film with known transmission and the total transmission of the electrical functional element made from the film and the sensor film is subsequently determined.

In particular, the sensor film comprises a detachment layer, wherein the detachment layer covers the at least one contacting region at least in regions when observed perpendicular to a plane spanned by the carrier substrate. Thus, it is possible for the method further to comprise the following steps: b6) applying a detachment layer in such a way that the detachment layer covers the at least one contacting region at least in regions when observed perpendicular to a plane spanned by the carrier substrate. Thus, it is possible for the detachment layer to prevent an adhesion of the at least one contacting region.

Further, it is advantageous for the carrier substrate and/or the at least one electrically conductive layer and/or the detachment layer and/or the protective varnish layer to be made transparent.

It is also possible for the detachment layer to cover the at least one contacting region over the whole surface.

Further, it is possible for the detachment layer to cover the region adjoining the at least one contacting region.

Through the detachment layer it can further be ensured that the sensor film does not adhere to the film in regions which have the detachment layer. Through the detachment layer, the at least one contacting region can thus be prevented from adhering to the film, in particular the at least one contacting region can be prevented from adhering to the film as a result of the hot lamination of the sensor film to the target substrate.

The detachment layer preferably consists of waxes, polyethylene (PE), polypropylene (PP), cellulose derivatives or poly(organo) siloxanes. Above-named waxes can be natural waxes, synthetic waxes or combinations thereof. Above-named waxes are carnauba waxes for example. Above-named cellulose derivatives are for example cellulose acetate (CA), cellulose nitrate (CN), cellulose acetate butyrate (CAB) or mixtures thereof. Above-named poly (organo) siloxanes are for example silicone binders, polysiloxane binders or mixtures thereof.

Less preferably, the detachment layer has natural resins, preferably rosin, phenolic resins, halogen-containing homopolymers, for example polyvinyl chloride (PVC), polyvinyl fluoride (PVF), polytetrafluoroethylene (PTFE), polyvinylidene fluoride (PVDF) or polyvinylidene chloride (PVDC), polyesters, for example polybutylene terephthalate (PBT), polycyclohexylene dimethylene terephthalate (PCT), polyethylene terephthalate (PET), polytrimethylene terephthalate (PTT), polyethylene naphthalate (PEN), polycarbonate (PC), polyester carbonate (PEC), polyacrylates (PAC) or unsaturated polyester resin (UP), polymeric carboxylic acid esters, for example polymethyl (meth)acrylates (PMMA), isocyanate (NCO) crosslinked binders, for example melamine-formaldehyde condensation resins (MF), melamine-phenol-formaldehyde resins (MPF), melamine polyesters, melamine-urea-formaldehyde resins (UMF), polyolefins which are not PP or PE, for example polymethylpentene (PMP), polyisobutylene (PIB) or polybutylene (PB), copolymers consisting of PVC, PMMA, PU, poly(organo) siloxanes and polyolefins which are not PP or PE.

Less preferably, the detachment layer furthermore has radiation-curing binders.

The detachment layer preferably has a layer thickness of between 0.1 μm and 10 μm, preferably between 0.1 μm and 5 μm. This small layer thickness is advantageous, so that an electrical contacting of the at least one contacting region covered by the detachment layer is possible, in particular by means of adapter elements and/or connection elements and/ or contact elements, such as for example by means of contact springs, ZIF connectors (ZIF=zero insertion force), crimp contacts, crimp flex contacts, ACF bonding (anisotropic conductive film) or a conductive rubber multiple connection (ZEBRA). Here, the detachment layer is advantageously penetrated locally during the electrical contacting, in particular by the adapter elements and/or connection elements and/or contact elements, with the result that locally the detachment layer no longer has an effect that impedes the electrical contacting, in particular an electrically insulating effect. Here it is advantageous if the electrically insulating detachment layer is destroyed by means of mechanical-physical forces during the contacting, in particular by the adapter elements and/or connection elements and/or contact elements, such that an electrical conductivity forms, in particular between the at least one contacting region and the adapter elements and/or connection elements and/or contact elements. This is achieved by contact springs or by crimping for example. Further, a ZIF contacting is also mechanically "severing", with the result that an electrical contacting of the at least one contacting region covered by the detachment layer is also made possible by this. In the case of ACF bonding, metal pigments in the adhesive layer can penetrate through the detachment layer during pressing/embossing of the sensor film, with the result that an electrical contacting is also possible by means of ACF bonding.

Further, it is also possible that an electrical contacting does not necessarily have to be effected through a galvanic connection between the at least one contacting region and the adapter elements and/or connection elements and/or contact elements and/or the contact layer, in particular the film. Thus, it is also possible for an electrical contact to be achieved via a capacitive coupling of two contact surfaces, such as for example between the at least one contacting region and a target contacting region, in particular a contact layer of the film, preferably with at least one insulating layer arranged between them, or in particular for an electrical contact to be achieved via an inductive coupling of two contact surfaces, such as for example between the at least one contacting region and a target contacting region, in particular a contact layer of the film.

The sensor film preferably comprises a protective varnish layer.

Advantageously, the protective varnish layer covers the at least one electrically conductive layer at least in regions when observed perpendicular to a plane spanned by the carrier substrate. Further, it is advantageous for the following step further to be carried out between step b2) and step b3): applying a protective varnish layer in particular in such a way that the protective varnish layer covers the at least one electrically conductive layer at least in regions when observed perpendicular to a plane spanned by the carrier substrate. Thus, it is possible for the protective varnish layer to protect the at least one electrically conductive layer from mechanical, physical and/or chemical environmental influences.

It is also possible for the protective varnish layer to cover the at least one electrically conductive layer over the whole surface in the functional region when observed perpendicular to a plane spanned by the carrier substrate.

It is also possible for the sensor film to comprise one or more protective varnish layers.

In particular, protective varnish layers which represent the outermost layer of the sensor film or of an intermediate or end product, in particular of an electrical functional element, to which the sensor film has been applied, here protect the further layers of the sensor film from mechanical, physical and/or chemical environmental influences or influences of further process steps.

It is advantageous for the protective varnish layer to have a layer thickness of between 0.1 μm and 50 μm, preferably between 0.25 μm and 25 μm, further preferably between 0.5 μm and 15 μm.

The protective varnish layer is preferably a transparent protective varnish layer, in particular made of PMMA, polyester, PU or PVC.

Less preferably, the protective varnish layer has natural resins, preferably rosin, phenolic resins, isocyanate (NCO) crosslinked binders, for example MF, MPF, melamine polyesters, UMF, polyolefins which are not PP or PE, for example PMP, PIB or PB.

It is also advantageous for the protective varnish layer to be arranged between the at least one electrically conductive layer and the adhesion-promoting layer.

It is also possible for the protective varnish layer to be applied in such a way that the protective varnish layer is arranged between the at least one electrically conductive layer and the adhesion-promoting layer. Thus, it is possible for the protective varnish layer to be arranged on the side of the at least one electrically conductive layer facing away from the carrier substrate.

Further, it possible for the sensor film to have a structure with the following order:

carrier substrate at least one electrically conductive layer protective varnish layer adhesion-promoting layer.

Further, it is possible for the protective varnish layer to be arranged between the at least one electrically conductive layer and the carrier substrate. In the process, the electrically conductive layer is embedded between the protective varnish layer and the adhesion-promoting layer and protected. The protective varnish layer and the adhesion-promoting layer preferably consist of varnishes with similar physical properties, in particular with respect to the mechanical deformability and stretchability. It is thereby possible that the embedded electrically conductive layer is not damaged, for example does not tear, in the case of a strong deformation of the sensor film, as a result of which its electrical functioning is maintained. The previously described embedding of the electrically conductive layer further also prevents a delamination of these layers.

It is also possible for the sensor film to comprise a primer varnish layer, in particular a primer varnish layer that can be vaporized for metallization. Advantageously, the primer varnish layer is arranged between the protective varnish layer and the at least one electrically conductive layer.

Advantageously, the primer varnish layer is a layer made of polymers and/or copolymers, in particular comprising polymethyl (meth)acrylate (PMMA), polyester, polyurethane (PU) or polyvinyl chloride (PVC).

Less preferably, the primer varnish layer has natural resins, preferably rosin, phenolic resins, isocyanate (NCO) crosslinked binders, for example melamine-formaldehyde condensation resins (MF), melamine-phenol-formaldehyde resins (MPF), melamine polyesters, melamine-urea-formaldehyde resins (UMF), poly(organo) siloxanes or radiation-curing binders.

The primer varnish layer preferably has a layer thickness of between 0.1 μm and 5 μm, preferably between 0.1 μm and 2 μm.

Further, it possible for the sensor film to have a structure with the following order:

carrier substrate protective varnish layer primer varnish layer at least one electrically conductive layer adhesion-promoting layer.

Further, it is possible for the sensor film to be a transfer film.

Advantageously, a transfer film has a carrier ply, in particular the carrier substrate, as well as a transfer ply that can be detached from the carrier ply, in particular the carrier substrate.

Advantageously, a separation layer, which makes it possible to detach the transfer ply from the carrier ply, in particular the carrier substrate, is arranged between the carrier ply, in particular the carrier substrate, and the transfer ply.

Thus, it is possible to apply only the transfer ply to a film, in particular by means of hot stamping.

However, it is also possible that the carrier ply, in particular the carrier substrate, is not detached after application to the film, with the result that the carrier ply, in particular the carrier substrate, likewise remains on the film.

Further, it is possible for the sensor film to comprise a separation layer. It is it possible for the separation layer to be a single- or multi-layered separation layer. The separation layer is preferably arranged between the carrier substrate and the protective varnish layer. It can hereby be achieved for example that the carrier substrate can be detached after the sensor film has been applied to the film. An even better deformability and/or stretchability of the applied sensor film can hereby be achieved since the comparatively thick and less deformable and/or stretchable carrier substrate has been removed. The protective varnish layer takes on the function of protecting the sensor film.

The separation layer is preferably a wax layer and/or a polymer layer made, for example, of acrylates and/or melamine-formaldehyde resin crosslinked varnishes. The separation layer preferably has a layer thickness of less than 1 μm.

Advantageously, it can be provided that the adhesive force between the carrier substrate and the protective varnish layer is 20% to 80%, preferably 30% to 70%, smaller than the adhesive force between the protective varnish layer and the primer varnish layer and/or the at least one electrically conductive layer and/or the adhesion-promoting layer, due to the separation layer arranged between the carrier substrate and the protective varnish layer.

Thus, it is possible for the adhesive force between the carrier substrate and the protective varnish layer to be 20% to 80%, preferably 30% to 70%, smaller than the adhesive force between the layers of the transfer ply, in particular selected from the group protective varnish layer, primer varnish layer, at least one electrically conductive layer, one or more decorative layers, adhesion-promoting layer, intermediate adhesive layer, dielectric layer, darkening layer and contact-strengthening layer, due to the separation layer arranged between the carrier substrate and the protective varnish layer. The adhesive forces were determined with the aid of the Zwick Z005 tensile test testing machine from Zwick GmbH & Co. KG, Ulm, Germany. For this, the transfer film was glued flat on the lower holder. The layer to be detached was then detached at a right angle using the tensile test. The detachment forces were determined via the load cell.

Thus, it possible for the sensor film to have a structure with the following order:

carrier substrate separation layer protective varnish layer primer varnish layer at least one electrically conductive layer adhesion-promoting layer.

Since the adhesion-promoting layer does not cover the at least one contacting region, in the embodiment variant of the sensor film as a transfer film, the electrical functional structure can also be contacted after the sensor film has been applied to the film, with the result that an electrical connection can be produced, for example by means of the above-mentioned contacting types. The optional separation layer further makes it possible that the carrier substrate can be at least partially detached, as a result of which the subsequent contacting possibility is further improved since in this embodiment variant the sensor film does not stick up to the edge of the carrier substrate.

Further, it is possible, in particular after removal of the carrier substrate, to apply a reinforcing element in order to increase the mechanical stability of the applied transfer plies.

According to a further embodiment variant, the film has a contact layer, in particular for the electrical contacting of the at least one contacting region of the sensor film.

The contact layer is preferably applied directly to the film.

Further, it is possible for the contact layer to have at least one connection element.

Further, it is also possible for the contact layer to have at least one adapter element and/or contact element.

The film therefore preferably already itself has at least one connection element and/or adapter element and/or contact element, in particular for the electrical contacting of the at least one contacting region of the sensor film.

Advantageously, the contact layer is arranged in at least one target contacting region of the film. The at least one target contacting region of the film preferably forms the mating part for the at least one contacting region of the sensor film. Thus, it is advantageous for the at least one target contacting region of the film and the at least one contacting region of the sensor film, preferably after the sensor film has been applied to the film, to be congruent, in particular for the at least one target contacting region of the film and the at least one contacting region of the sensor film to overlap at least in regions after the sensor film has been applied.

Further, it is possible for the film to comprise at least one third electrically conductive layer. The at least one third electrically conductive layer preferably has a plurality of conductive paths. Thus, it is possible for the at least one third electrically conductive layer to have electrically conductive structures, in particular conductive paths, which are preferably arranged according to a grid. This grid can be regular or irregular. The grid can in particular be constructed of grid elements, such as lines and/or area elements.

Further, it is also possible for the at least one third electrically conductive layer to have further electrical components.

Further electrical components can in particular be passive electrical components, preferably resistors or capacitors, and/or be active components, preferably transistors, diodes, light-emitting diodes, integrated circuits, processors and/or connection components, further preferably conductive paths, cables, plugs, sockets.

Advantageously, the at least one third electrically conductive layer of the film is electrically connected to the at least one contact layer.

Thus, it is possible for example for the film to be equipped with conductive paths and/or further electrical components. These conductive paths can then advantageously be electrically connected to further electrical components in a known manner by means of plug-in contacts or other known contacting methods. This can preferably be effected by means of laser direct structuring (LDS) or also by means of printed contacts, in particular by means of contacts printed by screen printing, or also by means of a contact layer, which is applied, for example, by means of lamination and/or hot stamping or cold stamping. Thus, it is possible for example for the film to be a type of printed circuit board.

Thus, it is possible, by means of the contact layer, to connect the at least one third electrically conductive layer of the film to the functional region of the electrically conductive layer of the sensor film electrically via the contacting region of the sensor film. The contact layer on the film therefore forms the counter contact for the contacting region of the sensor film.

Further, it is advantageous if the contact layer, in particular the at least one connection element and/or adapter element and/or contact element, and/or the at least one third electrically conductive layer is/are generated and/or applied by means of laser direct structuring (LDS) and/or by means of printing, in particular by means of screen printing and/or inkjet printing.

Further, it is also possible for the contact layer, in particular the at least one connection element and/or adapter element and/or contact element, to be applied by means of lamination and/or hot stamping or cold stamping.

Further, it is possible for the contact layer, in particular the at least one connection element and/or adapter element and/or contact element on the film to be made of an electrically conductive paste, in particular carbon paste, which comprises silver (Ag), gold (Au), aluminum (Al), copper (Cu), chromium (Cr) and/or other conductive metals.

Further, it is possible for the electrically conductive paste, in particular carbon paste, to comprise binders, in particular comprising rosin and/or phenolic resins, polymers and copolymers. Binders of the electrically conductive paste, in particular carbon paste, are natural resins, preferably rosin, phenolic resins, polymers and copolymers consisting of PVC, PMMA, PU, polyesters, isocyanate (NCO) cross-linked binders, for example MF, MPF, melamine polyester, UMF. Binders of the electrically conductive paste comprising poly(organo) siloxanes and copolymers thereof and/or radiation-curing binders are less preferred.

Further, it is possible for an adhesive varnish to be printed on the sensor film in the at least one contacting region completely or partially patterned, for example in a grid. Thus, it is possible for the sensor film to have an adhesive varnish in the at least one contacting region.

Alternatively, it is also possible for the sensor film not to have the adhesive varnish in the at least one contacting region or for the adhesive varnish to be completely omitted locally in the region of the contacts.

In the case of the application of the sensor film to the film provided with the contact layer, an electrical (press) contact thus preferably forms (through heat and pressure) between sensor film and film, in particular in the at least one contacting region and/or target contacting region. Here, it is possible for the electrical (press) contact to have a lasting effect due to the bonding, in particular due to the adhesive varnish.

Further, it is possible for an ACF bonding tape to be introduced between the at least one contacting region of the sensor film and the at least one target contacting region of the film. The electrical connection in the contacting region can hereby be further improved. It is advantageous here if the application process (heat and pressure) also corresponds as far as possible to the usual ACF bonding process.

Further, it is advantageous if the contact layer of the film is designed in such a way that two or more sensor films can be applied to the film. Thus, it is possible for the contact layer of the film to have connection elements and/or adapter elements and/or contact elements for the electrical contacting of at least two sensor films.

Thus, it is also possible for the film to have the contact layer for contacting a first sensor film in a first target contacting region and to have the contact layer for contacting a second sensor film in a second target contacting region.

Advantageously, the film to which at least two sensor films are to be applied already has a contact layer, which is designed in such a way that a two-ply sensor consisting of a sensor film for the x ply and a sensor film for the y ply can be applied.

Thus, it is also possible for electrical contacts and contact supply lines for a two-ply sensor consisting of an x and a y ply already, as described above, to be located on the film to which the at least two sensor films are to be applied. The x and y plies are preferably each made of a sensor film. Firstly, the first sensor ply, for example the x ply, is preferably applied to the film by means of the sensor film, and the electrical contact is produced. Advantageously, the first sensor ply is applied to the film registration-accurately with respect to the contact layer, in particular the at least one connection element and/or adapter element and/or contact element, of the film for the electrical contacting, in particular of the first sensor ply.

Thus, it is possible for a first sensor film to be applied to the film in a first step in such a way that the at least one contacting region of the first sensor film overlaps the target contacting region of the contact layer at least in regions for the contacting of the first sensor film.

The application of the second sensor ply, for example the y ply, to the film is preferably effected after this in a separate step by means of the at least one sensor film, registration-accurately with respect to the first sensor ply or registration-accurately with respect to the contact layer, in particular the at least one connection element and/or adapter element and/or contact element, of the film for the electrical contacting, in particular of the second sensor ply. Here, it is possible for a bonding, for example by means of OCA, between the sensor plies to be dispensed with. The registration accuracy, i.e. the positional accuracy of the second sensor ply relative to the first sensor ply, is preferably ±350 µm, further preferably ±150 µm, in the x and y direction, in order to achieve the desired functionality of the sensor.

Thus, it is possible for a second sensor film to be applied to the film in a second step in such a way that the at least one contacting region of the second sensor film overlaps the target contacting region of the contact layer at least in regions for the contacting of the second sensor film.

Among other things, preferred designs of the at least one contacting region and/or of the at least one contacting structure are described in the following.

The at least one contacting structure for contacting the electrical functional structure is preferably an electrical connector, in particular a plug.

Advantageously, the at least one electrically conductive layer has a contact-strengthening layer.

Further, it is advantageous for the at least one electrically conductive layer to have the contact-strengthening layer at least in regions in the at least one contacting region, wherein the contact-strengthening layer protects the at least one contacting region from mechanical, physical and/or chemical environmental influences.

Thus, it is possible for the following step to be carried out between step b2) and step b3):

applying a contact-strengthening layer in such a way that the at least one electrically conductive layer has a contact-strengthening layer, in particular that the at least one electrically conductive layer has the contact-strengthening layer at least in regions in the at least one contacting region.

The stability/durability of the at least one contacting region is improved by the contact-strengthening layer since the contacting region is protected, for example, from corrosion or scratching by the contact-strengthening layer. Furthermore, the mechanical stability of the contacting region, in particular the bending strength and/or kink resistance, can also be improved.

Further, it is possible for the contact-strengthening layer to cover the at least one contacting region over the whole surface.

It is also possible for the at least one contacting region to have one or more contacting regions that are separated from one another. By separated is meant here that the contacting regions are rejected by one another, in particular that the contacting regions have a spacing from each other of at least 0.1 mm, preferably at least 0.2 mm, further preferably at least 0.5 mm, Further, it is advantageous for the contact-strengthening layer to have a layer thickness of between 0.1 µm and 100 µm, preferably between 0.25 µm and 25 µm, further preferably between 0.5 µm and 10 µm.

It is possible for the contact-strengthening layer to be made of an electrically conductive paste, in particular carbon paste, which comprises silver (Ag), gold (Au), aluminum (Al), copper (Cu), chromium (Cr) and/or other conductive metals. Further, it is possible for the electrically conductive paste, in particular carbon paste, to comprise binders, in particular comprising rosin and/or phenolic resins, polymers and copolymers.

Binders of the electrically conductive paste, in particular carbon paste, are natural resins, preferably rosin, phenolic resins, polymers and copolymers consisting of PVC, PMMA, PU, polyesters, isocyanate (NCO) crosslinked binders, for example MF, MPF, melamine polyester, UMF. Binders of the electrically conductive paste comprising poly(organo) siloxanes and copolymers thereof and/or radiation-curing binders are less preferred.

It is advantageous for the adhesion-promoting layer, the protective varnish layer, the detachment layer and/or the contact-strengthening layer to be applied by means of gravure printing, screen printing, relief printing or casting techniques.

Among other things, preferred designs of the at least one electrically conductive layer and/or of the electrical functional structure are described in the following:

The electrical functional structure preferably forms a touch sensor field, in particular a capacitive sensor field, which provides a touchpad functionality. It is also possible for the electrical functional structure to form a resistive or inductive sensor field.

By touch sensor field is meant here a touch-sensitive sensor, which makes it possible to control an electrical functional element, for example a PDA. Likewise, by a touch sensor field is meant a multi-touch sensor field, which can process several simultaneous touches, for example for enlarging and rotating images which are displayed on a display arranged in particular under the touch sensor field.

It is possible for the sensor film to comprise at least two electrically conductive layers, in particular a first electrically conductive layer and a second electrically conductive layer.

Advantageously, the at least two electrically conductive layers are arranged overlapping at least in regions when observed perpendicular to a plane spanned by the carrier substrate.

It is hereby possible in particular to produce multi-ply touch sensors which can also process several simultaneous touches, for example for enlarging and rotating images. For example, the second electrically conductive layer can be provided on a second carrier film, which is applied, in particular glued, to the first conductive layer in particular by means of the adhesion-promoting layer and/or an intermediate adhesive layer and/or with the aid of primer layers and/or adhesive layers. These primer layers and/or adhesive layer can be made of a hot glue, a cold glue or a radiation-curable adhesive, in particular an adhesive curable by means of electromagnetic radiation and/or electron beam radiation.

During application of the second electrical layer to the first electrically conductive layer it is expedient if the relative positioning of the two electrically conductive layers is effected register-accurately with respect to one another, in particular with a tolerance of less than 0.25 mm, preferably with a tolerance of less than 0.1 mm, in order to provide an uninterrupted touch functionality. Thus, it is possible for the at least two electrically conductive layers to be arranged register-accurately with respect to one another, in particular for the at least two electrically conductive layers to be arranged with a tolerance of less than 0.25 mm, preferably less than 0.1 mm, relative to one another. The electrically conductive layers in particular have electrically conductive structures, in particular conductive paths, which are preferably arranged according to a grid. This grid can be regular or irregular. The grid can in particular be constructed of grid elements, such as lines and/or area elements. The grid elements can form so-called sensor cells.

By register or registration or register accuracy or registration accuracy or positional accuracy is meant in particular a position accuracy of two or more elements and/or layers relative to one another. The register accuracy is preferably to vary within a predefined tolerance and preferably to be as high as possible. At the same time, the register accuracy of several elements and/or layers relative to one another is in particular an important feature in order to increase the process reliability. The positionally accurate positioning is effected in particular by means of sensory, preferably optically detectable, registration marks or the position markings. In particular, these registration marks or position markings either represent specific separate elements or regions or layers or are themselves part of the elements or regions or layers to be positioned.

In particular, the at least one electrically conductive layer and/or the two electrically conductive layers have a plurality of conductive paths.

By conductive paths is preferably meant here structured electrically conductive layers and conductive regions of the at least one electrically conductive layer and/or of the two electrically conductive layers. The conductive paths are in particular applied in such a way that a sufficient transparency for the human eye is preserved, i.e. the conductive paths are designed in such a way that they are not perceived by a human observer since the conductive paths lie below the resolving power of the human eye. In spite of the narrow conductive paths used, a sufficient electrical conductivity is achieved, which is comparable in particular to layers made of indium tin oxide (ITO). Indium tin oxide (ITO) preferably makes transparent conductive layers, which are used in particular over the whole surface but can also be structured. Another example of such a transparent conductive layer is PEDOT (poly-3,4-ethylenedioxythiophene). In contrast to indium tin oxide (ITO), which is vapor deposited, PEDOT can in particular be applied by means of printing processes and in the process preferably be applied simply structured or over part of the surface. The coverage of the carrier substrate with the at least one electrically conductive layer, in particular the conductive paths, is preferably smaller than 30%, preferably smaller than 20%, further preferably smaller than 10%, still further preferably smaller than 5%.

Advantageously, the conductive paths are spaced apart from one another, in particular the conductive paths have a width of between 0.2 μm and 20 μm, preferably between 4 μm and 15 μm, and a spacing from one another greater than 10 μm, preferably greater than 20 μm, with the result that the conductive paths lie below the resolving power of the human eye.

It is advantageous if the conductive paths of the first electrically conductive layer and of the second electrically conductive layer are arranged in each case according to a line grid, wherein in particular the line grids are rotated by 90° with respect to one another. Thus, the first and second electrically conductive layers in each case have a line grid made of conductive paths spaced apart from one another. The first and second electrically conductive layers are preferably arranged one over the other in such a way that the two line grids are arranged at right angles, therefore rotated 90° with respect to one another. Electrical supply lines and/or contacting elements are preferably provided in the edge regions of both line grids. These edge regions are preferably arranged register-accurately relative to one another with a tolerance of less than 0.25 mm, preferably less than 0.1 mm, in particular in the direction of the x and y coordinate axes, wherein the x and y coordinate axes span a plane which lies parallel to a plane spanned by the carrier substrate.

Further preferably, the conductive paths of the first electrically conductive layer and of the second electrically conductive layer are structured, in particular structured in such a way that the conductive paths of the first electrically conductive layer and of the second electrically conductive layer form a plurality of area elements, preferably of rhombus-shaped or diamond-shaped area elements. Thus, it is possible for example for the first and second electrically conductive layers in each case to have a so-called diamond structure. This diamond structure is made by a plurality of in particular rhombus-shaped area elements along linear conductive paths. The first and second electrically conductive layers in each case have a plurality of diamond structures spaced apart from one another. The first and second electrically conductive layers are arranged one over the other in such a way that the two diamond structures are arranged at right angles to one another, therefore rotated 90° with respect to one another. In the process, the area elements of the first electrically conductive layer are arranged "in gaps" in the free interspaces between the area elements of the second electrically conductive layer. The linear conductive paths of the electrically conductive layers cross in the interspaces between the area elements. In this preferred embodiment variant, an accurate position of the area elements relative to one another is particularly important and the area elements are advantageously arranged register-accurately relative to one another with a tolerance of less than 0.25 mm, preferably less than 0.1 mm, in particular in the direction of the x and y coordinates.

It is possible here for the conductive paths to be molded in the region of the area elements according to the shape of the area elements, with the result that the material from which the electrically conductive layer is made fills the area elements over the whole surface. Further, it is possible for the conductive paths to run along the area elements, with the result that the conductive paths frame the area elements at least in regions. Thus, the area elements can be made of a whole-surface conductive layer or also of an electrically conductive layer which is only present in regions, in particular is gridded, and is made of conductive grid elements and in particular transparent non-conductive surface regions between the grid elements. The grids making grid elements can be regular or irregular. Here, regular and irregular grid surface areas can in particular also be arranged adjacent to one another or otherwise together make a complete grid. In particular, due to the gridding, the area elements can be semitransparent and have a surface coverage with grid elements of less than 50%.

Further, it is also possible for the electrically conductive structures of the first and second conductive layers made by the structured electrically conductive layers and/or the conductive regions of the electrically conductive layers in each case also to have different geometries and/or sizes.

Advantageously, the contacting regions, in particular the contacting structures, of the at least two electrically conductive layers are brought together in a common contacting region. It is hereby possible to facilitate a contacting from outside.

Further, it is possible for the common contacting region to be electrically contacted by means of an adapter element. Thus, it is possible for example for an in particular flexible adapter element, which electrically contacts the contact points in the common contacting region and connects them electrically conductively to a further contact element on the outside, to be fastened to the common contacting region. The contacting between the common contacting region and the adapter element is preferably effected by means of conductive adhesive, in particular by means of ACF bonding (ACF=anisotropic conductive film). It is possible here for the conductive adhesive to represent a connection element. The further contact element can, for example, be an in particular standardized plug-in connector, for example a ZIF connector (ZIF=zero insertion force).

It is advantageous for the conductive paths to be made of metal, in particular of silver (Ag), gold (Au), aluminum (Al), copper (Cu) or chromium (Cr), in a layer thickness of between 1 nm and 100 nm, preferably between 2.5 nm and 75 nm, further preferably between 5 nm and 50 nm. However, it is also possible for the conductive paths to have a layer thickness of between 100 nm and 5 μm.

It is also possible for the conductive paths to be made of an electrically conductive paste comprising silver (Ag), in particular conductive silver paste, gold (Au), copper (Cu) and/or carbon as well as, in particular, a binder.

Further or also in addition, it is possible for the at least one electrically conductive layer to have at least one layer of ITO (InSnOx=indium tin oxide=In$_2$O$_3$:SnO$_2$) and/or PEDOT (PEDOT=poly-3,4-ethylenedioxythiophene) and/or of AZO (AlZnOx=aluminum zinc oxide=Al:ZnO). The ITO and/or PEDOT and/or AZO layers are preferably applied over the whole surface by means of magnetron sputtering, sputtering or (vacuum) vapor deposition and less preferably by means of CVD and PVD processes and preferably have a layer thickness of from 1 nm to 100 μm, further preferably of from 10 nm to 10 μm.

The ITO and/or PEDOT and/or AZO layers are preferably arranged directly adjacent to electrically conductive layers made of metallic substances.

In step b2) and/or b3) the at least one electrically conductive layer preferably comprises at least one metal layer and/or a layer of ITO and/or AZO and/or PEDOT and/or conductive varnishes, in particular wherein step b) comprises one or more steps of the following further steps, in particular wherein the following further steps are carried out in the following sequence, preferably wherein the following further steps are carried out in a cyclic sequence:

b4a) applying the at least one electrically conductive layer in one or more partial steps;

b4b) structuring the at least one electrically conductive layer by removing the at least one electrically conductive layer at least in regions in one or more partial steps; and/or b5) applying the at least one electrically conductive layer in structured form in one or more partial steps.

To make the at least one electrically conductive layer, the carrier substrate is preferably here provided with an electrically conductive layer preferably over the whole surface, for example by vapor deposition or sputtering of a metal layer, and then the electrically conductive layer is removed again correspondingly in regions by positive or negative etching or by means of a washing process to make the electrical functional structure and contacting structure. Further, it is also possible, by means of vapor-deposition masks, by printing electrically conductive material and/or by galvanic reinforcement of a printed structure, for the at least one electrically conductive layer to be applied to the carrier substrate already in the design according to the functional structure and/or contacting structure.

The sensor film preferably comprises a dielectric layer and/or a semiconductive layer, which is arranged between a first electrically conductive layer of the at least one electrically conductive layer and a second electrically conductive layer of the at least one electrically conductive layer.

Further, it is possible for the at least one electrically conductive layer to have force sensors, in particular for measuring the compressive force. It is hereby possible that, in addition to the x and y coordinates, generated for example by a touch sensor field, in particular by the a capacitive sensor field, of the position of the touch on the plane defined by the x and y coordinates, the touch intensity can further be determined in the form of the z coordinate (z coordinate is perpendicular to x and y coordinates). An item of x, y and z information of the touch can hereby be generated. The z information can be utilized, for example, to control an electrical functional element to which the sensor film is applied as a function of a predefined threshold value of the z information being exceeded. Force sensors, in particular for measuring the compressive force, are preferably piezo-electric thin films. It is also possible for force sensors to be piezoresistive pressure sensors and/or piezoelectric pressure sensors. Further, it is possible for force sensors to be actuators, in particular push buttons, wherein each of the actuators has at least two electrical states as a function of the force acting on the actuators.

It is further possible for the at least one electrically conductive layer to have surface relief structures, in particular matte structures, at least in regions. It is hereby possible to deflect light incident on the at least one electrically conductive layer by diffraction, scattering and/or reflection, with the result that the impression that the electrically conductive layer reflects light, in particular in a direct mirror reflection, is avoided. Thus, for example, a display to which the sensor film is applied appears homogeneously black in the switched-off state.

It is also possible for one or more optically active layers, in particular darkening layers and/or layers with light-scattering properties, to cover the at least one electrically conductive layer at least in regions when observed perpendicular to a plane spanned by the carrier substrate. A possible visibility of the at least one electrically conductive layer, in particular in direct mirror reflection, can hereby be further reduced. Thus, for example, a darkening layer absorbs incident light, as a result of which the portion of the light reflected by the at least one electrically conductive layer is reduced or the reflection is completely prevented. The portion of the light reflected by the at least one electrically conductive layer is likewise reduced by layers with light-scattering properties. Layers with light-scattering properties are, for example, layers which have matte structures with stochastically chosen relief parameters.

Further, it is advantageous for the carrier substrate to have a layer thickness of between 2 µm and 250 µm, preferably between 23 µm and 125 µm. However, it is also possible for the carrier substrate to have a layer thickness of less than 2 µm.

Advantageously, overall the sensor film has a thickness of at most 150 µm, preferably 100 µm, further preferably 75 µm, perpendicular to the plane spanned by the underside of the carrier substrate.

The carrier substrate is preferably a transparent carrier substrate, in particular made of PET, PMMA, PC, acrylonitrile-butadiene-styrene (ABS), PU or glass.

It is possible for the carrier substrate to be made of a hybrid material which comprises plastic layers and layers of a fiber material.

It is also possible for the carrier substrate to consist of woven fabrics or knitted fabrics, for example woven or nonwoven textile fabrics. Here, the textile fabrics can in particular contain or consist of fibers made of natural fibers and/or plastic and/or carbon fibers.

Further, it is possible for the film to be a single- or multi-layered further sensor film. Here, through the application of the sensor film to the film in the form of the singleor multi-layered further sensor film, an intermediate product for further processing is preferably generated.

In particular, the sensor film comprises at least one intermediate adhesive layer. It is hereby possible for one or more further layers to be applied to the sensor film, wherein the adhesion of the one or more further layers is achieved through the intermediate adhesive layer.

The at least one electrically conductive layer is preferably arranged between the carrier substrate and the at least one intermediate adhesive layer.

Further, it is possible for the at least one intermediate adhesive layer to be arranged on the side of the carrier substrate facing away from the at least one electrically conductive layer. Thus, it is possible for the method further to comprise the following steps: f) applying an intermediate adhesive layer, in particular in such a way that the at least one electrically conductive layer is arranged between the carrier substrate and the at least one intermediate adhesive layer and/or that the at least one intermediate adhesive layer does not cover the at least one contacting region at least in regions when observed perpendicular to a plane spanned by the carrier substrate.

It is also advantageous if the at least one intermediate adhesive layer does not cover the at least one contacting region at least in regions when observed perpendicular to a plane spanned by the carrier substrate. Because the intermediate adhesive layer does not cover the at least one contacting region at least in regions it is ensured that the electrical functional structure can be reliably and robustly contacted after the sensor film has been applied to the film.

It is also expedient if the intermediate adhesive layer does not cover the at least one contacting region over the whole surface.

Further, it is advantageous if the intermediate adhesive layer covers the functional region at least in regions.

It is also possible for the at least one intermediate adhesive layer to be arranged substantially in the same region as the adhesion-promoting layer, when observed perpendicular to a plane spanned by the carrier substrate, in particular for the at least one intermediate adhesive layer to be arranged substantially congruent with the adhesion-promoting layer, when observed perpendicular to a plane spanned by the carrier substrate.

Advantageously, the intermediate adhesive layer has a layer thickness of between 0.1 µm and 50 µm, preferably between 0.25 µm and 25 µm, further preferably between 0.5 µm and 7 µm. The intermediate adhesive layer is preferably a primer layer and/or adhesive layer of a hot glue, a cold glue or a radiation-curable adhesive, in particular an adhesive curable by means of electromagnetic radiation and/or electron beam radiation. The intermediate adhesive layer is preferably applied by means of gravure printing, screen printing, relief printing or casting techniques.

It is also possible for the at least one sensor film and/or the at least one film to comprise one or more decorative layers.

It is possible for the one or more decorative layers on the sensor film to make a complete decoration with the one or more decorative layers and/or functional layers on the film, and/or to complement one another to make a complete decoration and/or for these layers to overlap. A complete decoration can be made in particular by adjacent decorative regions on the sensor film and/or on the film, which are preferably arranged directly adjacent or preferably adjacent with a spacing from one another. The decorations can in particular in each case be endless patterns or individual images. The complete decoration can in turn in particular be an endless pattern or an individual image or a combination thereof.

The one or more decorative layers are preferably arranged on the side of the carrier substrate facing away from the at least one electrical conductive layer. For this, the sensor film can have in particular an intermediate adhesive layer in order to improve the adhesion of the one or more decorative layers. Thus, for example, an intermediate adhesive layer, by means of which the one or more decorative layers are applied to the carrier substrate, can be applied to the carrier substrate and/or the at least one electrically conductive layer. The decorative layers can then be applied to the intermediate adhesive layer or directly to the carrier substrate by means of various methods. It is particularly advantageous if the decorative layers have, as final layer, on the side of the carrier substrate facing away from the at least one electrical conductive layer, a protective layer, which protects the decorative layers in particular from the strong pressure and heat effects acting for example in the case of injection-molding and/or lamination processes. Furthermore, the protective layer protects from mechanical damage which can occur during the processing, such as e.g. scratches etc. This protective layer can also contain polymeric and in particular self-supporting films, preferably made of PET, PC or PMMA or also of glass or woven fabric, which remain on the decoration and form a component of the intermediate or end product.

Advantageously, are the one or more decorative layers are arranged substantially in the same region as the adhesion-promoting layer and/or the intermediate adhesive layer, in particular the one or more decorative layers are arranged substantially congruent with the adhesion-promoting layer and/or the intermediate adhesive layer, when observed perpendicular to a plane spanned by the carrier substrate.

Thus, it is possible for the one or more decorative layers to be applied partially to the side of the carrier substrate facing away from the at least one electrical conductive layer in such a way that they cover substantially the same surface area as the adhesion-promoter layer on the other side of the carrier substrate. It is thus achieved that the contacting region not covered by the adhesion-promoter layer on the side of the carrier substrate facing away from the at least one electrical conductive layer remains free in the same (projected) surface region and as a result the sensor film can make a so-called tail with the contacting region which, in subsequent processing steps, can be electrically contacted in a particularly simple manner, for example by means of a plug-in connection.

It is also possible for the one or more decorative layers to be arranged on the side of the adhesion-promoting layer and/or of the intermediate adhesive layer facing away from the carrier substrate.

Further, it is also possible for the one or more decorative layers to be arranged on the side of the at least one electrically conductive layer facing away from the carrier substrate.

The one or more decorative layers are preferably applied substantially congruent with the adhesion-promoting layer and in particular likewise leave the at least one contacting region uncovered. Here too, it can be advantageous if the decorative layers have, as final layer, on the side of the at least one electrically conductive layer and/or the intermediate adhesive layer facing away from the carrier substrate, a protective layer which protects the decorative layers in particular from the strong pressure and heat effects acting for example in the case of injection-molding and/or lamination processes. Furthermore, the protective layer protects from mechanical damage which can occur during the processing, such as e.g. against scratches etc. This protective layer can also contain polymeric and in particular self-supporting films, preferably made of PET, PC or PMMA or also of glass or woven fabric, which remain on the decoration and form a component of the end product.

Advantageously, the at least one intermediate adhesive layer is arranged between the carrier substrate and the one or more decorative layers.

The one or more decorative layers preferably comprise at least one of the layers selected from the group protective layers, color varnish layers, metal layers, reflective layers, replication varnish layers, transparent layers, carrier layers and/or layers generating an optically variable effect.

The one or more decorative layers preferably have for example a printed layer, in particular of an opaque and/or colored ink, which makes a frame around the functional region. The decorative layers can cover the sensor film and in particular also the functional region also over the whole surface or partially and/or be applied in a grid. The decorative layers can represent a uniform surface and/or an endless pattern and/or an individual image motif. The decorative layers can be opaque and/or semitransparent and/or transparent, in particular dyed transparent, over the whole surface or partially.

Thus, it is possible for example for the one or more decorative layers to be applied to, in particular stamped and/or printed on, the adhesion-promoting layer and/or the intermediate adhesive layer. The one or more decorative layers can, for example, be applied to the side of the adhesion-promoting layer and/or the intermediate adhesive layer facing away from the carrier substrate by means of hot stamping and/or by means of cold stamping and/or by means of thermal transfer processes and/or by means of different lamination processes and/or other known processes. It is hereby possible for example to provide the sensor film with a decorative layer or a decoration, with the result that, in addition to a function in the form of a touch sensor field provided by the electrical functional structure, the sensor film additionally has a decoration. The one or more decorative layers can comprise further layers, such as for example protective varnish layers and/or color layers and/or metal layers and/or transparent reflective layers and/or replication varnish layers and/or various types of layer structures generating an optically variable effect.

Further, it is possible for the one or more decorative layers to comprise at least two decorative layers, in particular to comprise a first decorative layer and a second decorative layer.

It is likewise possible for the one or more decorative layers to be arranged on the side of the carrier substrate facing away from the at least one electrically conductive layer and also on the side of the at least one electrically conductive layer facing away from the carrier substrate. Thus, it is possible for example for a first decorative layer to be arranged on a first side of the carrier substrate and a second decorative layer to be arranged on a side of the carrier substrate lying opposite the first side, with the result that the one or more decorative layers are arranged on both sides of the carrier substrate.

Further, it is advantageous if at least two decorative layers interact with one another here in such a way that particular optical effects, for example optical depth effects and/or particular optical overlay effects, are generated. For example, the first decorative layer, facing the observer, can represent a color filter layer for the second decorative layer, facing away from the observer, thus lying underneath it in the viewing direction, which is a color layer, for example. Overlay effects or combination effects by means of two patterns which complement one another to make a moiré pattern or also result in other complementary combination patterns when superposed are likewise possible.

Further, optically variable combination effects which only form when the at least two decorative layers are superposed are possible. It can be advantageous here for the decorative layers to be spaced apart from one another, for example because in particular the carrier substrate and the electrically conductive layer and optionally still further layers, in particular transparent layers, are arranged between the decorative layers. Such a spacing can be advantageous in particular for generating depth effects and/or optically variable effects. A depth effect can be generated, for example, by inserting optically transparent layers in front of the decorative layers and/or behind the decorative layers, in the observation direction, and/or as a component of the decorative layers. The optically transparent layers preferably have the same layer thickness as the respective decorative layers or a layer thickness multiple times thicker than the respective decorative layers, in particular the layer thickness of the optically transparent layers is between 0.5 μm and 500 μm, preferably between 10 μm and 100 μm. The optically transparent layers preferably consist of optically transparent varnishes and/or optically transparent films preferably made of PET, PMMA or PC.

An optically variable effect is possible, for example, by arranging the above-named optically transparent layer, as spacer layer, between a reflective layer and a semitransparent reflective layer, and by interference effects occurring within this layer structure, which are recognizable by a color change effect dependent on the observation angle and/or the illumination angle. Such interference layer structures are already known as Fabry-Perot thin film structures.

Further, it advantageous if at least one of the one or more decorative layers has, at least in regions, a surface relief structure, in particular a haptically and/or tactilely detectable surface relief structure.

Thus, it is also possible for surface morphologies, in particular surface relief structures, which in particular make haptic or tactile effects possible, to be generated through the structuring of the optically transparent layers and/or the protective layers and/or the one or more decorative layers. Further, it also possible for the surface relief structures to generate diffractive and/or refractive optical effects. These surface relief structures can be generated through additional partially printed varnishes or mechanical structuring or optical structuring of the layer surface. A mechanical structuring can be a replication with a correspondingly formed stamping tool. An optical structuring can be a laser ablation. Furthermore, photolithographic processes can also be used to generate these structures. The structure depths for such haptic effects are in particular 1 μm to 2000 μm, preferably 50 μm to 2000 μm. The structure depths for diffractive or refractive effects are in particular 0.1 μm to 20 μm, preferably 0.1 μm to 5 μm.

It is likewise possible merely to simulate haptic surface relief structures of this type because real haptic structures are often mechanically susceptible, in particular to scratching and/or wear, and also become dirty more easily than a smooth surface.

For this reason, it makes sense, as described above, to introduce the haptic structures into a corresponding surface and/or to apply them thereto. A transparent cover ply, which seals the haptic structure and has a smooth surface towards the outside, can then be applied to this surface. This cover ply is preferably highly transparent and thicker than the height of the haptic structures, preferably at least twice as thick. Furthermore, the cover ply preferably has a refractive index deviating by at least 0.2 from that of the layer having the haptic structure and lying under it, in order thereby to create an optical interface, as a result of which the visibility of the haptic structure is increased. For this, the cover ply can contain nanoscale particles for modulating the refractive index consisting of one or more constituents selected from $TiO_2$, $SiO_2$, Sn or metal chalcogenides (oxides, sulfides), as well as metals Au, Ag, Cu.

The tactile and/or the merely optically simulated haptic surface relief structure can correspond to the functional touch sensor fields, i.e. bring out or mark the functional region thereof, with the result that a "blind" feeling of the touch function is made possible. However, it is likewise possible for the tactile and/or the merely optically simulated haptic structure to be provided over the whole surface, in order to achieve a particular surface characteristic of the film, in particular consistent with its other optical appearance. Both possibilities can also be present combined. Thus, it is possible for example to combine a wood decoration with a haptic wood grain, the structure depth and/or another structural parameter of which is modified in the region of the touch function, in particular in the functional region, with the result that the touch sensor field can be felt by a user within the grain.

It is also possible for the sensor film to have a structure with the following order:

carrier substrate
    separation layer
    protective varnish layer
    primer varnish layer
    at least one electrical conductive layer
    intermediate adhesive layer
    one or more decorative layers
    adhesion-promoting layer.

It is also possible for the sensor film to have an adhesive layer on the side of the carrier substrate facing away from the at least one electrically conductive layer.

The sensor film can thus have the adhesion-promoting layer on one side of the carrier substrate and the adhesive layer on the other side of the carrier substrate, with the result that the sensor film can be applied to a further substrate by means of the adhesive layer. The application of the sensor film to the further substrate can be effected, for example, by means of hot lamination or by means of back-injection molding. In particular in the case of back-injection molding of the sensor film, the at least one electrically conductive layer and/or the one or more decorative layers are protected through the carrier substrate by the injected injection-molding material and in particular from the harsh process conditions with high pressure and high temperature during the injection-molding process.

Further, it is advantageous if the sensor film has at least one register mark for determining the relative location or position of the sensor film, in particular of the functional region and/or of the at least one contacting region of the at least one electrically conductive layer.

By register or register accuracy is preferably meant here the positionally accurate arrangement of layers lying one over another or next to one another relative to one another in compliance with a desired positional tolerance. Thus, through a register mark it can in particular be ensured that the sensor film can be applied to a film positionally accurately in compliance with a desired positional tolerance. The register mark is preferably formed of a printed substance and/or of a magnetic or conductive material. The marks can thus, for example, be optically readable register marks, which differ from the background in their color value, their opacity or their reflective properties. However, the register marks can also be register marks detectable by means of a magnetic sensor or one detecting the electrical conductivity. The register marks are detected, for example, by means of an optical sensor, in particular a camera, a magnetic sensor or a mechanical sensor, a capacitive sensor, or a sensor detecting the conductivity, and then the application of the sensor film can be controlled by means of the register marks. The positionally accurate arrangement of the sensor film on the film is thus made possible through the register marks. An identical production quality of, for example, touch screens can hereby be improved and, at the same time, the elimination due to incorrect placement of the sensor film on the film can be further reduced.

The sensor film is preferably a hot-laminating film.

Among other things, preferred designs of the method for producing an electrical functional element, as well as of the electrical functional element, are described in the following:

Further, it is advantageous for the sensor film to be applied to the film in step b2) from a roll by means of hot lamination, in particular at a sensor film web speed of between 1.5 m/min and 3.5 m/min. It is possible here for the roll to comprise a sensor film web with several or a plurality of sensor films as a panel. It hereby becomes possible further to improve an industrial mass production in particular. Thus, it is possible for example to apply the sensor film to a film over the whole surface by means of a hot-laminating machine, with the result that the effort in terms of time, personnel and logistics can be further reduced and, at the same time, an identical production quality can be ensured.

Further, it is advantageous for the sensor film to be applied to the film in step b2) from a sheet by means of hot lamination. It is possible here for the sheet to comprise several or a plurality of sensor films as a panel. It hereby becomes possible further to improve an industrial mass production in particular. Thus, it is possible for example to apply the sensor film to a film over the whole surface by means of a hot-laminating machine, with the result that the effort in terms of time, personnel and logistics can be further reduced and, at the same time, an identical production quality can be ensured.

It is also possible for the sheet to comprise only one sensor film as a panel. Several such sheets with in each case one sensor film can in particular be present as a stack in a magazine and correspondingly be fed individually to a hot-laminating machine, which can operate for example using the vertical or roll-on process, and/or to an injection-molding machine for application to the film. As described previously, the positionally accurate application to the film is then effected via the register marks on the sensor film.

Further, it is advantageous if, before the application to the film, separate one or more sensor films are arranged detachably on an interim substrate, which can be present as a roll or as a sheet. The interim substrate can be, for example, a silicone-coated paper or a sensor film web provided with a detachment layer. In a subsequent heat transfer step and/or in a subsequent injection-molding process, one or more sensor films can then be transferred together or in each case separately from the interim substrate to the film by means of the action of heat and/or pressure. Then, the interim substrate can in particular be peeled off the sensor film adhering firmly to the film.

It is further possible for the hot lamination to be effected at a temperature in the range between 80° C. and 300° C., preferably between 200° C. and 290° C., further preferably between 240° C. and 270° C., and/or to be effected with a stamping pressure in the range between 10 bar and 2000 bar, preferably between 500 bar and 1500 bar.

It is also possible, as an alternative to the hot lamination in step b2), for the sensor film to be applied to the film by injecting an injection-molding material, wherein in particular the injection-molding material forms the film. Thus, it is possible for the sensor film to be firmly joined to the injection-molding material by the adhesion-promoting layer.

It is also possible for the sensor film to be joined to a further substrate by injecting an injection-molding material.

Further, it is advantageous, in particular when the sensor film is designed as a transfer film, for the sensor film to be applied to the film by means of hot stamping in step b2). It is possible here for the sensor film to be applied to the film from a roll or from a sheet by means of hot stamping.

It is possible here for the roll to comprise a sensor film web with several or a plurality of sensor films as a panel, and/or for the sheet to comprise several or a plurality of sensor films as a panel. It hereby becomes possible further to improve an industrial mass production in particular. Thus, it is possible for example to apply the sensor film to a film over the whole surface by means of a hot-stamping machine, with the result that the effort in terms of time, personnel and logistics can be further reduced and, at the same time, an identical production quality can be ensured.

It is further expedient if the stamping temperature lies in a range of from 80° C. to 250° C., preferably in a range of from 100° C. to 200° C., and/or if the stamping pressure lies in a range of from 0.5 kN/cm$^2$ to from 10 kN/cm$^2$. Further, it is also expedient if the stamping time lies in a range of from 1 ms to 20,000 ms, preferably in a range of from 100 ms to 10,000 ms. Stamping takes place, for example, by means of a vertical process, in particular wherein the stamping time is from 2 s to 5 s.

Further, it is possible for the further substrate and/or the film to be flat and/or to have a one-dimensionally curved and/or a two-dimensionally curved and/or a three-dimensionally curved shape.

It is also possible for the sensor film and/or the electrical functional element, in particular the electrical functional element made from the film and the sensor film, to be formed, in particular formed three-dimensionally. Advantageously, the forming takes place by means of forming processes, preferably by means of deep drawing, thermoforming, High Pressure Forming and/or by means of an injection-molding process. Here, the film and/or the interim substrate preferably has a layer thickness of at most 1 mm, preferably 500 μm, with the result that the electrical functional element made from the sensor film and the film can be formed.

Among other things, preferred forming processes for forming the sensor film and/or the electrical functional element are described in the following, wherein in particular the electrical functional element is made by the sensor film arranged on, in particular applied to, a film:

The sensor film and/or the electrical functional element are preferably formed by means of deep drawing. Advantageously, the forming of the sensor film and/or of the electrical functional element is effected here by means of a vacuum, in particular at a negative pressure of at most 1 bar, and/or by means of positive pressure support, in particular at a positive pressure of between 1 bar and 20 bar, preferably at a positive pressure of between 1 bar and 10 bar, in a forming tool corresponding to the desired forming geometry.

Further, it is possible for the sensor film and/or the electrical functional element to be formed by means of thermoforming. Advantageously, the forming process of the sensor film and/or of the electrical functional element, or the process parameters of the forming process, corresponds to that/those of the deep drawing, wherein the forming is effected with an additional temperature support, in particular at a temperature of between 120° C. and 300° C., preferably between 190° C. and 250° C., for example when ABS material is used. It is possible here for either the carrier substrate and/or the film to have ABS material.

It is also possible for the sensor film and/or the electrical functional element to be formed by means of High Pressure Forming. Advantageously, the forming of the sensor film and/or of the electrical functional element is effected here by means of positive pressure support, in particular at a positive pressure of between 1 bar and 300 bar, preferably between 10 bar and 150 bar, in a forming tool or forming station corresponding to the desired forming geometry. It is expedient here for the forming to be effected with an additional temperature support, preferably at temperatures in the region of the glass transition temperature of the sensor film used. Advantageously, the temperature here is between 80° C. and 300° C., preferably between 140° C. and 250° C., for example when PC material is used.

By means of the above-mentioned forming processes, three-dimensional stretching of up to 200% is preferably achieved. It is also possible, in particular when optimizing the parameters for the respective system, to achieve stretching up to 300%, wherein stretching of between 20% and 50% is sufficient in many applications.

Further, it is possible for the sensor films and/or electrical functional elements formed or pre-formed by means of the above-mentioned forming processes to be front- and/or back-injection molded in a subsequent injection-molding process.

The sensor films and/or electrical functional elements formed or pre-formed by means of the above-mentioned forming processes can in particular be used directly, i.e. without further injection processes.

Further, it is also possible for the sensor film and/or the electrical functional element to be formed and/or deformed by means of an injection-molding process. Advantageously, the sensor film and/or the electrical functional element is here introduced into the injection mold in the flat state via a roll or via a sheet or via an individual label and deformed by means of the injection-molding process, in particular wherein the shaping is effected by closing the mold and also by injecting the molding material. Here, the injection pressure in particular is dependent on the component geometry and/or the component size. For example, it is possible for the injection pressure to be 500 bar and the injection temperature to be between 180° C. and 380° C., wherein injection pressure and injection temperature are dependent on the injection-molding material. Further, it is also expedient for the sensor film and/or the electrical functional element introduced into the injection mold to be heated before the closing process of the injection mold by means of warming the sensor film and/or the electrical functional element, for example at temperatures of between 30° C. and 300° C., preferably between 80° C. and 150° C. It is also possible for the sensor film and/or the electrical functional element to be fitted or fixed in the cavity by means of a clamp frame and/or vacuum and/or positive pressure.

It is also advantageous to form the sensor film and/or the electrical functional element by means of "pulling" the sensor film and/or the electrical functional element over an already three-dimensionally pre-formed component. Advantageously, the "pulling over" of the sensor film and/or of the electrical functional element is effected in one process by controlling a vacuum suction of the sensor film and/or of the electrical functional element against the already three-dimensionally pre-formed component with simultaneous positive pressure. Here, the already three-dimensionally pre-formed component to be pulled over is preferably exposed to temperature in advance. Here, it is expedient if the positive pressure is between 1 bar and 50 bar, preferably between 3 bar and 15 bar, and/or the temperature is between 30° C. and 300° C., preferably between 100° C. and 180° C.

The sensor film and/or the electrical functional element preferably has a stretchability of more than 20%. High stretchabilities of this type cannot be achieved, for example, by means of the above-mentioned forming and/or deforming processes with conventional functional films, in particular because the carrier film made of PET, for example, is not deformable enough and/or the conductive structures already break after a slight deformation, in particular in the case of stretching of more than 20%. Here, it has been shown that the stretching is improved by the sensor film. Thus, through the multi-layered structure of the sensor film, in particular through the at least one electrically conductive layer embedded between several varnish layers according to a sandwich system, as described above, it is achieved that the mechanical stretching and/or deforming can be influenced in a targeted manner, because particular regions of the sensor film can be designed to be more flexible or less flexible, for example, by adapting the layer thicknesses and/or the varnish formulations. The desired stretchability of more than 20% is thus preferably achieved here.

In the case of the above-mentioned three-dimensional deformations, it is also advantageous if the electrical functional structure of the sensor film and/or of the electrical functional element can be electrically, in particular galvanically, contacted from the outside, which is why the electrical contacts must be accessible for a contacting. Alternatively, an inductive and/or capacitive coupling, in particular a coupling via an antenna, can be realized. As stated above, a robust and reliable contacting of the electrical functional structure is made possible by the sensor film. In particular, in this way, further electrical components, such as for example LEDs (light emitting diodes), can be integrated, for example.

Further, it is possible for the adhesion-promoting layer to consist of a material the optical appearance of which changes from cloudy to highly transparent and/or clear during and/or after step b2). Thus, it is possible, during the application of the sensor film to the film, for the adhesion-promoting layer to be melted on due to supplied heat and/or for the adhesion-promoting layer to be leveled by means of pressure, with the result that the surface roughness of the adhesion-promoting layer present in the state of the sensor film when it has not been applied is evened out during and/or after the application. The optical appearance of the adhesion-promoting layer hereby changes from cloudy to highly transparent and/or clear.

After application of the sensor film to a film, the sensor film in particular makes an electrical functional element with the film. Advantageously, after application of the sensor film to the film, the adhesion-promoting layer of the sensor film is highly transparent, in particular the adhesion-promoting layer of the sensor film has a transmission of light in the wavelength range between 380 nm and 780 nm of more than 85%, preferably more than 90%, and/or the adhesion-promoting layer of the sensor film is a clear adhesion-promoting layer, in particular light in the wavelength range between 380 nm and 780 nm is deflected by less than 8%, preferably by less than 4%, by scattering by the adhesion-promoting layer of the sensor film. It is also possible for the sensor film to have, at least in the one functional region of the at least one electrically conductive layer, a transmission of light in the wavelength range between 380 nm and 780 nm of more than 75%, preferably more than 80%, further preferably more than 85%, still further preferably more than 90%. A brilliant and faithful observation of an image generated by a display to which the sensor film is applied can hereby be achieved, for example.

Further, it is possible for the electrical functional element to be a functional element for information processing, in particular a cell phone, such as for example a smartphone or a PDA, a tablet computer, an ATM, a travel ticket machine, a gaming machine, a games console, a control unit of a domestic appliance or of a motor vehicle or, for example, to be a touch screen. It is also possible for the electrical functional element to be an input device, in particular a touch panel. However, it is also possible for the electrical functional element to be an intermediate product, which, in further processing steps, is used in or to make an end product. Thus, the sensor film can be applied to a glass layer, for example, and the electrical functional element made from the glass layer and the sensor film can be built into a travel ticket machine, for example.

At least one sensor film of the at least one sensor film in step b) preferably has one or more sensors and/or electrical components, in particular LEDs, in particular has one or more touch sensors and/or one or more display devices.

It is possible for at least one sensor film of the at least one sensor film in step b) to have one or more contact regions, in particular wherein one or more contact regions of the one or more contact regions are covered at least in regions by no film or layer, preferably wherein one or more contact regions of the one or more contact regions are arranged on a surface of the at least one sensor film of the at least one sensor film facing away from the at least one film.

In the case of insert molding a transfer film is preferably applied to an in particular even, flat substrate. Then, the carrier film is peeled off, preferably wherein the applied transfer plies absorb the tensile forces of the deformation during the subsequent deep drawing or forming of the substrate coated with the transfer plies between two tool halves of a deep-drawing or forming tool. Here, in particular in the region of protective layers, cracks etc. can often occur in tight radii.

Further, it is possible for the at least one film in step a) and/or the at least one sensor film in step b) and/or the at least one film and/or the at least one sensor film a further step to have at least one decoration and/or at least one decorative film at least in regions.

In particular, it is possible for the forming of the at least one film comprising the at least one sensor film in step c) to be carried out by means of one or more forming processes, in particular selected from the following forming processes: deep drawing, thermoforming, High Pressure Forming, injection-molding process.

The radius of curvature of the at least one film and/or of the at least one sensor film after step c) is preferably smaller than 1000 mm, in particular smaller than 200 mm, further preferably smaller than 100 mm, at least in regions, and/or wherein the stretching of the at least one film and/or of the at least one sensor film is greater than or equal to 1%, in particular greater than or equal to 20%, preferably greater than or equal to 50%, in particular preferably greater than or equal to 300%.

It is possible for the method to comprise the following further step:

e) injection molding the one or more punched-out film elements.

In particular, in step d) one or more holes or through punches are introduced into the one or more film elements, in particular wherein one or more holes of the one or more holes have the function of an injection duct for a plastic material during the injection molding in step e).

It is possible for step e) to comprise one or more steps of the following further steps, in particular wherein the following further steps are carried out in the following sequence, preferably wherein the following further steps are carried out in a cyclic sequence:

e1) providing at least one decorative film, which in particular has at least one opaque coating at least partially;

e2) introducing at least one decorative element of at least one decoration into the at least one decorative film by processing in at least one processing station;

e3) inserting the one or more punched-out film elements and the at least one decorative film into an injection-molding station, wherein the injection-molding station comprises a first mold half and a second mold half, wherein the first mold half and the second mold half, in particular in a closed state, make an injection-molding cavity for molding at least one plastic body, wherein the at least one punched-out film element is attached to a first wall of the injection-molding cavity and/or the at least one decorative film is attached to a second wall of the injection-molding cavity, in particular wherein the second wall is arranged lying opposite the first wall;

e4) injection molding the one or more punched-out film elements and the at least one decorative film with a plastic material to make a plastic component comprising the at least one plastic body in such a way that the one or more punched-out film elements make a first surface of the plastic component and the at least one decorative film makes a second surface of the plastic component, in particular wherein the first surface lies opposite the second surface;

e5) opening the injection-molding station by moving the first mold half and the second mold half apart, in particular at the end of a cooling time of the at least one plastic body comprised in the plastic component;

e6) removing the plastic component.

Further, it is possible for step e) to comprise one or more steps of the following further steps, in particular wherein the following further steps are carried out in the following sequence, preferably wherein the following further steps are carried out in a cyclic sequence:

e7) inserting a first punched-out film element of the one or more punched-out film elements and/or a second punched-out film element of the one or more punched-out film elements into an injection-molding station, wherein the injection-molding station comprises a first mold half and a second mold half, wherein the first mold half and the second mold half, in particular in a closed state, make an injection-molding cavity for molding at least one plastic body, wherein the first punched-out film element is attached to a first wall of the injection-molding cavity and/or the second punched-out film element is attached to a second wall of the injection-molding cavity, in particular wherein the second wall is arranged lying opposite the first wall;

e8) injection molding the first punched-out film element and/or the second punched-out film element with a plastic material to make a plastic component comprising the at least one plastic body in such a way that the first punched-out film element makes a first surface of the plastic component and/or that the second punched-out film element makes a second surface of the plastic component, in particular wherein the first surface lies opposite the second surface;

e9) opening the injection-molding station by moving the first mold half and the second mold half apart, in particular at the end of a cooling time of the at least one plastic body comprised in the plastic component;

e10) removing the plastic component.

Through steps e1) to e6) and/or e7) to e10), in particular a plastic component can be produced which comprises at least one decorative film, which has an opaque coating at least partially, in which a decoration is introduced, and which comprises one or more punched-out film elements, wherein the at least one decorative film makes a first surface and the one or more film elements preferably make at least one second surface of the plastic component lying opposite the first surface.

In step e2) and/or e7) it is possible for the introduction of the at least one decorative element of a decoration into the at least one decorative film to be effected in particular by laser radiation and/or by milling and/or punching. The processing tool is therefore preferably a laser and/or a milling tool and/or a punching tool.

The at least one decorative film and the one or more film elements preferably form a protection for the first and the at least one second surface of the plastic component, with the result that it is particularly durable.

The at least one decoration and/or the at least one decorative element is preferably introduced into the at least one decorative film after the back-injection molding by laser irradiation and/or by milling and/or by punching. As a result, it is possible to place or to position the decoration and/or the at least one decorative element particularly precisely because important work steps (in particular the positioning of the decorative films in the injection mold and the back-injection molding) which disrupt or negatively influence the placing and/or positioning of the decoration and/or of the at least one decorative element have already been effected.

Alternatively, it is also possible, however, for the at least one decoration and/or the at least one decorative element to be introduced into the at least one decorative film before the injection molding, in particular before the insertion of the at least one decorative film into the injection-molding station, by laser irradiation, milling or punching.

In the case of the introduction of the at least one decoration and/or of the at least one decorative element into the at least one decorative film by laser irradiation, waterjet cutting, milling or punching, the at least opaque coating is preferably at least partially removed in the region processed with the processing tool and/or the opacity of the at least one opaque coating is at least partially reduced in the region processed with the processing tool.

Through laser irradiation, waterjet cutting, milling or punching it is possible to structure, in particular to ablate, the at least one opaque coating precisely, in order preferably to introduce backlightable symbols or further decorative elements here. The material of the opaque coating is heated and evaporated and thereby ablated in particular where it is struck by the laser beam. In the case of the milling or punching, the material of the opaque coating is preferably removed mechanically.

In particular after the introduction of the at least one decoration and/or of the at least one decorative element into the at least one decorative film, the region processed with the processing tool and the region not processed with the processing tool preferably have a difference in transparency such that it is detectable by a human observer when observed in transmitted light, preferably without aids. Here, the difference in transparency is in particular at least 5%, preferably at least 10% to 75%. It is preferably hereby ensured that there is a sufficient contrast in the at least one decoration, with the result that in particular at least one sharp and easily recognizable decoration is formed.

The at least one opaque coating is preferably applied by printing, in particular screen printing or gravure printing. It is possible for the printing to be effected here over the whole surface or partially. It is also possible to perform several printing procedures in a sequence, in order in particular to achieve the desired degree of coverage or the desired opacity. It is further possible for further layers, such as for example colored transparent or translucent layers, protective varnishes or the like, to be printed as well, over the whole surface or partially.

Alternatively, it is possible for the at least one opaque coating to be applied by means of at least one transfer film. Here too, it is possible for a full-surface or partial application to be effected. A transfer film of this type usually comprises at least one carrier layer, at least one optional detachment layer, as well as one or more decorative layers, which in particular have different degrees of coverage, as at least one transfer ply, and/or at least one adhesive layer. After the application of the at least one transfer film, the at least one carrier layer is peeled off, wherein the at least one transfer ply remains on the at least one decorative film with the further layers. The at least one opaque coating is then formed by at least one decorative layer of the at least one decorative layer.

The at least one opaque coating preferably has a thickness of less than 100 µm, in particular has a thickness of between 5 µm and 50 µm. In particular, on the one hand the required opacity is ensured here and on the other hand the production of a thin and optionally flexible plastic component is ensured.

Furthermore, it is preferred if the at least one decorative film has at least one further at least partial coating, in particular a transparent or translucent colored coating, a protective varnish coating and/or an adhesive coating. As explained above for example, coatings of this type are preferably applied by printing or by means of a transfer film. Combinations of these techniques are also possible. Preferably, as a result, additional visual effects are realized or additional functions are integrated in the decorative film.

The at least one decoration and/or the at least one decorative element preferably is or comprises a logo, a symbol and/or at least one alphanumeric character. These elements are in particular also combined with abstract graphic design elements as decorative elements. The at least one decoration preferably has a purely ornamental function. Further, it is possible for the at least one decoration preferably also or exclusively to be functional and, for example, to fulfil the function of a display device element and/or control element of a device and/or to be made as a display device element and/or control element, such as for example status indicators, control panels or the like.

At least one further decorative element is preferably introduced into the at least one decorative film by punching. It is hereby possible to provide large-area cutouts for display device elements, for backlighting or the like, in particular without a lengthy laser or milling treatment of these regions becoming necessary.

It is further preferred if the at least one decorative film and/or the one or more film elements are formed before the insertion into the injection mold. It is hereby possible to generate so-called inserts, which can be three-dimensionally deformed before the injection molding in particular comparatively strongly, such as is often not possible during the injection molding.

Usual forming processes are preferably used here. As a rule, the at least one decorative film is provided in sheets and inserted into a forming tool which has the desired final contour. The at least one decorative film is brought into a deformable state through the application of heat, preferably a temperature of from 80° C. to 200° C. It is possible here for the film, in particular the at least one decorative film and/or the one or more film elements, to be adapted to the shape of the first and/or second mold half in the forming station through the application of a vacuum and/or through the application of a form punch and/or positive air pressure, and in the process in particular to be brought into the desired final contour. During cooling, the material of the at least one decorative film and/or of the one or more film elements cures again, with the result that it retains the final contour.

After the forming, it is optionally possible to allow another mechanical finishing to be effected, for example by clipping (mechanically or by means of laser or by means of waterjet), milling, punching or the like.

Here, the at least one decorative film preferably has a thickness of from 50 µm to 2000 µm, in particular wherein on the one hand a good mechanical stability is ensured and on the other hand a problem-free forming is made possible.

The at least one decorative film preferably has at least one ply made of a colorless or colored transparent or translucent thermoplastic material, in particular made of ABS, ABS/PC, PC/ABS, PC, PP or PMMA. This acts as carrier for the opaque coating and any further layers which may be present, in particular wherein it is itself backlit. A problem-free forming is possible due to the thermoplastic nature of the named materials.

The at least one decorative film and/or the one or more film elements are preferably inserted in the injection-molding station with a spacing from one another of from 0.5 mm to 10 mm, preferably of from 0.8 mm to 5 mm, in particular wherein this spacing determines the wall thickness of the finished plastic component determines.

Further, it is possible to introduce at least one core into the injection-molding station between the at least one decorative film and/or the one or more film elements. As a result, cavities or cutouts are preferably introduced into the plastic component, which are utilized in particular for receiving functional elements, for example separate components such as display devices, switches, regulators or separate backlighting devices and/or touch sensors or the like. Here, the at least one core is preferably introduced into the interspace between the at least one decorative film and/or the one or more film elements through at least one punching in the at least one decorative film and/or the one or more film elements.

The plastic material is preferably transparent or translucent, in particular with a transparency of from 5% to 98%, and preferably comprises one of the following materials: ABS (acrylonitrile-butadiene-styrene copolymer), PC (polycarbonate), ABS/PC, PC/ABS, PMMA (polymethyl methacrylate), PP (polypropylene), PA (polyamide), TPU (thermoplastic polyurethane). As a result, it is possible to achieve a good backlighting of the plastic component. Injection molding, in particular at temperatures of from 200° C. to 300° C., is preferably suitable for processing the above materials. The required injection pressure is in particular dependent here on the part size, part geometry and wall thickness, and in particular vary over a large range.

Furthermore, it is possible for steps d) and/or e) to be carried out using an injection-molding station, wherein the injection-molding station has a first mold half comprising a first mold recess and a second mold half, wherein the first mold half and/or the second mold half has at least one injection duct, wherein the first mold half and the second mold half, in particular in a closed state, make an injection-molding cavity for molding at least one plastic body, wherein steps d) and/or e) comprise one or more steps of the following further steps, in particular wherein the following further steps are carried out in the following sequence, preferably wherein the following further steps are carried out in a cyclic sequence:

e11) providing the one or more punched-out film elements and/or at least one section of at least one decorative film on the first mold half and/or on the second mold half in such a way that, when the first mold half and second mold half are closed, the one or more punched-out film elements and/or the at least one decorative film rest on an end face of the raised edge region bordering the first mold recess and surrounding the first mold recess;

e12) closing the first mold half and the second mold half until, in the region of the end face of the raised edge region between the first mold half and the second mold half, a gap is formed between the end face of the raised edge region of the first mold half and the corresponding end face of the second mold half at least over a partial region, and the gap is sealed by the one or more punched-out film elements squeezed in the region of the gap and/or the at least one interposed decorative film squeezed in the region of the gap;

e13) injection molding a plastic material through the injection duct into the injection-molding cavity made by the closed first and second mold halves, wherein the at least one decorative film and/or the one or more film elements are back-injection molded in the region enclosed by the raised edge region with the plastic material, in particular without plastic material seeping through the sealed gap, wherein a plastic component comprising the at least one plastic body is made;

e14) opening the first and second mold halves by moving the first and/or second mold halves away from one another and removing the plastic component comprising the at least one plastic body from the injection-molding station;

e15) removing the remaining section of the at least one decorative film and providing at least one further section of the at least one decorative film.

Steps e11) to e15) are preferably characterized in that the mold wear of an injection mold integrated in the injection-molding station for severing the at least decorative film by squeezing is considerably reduced and at the same time the amount of time required for producing a plastic component is hereby also reduced.

It is possible that, during the squeezing of the one or more film elements and/or of the at least one decorative film and the optional severing of the one or more film elements and/or of the at least one decorative film, in particular in step e12), the one or more film elements and/or the at least one decorative film is compressed to less than 50% of its thickness, preferably to 20% to 10% of its thickness. In method step e12) it is possible in particular, in addition to the compressing of the one or more film elements and/or of the at least one decorative film, to bring about a tearing of the one or more film elements and/or of the at least one decorative film and in particular here a partial severing, preferably wherein the degree of the severing is dependent on the material.

Further, it is possible for the decorative film to be at least partially severed in step e12) by squeezing and/or severing when the raised edge region of the first mold recess of the first mold half interacts with the corresponding end face of the second mold half.

In particular, it is possible for the raised edge region of the first mold half to be made at least in regions as a punching edge.

In particular, the at least one decorative film and/or the one or more film elements adhere in step e13) to the plastic body and/or plastic component produced by injection molding, preferably wherein complete severing takes place in step e13), if in particular the edges have not yet been completely severed. It is possible here to describe the complete severing of the at least one decorative film and/or the one or more film elements in step e13) substantially as a tearing procedure.

It is possible for the at least one decorative film and/or the one or more film elements in step e11) to be arranged in such a way that the at least one decoration of the at least one decorative film is facing away from the plastic material injected in step e13). Such an arrangement results in the advantage that the at least one decoration is made in particular of materials which react with the plastic material in step e13), for example partially dissolve or dissolve. In particular, the comparatively thick material layer of the at least one decorative film protects the decoration during the injection molding of the plastic material in step e13).

In particular, it is possible for the at least one decorative film to be made as a single- or multi-layered laminating film.

Here, it is possible for the single- or multi-layered laminating film to be a plastic film, preferably a PET film or a film made of polystyrene, ABS or PMMA. The plastic film is preferably made as a smooth or as a structured film, in particular comprising structures. It is possible, for example, for the plastic film to imitate a leather surface with the typical leather grain, which can be perceived haptically or tactilely. Further, it is possible for structures of this type, however, also to be present in orders of magnitude (microscopically, submicroscopically) which cannot be perceived tactilely, e.g. structures with an optically diffractive or refractive action.

Further, it is possible for the single- or multi-layered laminating film to be made from further materials, in particular from natural substances, such as leather, vellum or wood veneer.

The single- or multi-layered laminating film preferably has a stretchability in a range of from 12% to 20%, in particular in a range of from 15% to 20%, preferably wherein the stretchability necessary for a good processability is determined by the surface geometry of the plastic component.

Further, it has proved worthwhile for the single- or multi-layered laminating film to have a thickness in the range of from 20 μm to 500 μm.

In particular, the spacing between the end face of the raised edge region of the first mold part and the corresponding end face of the second mold part lies in a range of from 20% to 10% of the thickness of the at least one decorative film and/or of the one or more film elements.

The plastic material injected in step e13) preferably contains polystyrene. It is further possible here to use other thermoplastics, such as for example ABS, ABS-PC, PMMA, PET, PET-PC.

It is further possible in particular for step e) to be carried out using an injection-molding station, wherein the injection-molding station has a first mold half comprising a first mold recess and a second mold half comprising a second mold recess, wherein the first mold half is made movable and the second mold half is made not movable, wherein step e) comprises one or more steps of the following further steps, in particular wherein the following further steps are carried out in the following sequence, preferably wherein the following further steps are carried out in a cyclic sequence:

e16) inserting the one or more punched-out film elements and/or at least one decorative film into the first mold recess of the first mold half and fixing the one or more punched-out film elements and/or the at least one decorative film;

e17) inserting an in-mold labeling molded part or IML molded part into the second mold recess of the second mold half and fixing the IML molded part, wherein the IML molded part comprises an insert decorative ply and a backing film;

e18) closing the injection-molding station by lowering the first mold half onto the second mold half, wherein an injection-molding cavity for molding at least one plastic body is made;

e19) injection molding a plastic material into the second mold recess of the second mold half, wherein the plastic material releases the IML molded part from the second mold half and presses it against the one or more punched-out film elements and/or the at least one decorative film in the first mold recess of the first mold half, wherein a plastic component comprising the at least one plastic body is made;

e20) opening the injection-molding station by moving the first mold half away from the second mold half, in particular at the end of a cooling time of the at least one plastic body comprised in the plastic component;

e21) removing the plastic component.

By "moving", for example a mold half, is preferably meant here a change in the position and/or alignment of at least one element, preferably along at least one direction in space, in particular relative to a predefined reference system, and/or relative to the position and/or alignment of at least one further element, preferably along at least one further direction and/or the at least one direction, in particular wherein the at least one element and/or the at least one further element are selected and/or combined from: upper platen, lower platen, upper mold module, lower mold module. For example, the element or the elements can be displaced in a translational manner and/or rotated in a rotational manner, in particular about a point and/or axis or several points and/or axes in space.

Steps e16) to e21) are characterized in particular in that they unite the advantages of decorating by means of in-mold decorative films or IMD decorative films or decorative films and/or one or more punched-out film elements with the advantages of decorating by means of in-mold labeling molded parts or IML molded parts and as a result preferably open up new design possibilities.

In an IMD process (IMD=in-mold decoration), a transfer film is preferably placed in an injection mold and back-injection molded. Here, in particular the carrier film absorbs tensile forces, which can occur during the deformation of the transfer film when it is laid against the contour of the mold surface in particular at high speed due to the high pressures and temperatures occurring during the injection molding, and preferably protects the transfer plies made as varnish layers from cracks and other damage during the deformation. In particular, the surface finish of the transferred layers is also defined by this carrier film. Here, the carrier film preferably acts as deformation aid for the transfer plies.

It is also possible for the in-mold labeling molded part or IML molded part in particular in steps e16) to e21) to be several in-mold labeling molded parts or IML molded parts.

In steps e16) to e21) the at least one decorative film is preferably at least one IMD decorative film.

It is possible for the at least one decorative film and/or the one or more punched-out film elements in method step e16) to be positioned over the whole surface of the mold recess of the first mold half. The at least one decorative film preferably present as a web or strip and/or the one or more punched-out film elements are, for example, guided through the injection-molding station by means of a film-feed device, in particular wherein the film-feed device comprises a supply roll for the at least one decorative film and/or the one or more punched-out film elements, a take-up roll for the remaining film, a transporting device for the stepwise transporting of the at least one decorative film and/or the one or more punched-out film elements, as well as a fixing device for fixing the fed at least one decorative film and/or the one or more punched-out film elements to the first mold half.

Further, it is possible for the at least one decorative film and/or the one or more punched-out film elements to have, preferably at their outer edge, register marks, which are detected in particular by at least one, preferably optical, position sensor at the injection-molding station, in particular wherein the position sensor hereby actuates the film-feed device in such a way that a positionally accurate, i.e. register-accurate, positioning of the at least one decorative film and/or of the one or more punched-out film elements relative to the injection-molding station is preferably effected. The positional accuracy in particular in the feed direction has a tolerance of from approximately 0 mm to 1 mm, preferably 0.25 mm to 0.75 mm, in particular wherein it is possible to position the at least one decorative film and/or the one or more punched-out film elements with at least one individual image decoration, which in particular is to be applied positionally accurately on a molded part, preferably correspondingly positionally accurately by means of the register marks in the injection-molding device.

Further, it is possible for the at least one decorative film and/or the one or more punched-out film elements to have at least one endless decoration, such as for example a continuous pattern and/or a wood grain and/or a single-color coloring, in particular wherein, for an endless decoration of this type, a positionally accurate positioning of the at least one decorative film and/or the one or more punched-out film elements is not or is substantially not necessary.

In particular, the edges of the IML molded part are clipped before method step e17) and/or are thermally deformed or formed before or after the clipping.

It is possible for the IML molded part to be fixed in method step e17) by positioning pins arranged in the mold recess of the second mold half, in particular wherein the positioning pins are made in such a way that they engage in recesses arranged on the back side of the IML molded part, preferably in the backing film, and fix the IML molded part in particular in this way against a lateral displacement. If the, preferably liquid thermoplastic, plastic material is injected in particular below the IML molded part, the IML molded part is preferably lifted off the positioning pins and preferably pressed by the compressive force of the plastic material against the at least one decorative film and/or the one or more punched-out film elements in the mold recess of the first mold half. In practice it has been shown in particular that disruptive lateral movements of the IML molded part do not play an important part, preferably because this displacement of the IML molded part occurs very quickly due to the plastic material flowing in, without guidance by the positioning pins.

Further, it is possible for the IML molded part to be fixed in the mold recess of the second mold half in method step e17) by electrostatic force and/or by vacuum force.

Furthermore, it is possible for the plastic material to be an acrylonitrile-butadiene-styrene copolymer (ABS=acrylonitrile-butadiene-styrene) or a mixture of an acrylonitrile-butadiene-styrene copolymer and a polycarbonate (PC) or a mixture of a polycarbonate and an acrylonitrile-butadiene-styrene copolymer and for the backing film to be an acrylonitrile-butadiene-styrene copolymer.

The plastic material and/or the backing film preferably comprises a polycarbonate, in particular polypropylene (PP) and/or polymethyl methacrylate (PMMA).

In addition to the material pairings of the plastic material and the backing film described above, in particular further combinations are possible, preferably provided that the backing film is liquefied at least in the surface region during the injection-molding process and preferably hereby forms a substance-to-substance bond with the liquid plastic material which is preferably permanent after cooling.

It is possible for the insert decorative ply of the IML molded part to be radiation-cured, in particular UV-light-cured. It is preferably achieved by the curing that the insert decorative ply does not form a bond with the at least one decorative ply of the at least one decorative film, in particular does not form a bond with an adhesive layer of the at least one decorative ply of the at least one decorative film. An insert decorative ply of this type can consist of an isocyanate crosslinking acrylate protective varnish, for example.

Further, it is possible for the IML molded part to have a protective varnish coating as outer layer of the insert decorative ply which is made in particular in such a way that in method step e19) it does not adhere to the at least one decorative ply of the at least one decorative film, in particular does not adhere to the adhesive layer of the at least one decorative ply of the at least one decorative film. Such a protective varnish coating can consist of polyurethane (PU), polyvinylidene fluoride (PVDF), polyamide or polyester, or have it as a constituent, for example.

Further, it is possible, in particular in combination with the previously described positionally accurate positioning, for the at least one decorative film and/or the one or more punched-out film elements to be provided in the injection-molding station in this way, preferably wherein the at least one decorative film and/or the one or more punched-out film elements have an adhesive layer provided at least in regions, which is omitted in particular in the surface regions in which the at least one decorative film and/or the one or more punched-out film elements overlap the IML molded part. As a result, it is possible in particular for an undesired adhesive bonding between the at least one decorative film and/or the one or more punched-out film elements, in particular the adhesive layer of the at least one decorative film and/or of the one or more punched-out film elements, and the surface of the IML molded part to be reduced.

Furthermore, it is possible, in particular in combination with the previously described positionally accurate positioning, for the at least one decorative film and/or the one or more punched-out film elements to be provided in the injection-molding station in such a way that the at least one decorative film and/or the one or more punched-out film elements have an adhesive layer made over the whole surface, which is deactivated in particular in the surface regions in which the at least one decorative film and/or the one or more punched-out film elements in particular overlap the IML molded part. For the deactivation, a partial coating can be provided for example, wherein this coating is preferably made in such a way that it preferably does not adhere, or only slightly adheres, to the surface of the IML molded part during the injection-molding procedure. The coating can be, for example, a radiation-curing varnish, a varnish with a high pigment proportion or a powder coating. The coating can be applied as a liquid or also in solid form by means of a hot stamping. The coating can be applied by means of an inkjet printer for example, which is arranged in particular in the region of the film feed to the injection-molding station and, preferably in combination with the above-described positionally accurate positioning of the at least one decorative film and/or the one or more punched-out film elements, preferably applies the coating to the at least one decorative film and/or the one or more punched-out film elements correspondingly positionally accurately relative to the injection-molding station. The coating can further be a self-adhesive sticker or label, for example, in particular wherein the possibility of an undesired adhesive bonding between the at least one decorative film and/or the one or more punched-out film elements, in particular the adhesive layer of the at least one decorative film and/or of the one or more punched-out film elements, and the surface of the IML molded part is further reduced.

In particular it is possible to combine the at least one decorative film and/or the one or more punched-out film elements with the IML molded part in such a way that the adhesion (adhesion=adhesive force between two substances through molecular interactions) of the layers of the at least one decorative film and/or of the one or more punched-out film elements and of the IMD molded part facing one another as well as the cohesion (cohesion=internal bonding forces between atoms or molecules within a substance) within the layers of the at least one decorative film and/or of the one or more punched-out film elements and of the IMD molded part facing one another are preferably matched to one another in such a way that in particular the at least one decorative film and/or the one or more punched-out film elements adhere to the surface of the IML molded part so weakly that the at least one decorative film and/or the one or more punched-out film elements are in particular removed from the IML molded part after the injection molding and/or step e18), preferably without components of the at least one decorative film and/or of the one or more punched-out film elements adhering or sticking to the surface of the IML molded part.

It is further possible for e22) cleaning the decorated plastic component to be provided as a further step.

In method step e22), a contact and/or contactless cleaning is preferably provided, for example cleaning with a brush in conjunction with ionization. Further, it is possible for a combination of a cleaning by ionization, blowing with turbulent compressed air and optionally extraction by suction to be provided in method step e22).

In particular, the injection-molding station has more than one injection duct, in particular wherein this is advantageous in order preferably to press an IML molded part which has large dimensions uniformly against the at least one decorative film and/or the one or more punched-out film elements against the first mold half.

Further, it is possible for the decoration-side molding surface to have a mold element for making a design groove surrounding the IML molded part, in particular wherein the design groove visually conceals position and/or molding inaccuracies of the IML molded part relative to the decorative ply of the at least one decorative film and/or the one or more punched-out film elements. Corresponding to the tolerance in the positional accuracy of the at least one decorative film and/or the one or more punched-out film elements relative to the injection-molding station and the IML molded part of from approximately 0 mm to 1 mm, preferably 0.25 mm to 0.75 mm, and corresponding to the tolerance in the positional accuracy of the IML molded part in the injection-molding station of from approximately 0 mm to 1 mm, preferably 0.25 mm to 0.75 mm, it is advantageous if the design groove is between 0 mm and 2 mm, preferably between 0.5 mm and 1.5 mm, wide.

The radius of curvature of the plastic component after step e) is preferably smaller than 1000 mm, in particular smaller than 200 mm, further preferably smaller than 100 mm, at least in regions, and/or wherein the stretching of the plastic component is greater than or equal to 1%, in particular greater than or equal to 20%, preferably greater than or equal to 50%, in particular preferably greater than or equal to 300%.

It is also possible for a 3DHS process (3DHS=3D hot stamping) to be used in steps c), d) and/or e).

In a so-called 3DHS process, a transfer film, such as for example the at least one film comprising the at least one sensor film, is preferably placed on an already deformed part, in particular 3D or 2.5D deformed part, and hot stamped. Here, the transfer film is laid against and adapted to the contour of the deformed part already before the hot stamping, in particular with the aid of a vacuum suction and a preheating, and then hot stamped with a correspondingly shaped and heated die stamp. The carrier film absorbs tensile forces here, in particular like in an IMD process, and can preferably protect the varnish layers to be transferred from cracks and other damage during the deformation.

Further, it is possible for a TOM method to be used in steps c), d) and/or e).

In a so-called TOM method (TOM=three-dimensional overlay method), a transfer film, such as for example the at least one film comprising the at least one sensor film, is preferably applied to an in particular even, flat substrate, in particular wherein the carrier film is then peeled off. During the subsequent placing of the substrate coated with the transfer plies on an already deformed part and subsequent forming of the substrate corresponding to the parts mold, the applied transfer plies preferably absorb the tensile forces of the deformation.

It is possible for the at least one film and/or the at least one sensor film or the at least one film comprising the at least one sensor film in steps a), b), c), d) and/or e) to have at least one carrier film and/or at least one transfer ply, in particular wherein at least one deep-drawing membrane is arranged between the at least one carrier film and the at least one transfer ply, preferably in steps b), c) and/or e), and in particular wherein the at least one deep-drawing membrane is preferably produced or is applied by means of casting processes and/or by means of application with a slit nozzle and/or by means of screen printing, gravure printing, flexographic printing or inkjet printing.

The at least one deep-drawing membrane is preferably designed to absorb tensile forces and as a result to act as deformation aid for the transfer ply, in particular wherein the deep-drawing membrane protects the transfer ply from cracks and other damage during the forming. By a three-dimensional component is meant here in particular a component which is deformed in three dimensions, therefore in a length, width and height extension, for example a housing of a device.

It is further possible for the deep-drawing membrane to be made as a varnish layer with a layer thickness in the range of from 10 μm to 200 μm, preferably in the range of from 20 μm to 100 μm, further preferably in the range of from 25 μm to 75 μm.

Further preferably, the deep-drawing membrane is made of polyurethane, in particular wherein the polyurethane is solvent-based or an aqueous dispersion and/or is sufficiently deformable and/or is composed of various polymers, in particular selected from the following substances: polyurethanes, for example polyester polyols, polyether polyols, polycarbonate polyols, polyacrylate polyols, polyester polyols, and combinations of these polymers.

It is possible for the deep-drawing membrane to be made transparent, translucent or opaque and here preferably to be colorless or colored. An at least partial opacity and/or color in particular makes it easier to detect the presence of the deep-drawing membrane on the decorated substrate or component.

Further, it is possible for the deep-drawing membrane to have a decoration, e.g. a pattern or a motif, for example a logo or lettering. The lettering can comprise, for example, manufacturer information or also instructions for use for the deep-drawing membrane and/or for the substrate or component.

It is possible in particular for the decoration or motif to be or have been printed on the deep-drawing membrane. For example, it is possible to cast the deep-drawing membrane in a first casting procedure, then to print the decoration or motif and subsequently, in a second casting procedure, to embed the decoration or motif in the deep-drawing membrane. The decoration or the motif preferably consists of the same material as the deep-drawing membrane or also of other materials, for example of PVC or a polyurethane other than that of the deep-drawing membrane.

It is possible for the deep-drawing membrane to be provided over the whole surface, in particular on the entire surface of the transfer film, or alternatively to be provided in regions. It is possible, for example, to provide the deep-drawing membrane only in the surface regions in which particularly strong deformations occur during the processing of the transfer film and, for example, not to provide it in surface regions in which only slight deformations, or none at all, occur during the processing of the transfer film. It is also possible, for example, not to provide the deep-drawing membrane only in an in particular narrow edge region of the transfer film, in order to be able to peel the deep-drawing membrane off more easily at this now visually recognizable and tactilely accessible edge. For this, the deep-drawing membrane can also have, on its edge, a handling aid for easier peeling off, for example at least one tab or similar.

Further, it is possible for the deep-drawing membrane to be made stretchable by 200%, preferably by 500% to more than 1500%, at a deep-drawing temperature in the range of from 130° C. to 160° C. These values were determined in particular in standardized tensile tests (DIN 53504, ISO 37) using the Zwick Z005 testing device from Zwick GmbH & Co. KG, Ulm.

Furthermore, it is possible for a first detachment layer to be arranged between the carrier film and the deep-drawing membrane and for a second detachment layer to be arranged between the deep-drawing membrane and the transfer ply.

Further preferably, the first and/or the second detachment layer consists of a wax, in particular wherein the wax is selected from: carnauba wax, montanic acid ester, polyethylene wax, polyamide wax or a PTFE wax (PTFE=polytetrafluoroethylene). Furthermore, in particular surface-active substances such as silicones are suitable as detachment layer. Thin layers of melamine-formaldehyde resin crosslinked varnishes can also act as detachment layer.

It is possible for the first and/or the second detachment layer to have a layer thickness smaller than 1 μm, in particular smaller than 0.1 μm.

Further, it is possible for the force of detachment of the carrier film from the deep-drawing membrane, due to the first detachment layer arranged between carrier film and deep-drawing membrane, to be smaller than the force of detachment of the deep-drawing membrane from the transfer ply by a factor of 5 to 10, in particular due to the second detachment layer arranged between deep-drawing membrane and the transfer ply. The detachment values were in particular determined with the aid of a tensile test testing machine (Zwick Z005 from Zwick GmbH & Co. KG, Ulm), preferably wherein the transfer film was glued flat onto the lower holder and the layer to be detached was then detached at a right angle using the tensile test. The detachment forces were further preferably determined via the load cell.

It is possible for the transfer ply to be made as a multilayer body made of several transfer layers.

Further, it is possible for the force of detachment of the deep-drawing membrane from the transfer ply, due to the second detachment layer arranged between deep-drawing membrane and the transfer ply, to be 30% to 70% smaller than the adhesive force of the adjacent transfer layers to one another.

Furthermore, it is possible for the transfer ply to comprise a first transfer layer facing the deep-drawing membrane, a second transfer layer and a third transfer layer, in particular wherein the first and/or third transfer layer can be dispensed with.

In particular, the first transfer layer is made as a protective layer.

Further preferably, the protective layer is made as a protective varnish made of a PMMA-based varnish, which preferably has a layer thickness in the range of from 2 μm to 5 μm. It is also possible for the protective varnish to consist of a radiation-curing dual cure varnish, in particular wherein this dual cure varnish is thermally pre-crosslinked in a first step during and/or after the application in liquid form and, in a second step after the processing of the transfer film, is radically post-crosslinked, in particular via high-energy radiation, preferably UV radiation. Dual cure varnishes of this type in particular have various polymers or oligomers, which preferably comprise unsaturated acrylate or methacrylate groups, in particular wherein these functional groups can be radically crosslinked with one another in the above-mentioned second step. For the thermal pre-crosslinking in the first step, it is advantageous for these polymers or oligomers also to comprise at least two or more alcohol groups. Further preferably, the alcohol groups can be crosslinked with polyfunctional isocyanates or melamine-formaldehyde resins. Various UV raw materials such as epoxy acrylates, polyether acrylates, polyester acrylates and in particular acrylate acrylates come into consideration in particular as unsaturated oligomers or polymers. Both blocked and unblocked representatives based on TDI (TDI=toluene-2,4-diisocyanate), HDI (HDI=hexamethylene diisocyanate) or IPDI (IPDI=isophorone diisocyanate) preferably come into consideration as isocyanate. The melamine crosslinkers can in particular be fully etherified versions and/or be imino types and/or represent benzoguanamine representatives. Many of these protective varnishes would in particular not be sufficiently deformable without a deep-drawing membrane and thus in particular would not be sufficiently deep-drawable.

It is possible for the protective layer to be made as a protective varnish made of a varnish based on PMMA (PMMA=polymethyl methacrylate) or a varnish based on a mixture of PVDF (PVDF=polyvinylidene fluoride) and PMMA, preferably with a layer thickness in the range of from 2 μm to 50 μm, preferably in the range of from 5 μm to 30 μm. These varnishes preferably provide the mechanical brittleness necessary for a transfer film and the sufficiently precise and clean stampability or separability thereof at the desired outer borders of the transferred surface regions of the transfer plies.

Further, it is possible for the second transfer layer to be made as a single- or multi-layered decorative layer, in particular wherein a decorative layer of this type preferably comprises one or more layers. The decorative layer preferably has one or more color layers, in particular color varnish layers. Further, it is possible for these color layers to be dyed differently, to be made transparent and/or opaque and/or also to be separated from one another by one or more further layers, in particular transparent layers. Here, the color layers can consist of a binder and colorants and/or pigments, in particular also optically variable pigments and/or metallic pigments. Further, the decorative layer can also comprise one or more reflective layers, which are preferably made opaque, translucent and/or partial. In particular, the reflective layers can consist of metals and/or HRI layers (HRI=high refractive index), therefore layers with a high refractive index, in particular higher than 1.5. Aluminum, chromium or copper, or alloys thereof come into consideration for example as metals. ZnS or SiO2 come into consideration for example as HRI layers. Further, the decorative layer can also have one or more optically active relief structures, in particular diffractive structures and/or holograms and/or refractive structures and/or matte structures. At least one reflective layer is arranged directly on the relief structure, at least in regions.

In particular, the production of the transfer film is effected by producing the deep-drawing membrane in several successive passes or from several layers. In particular, a sufficient layer thickness can hereby be achieved. The individual layers of the deep-drawing membrane can preferably be produced in a casting process, for example by means of application with a slit nozzle, or also by means of screen printing, gravure printing, flexographic printing or inkjet printing.

It is possible for the layer applied first for producing the deep-drawing membrane, in particular the varnish layer, to be at least partially dried between the successive passes. In particular, the layer is dried in such a way that the layer is at least surface-dry. However, the layer can also be dried through. A following layer is then preferably deposited after the drying. The following layer is preferably applied such that it preferably partially dissolves at least the surface of the previously deposited layer. It is advantageous if the two layers together make a homogeneous overall layer through the partial dissolving.

In the case of more than two successive layers for producing the deep-drawing membrane, this procedure is in particular correspondingly repeated multiple times, in particular wherein all successive layers together make a homogeneous overall layer.

A layer, in particular a varnish layer with a layer thickness in the range of from approximately 0.1 μm to 50 μm, preferably in the range of from 0.1 μm to 35 μm, further preferably in the range of from 1 μm to 25 μm, is preferably applied in one pass. By means of such comparatively thin partial layers, overall layers with larger layer thicknesses can preferably be built up, in particular as described above.

In the tracking, in particular, methods for coating at least one plastic body by means of the at least one film and/or the at least one sensor film and/or the one or more film elements are.

It can be provided that the method is formed as an IMD process, wherein an insertion of the at least one film and/or the at least one sensor film and/or the one or more film elements into an injection-molding station and a back-injection molding or injection molding of the at least one film and/or the at least one sensor film and/or the one or more film elements with a plastic material is effected.

After the back-injection molding or injection molding, the carrier film comprised in the at least one film and/or in the at least one sensor film and/or in the one or more film elements is preferably peeled off the transfer film comprised in the at least one film and/or the at least one sensor film and/or the one or more film elements. The deep-drawing membrane comprised in the at least one film and/or the at least one sensor film and/or the one or more film elements can also be peeled off together with the transfer film. However, it is advantageous if the deep-drawing membrane remains on the transfer ply at least for a start. Here, the deep-drawing membrane acts in particular as a protective layer for the transfer ply. Here, in particular a protective layer of its own for the transfer ply can be dispensed with. Further, it is possible for the deep-drawing membrane to be peeled off shortly before the use of the coated component or only when the component is used. As a result, among other things, the component is prevented from suffering any damage at an early stage, even before it is used. It is advantageous here if the transfer ply has its own protective layer, which protects the transfer ply from external influences during use of the component.

It is possible for the method to be formed as an insert molding process, which comprises a lining of a substrate, a deep drawing or forming of the lined substrate and a back-injection molding or injection molding of the deep-drawn or formed substrate with a thermoplastic material, wherein the carrier film of the transfer film is peeled off the substrate after the lining of the substrate, and wherein the deep-drawing membrane is peeled off the back-injection-molded or injection-molded substrate after the back-injection molding or injection molding.

Preferred embodiments of the device are mentioned below.

The at least one film and/or the at least one sensor film preferably has polycarbonate (PC) as at least one thermoplastic material or as at least one thermoplastic polymer.

According to the invention, the at least one sensor film and/or the at least one film has polyethylene terephthalate (PET) as at least one thermoplastic material or as at least one thermoplastic polymer.

According to the invention, it is provided that the at least one film has a thickness of from 250 μm to 3000 μm, in particular of from 300 μm to 2000 μm.

Further, it is possible for the at least one film to have a tensile strength of between 20 MPa and 100 MPa, in particular between 20 MPa and 80 MPa.

It is furthermore possible for the at least one film to be flexible at least in regions or over the whole surface.

The at least one film is preferably provided as a film composite, which is flexible at least in regions or over the whole surface and/or which comprises one or more films, in particular comprises one or more films flexible at least in regions or over the whole surface.

According to the invention, it is provided that the at least one sensor film has a thickness of from 25 μm to 150 μm, in particular of from 25 μm to 125 μm.

Further, it is possible for the at least one sensor film to have a tensile strength of between 150 MPa and 500 MPa, in particular between 200 MPa and 500 MPa.

Furthermore, it is possible for the tensile strength of the at least one film to be at most the tensile strength of the at least one sensor film multiplied by a factor of 2/3.

In particular, the thickness of the at least one film is at least the thickness of the at least one sensor film multiplied by a factor of 1/2.

The at least one film is preferably transparent, translucent or opaque at least in regions or over the whole surface and/or the at least one sensor film is transparent, translucent or opaque at least in regions.

However, the thickness of the film can also be thicker, for example the same size as the thickness of the sensor film. It is particularly advantageous if the thickness of the flexible film is greater than the thickness of the sensor film. In this case, the sensor film is thinner than the film. The film can, for example, be designed thicker than the sensor film by a factor of 2, 3, 4 or 5.

In particular preferably, the at least one sensor film is applied to the at least one film by means of hot lamination in at least one hot-laminating station and/or by means of hot stamping and/or cold lamination and/or adhesive bonding, in particular cold bonding, preferably in at least one hot-stamping station and/or cold-laminating station and/or adhesive-bonding station, in particular preferably cold-stamping station.

It is possible for the device to comprise one or more stations of the following further stations, in particular for carrying out one or more steps of the steps b1) to b3):

feed station for providing at least one carrier substrate;

applying station for applying at least one electrically conductive layer to the carrier substrate in such a way that the at least one electrically conductive layer makes an electrical functional structure in at least one functional region, wherein the at least one electrically conductive layer, in at least one contacting region, makes at least one contacting structure for contacting the electrical functional structure;

applying station for applying at least one adhesion-promoting layer, for applying the at least one sensor film to the at least one film, in such a way that the adhesion-promoting layer, when observed perpendicular to a plane spanned by the at least one carrier substrate, does not cover the at least one contacting region at least in regions or wherein the at least one adhesion-promoting layer, when observed perpendicular to a plane spanned by the at least one carrier substrate, is applied over the whole surface.

Further, it is possible for the at least one electrically conductive layer to comprise at least one metal layer and/or a layer of ITO and/or AZO and/or PEDOT and/or conductive varnishes, in particular wherein the device comprises one or more stations, preferably for carrying out one or more steps of the steps b4a), b4b) and/or b5), of the following further stations:

applying station for applying the at least one electrically conductive layer;

structuring station for structuring the at least one electrically conductive layer by removing the at least one electrically conductive layer at least in regions;

applying station for applying the at least one electrically conductive layer in structured form.

At least one sensor film of the at least one sensor film preferably has one or more sensors and/or electrical components, in particular LEDs, in particular one or more touch sensors and/or one or more display devices.

In particular, at least one sensor film of the at least one sensor film has one or more contact regions, in particular wherein one or more contact regions of the one or more contact regions are covered at least in regions by no film or layer, preferably wherein one or more contact regions of the one or more contact regions are arranged on a surface of the at least one sensor film of the at least one sensor film facing away from the at least one film.

The at least one film and/or the at least one sensor film preferably has at least one decoration and/or at least one decorative film at least in regions.

It is possible for the forming station and/or the device for forming the at least one film comprising the at least one sensor film to comprise one or more of the following forming stations, in particular selected from: deep-drawing station, thermoforming station, High Pressure Forming station, injection-molding station.

The at least one film and/or the at least one sensor film is preferably formed in the forming station in such a way that the radius of curvature of the at least one film and/or of the at least one sensor film and/or of the formed film body is smaller than 1000 mm, in particular smaller than 200 mm, further preferably smaller than 100 mm, at least in regions, and/or that the stretching of the at least one film and/or of the at least one sensor film is greater than or equal to 1%, in particular greater than or equal to 20%, preferably greater than or equal to 50%, in particular preferably greater than or equal to 300%.

The at least one punching station is preferably designed in such a way that the at least one punching station introduces one or more holes or through punches into the one or more film elements, in particular wherein one or more holes of the one or more holes have the function of an injection duct for a plastic material during the injection molding in the at least one injection-molding station.

It is possible for the device to comprise one or more stations of the following further stations, in particular for carrying out one or more steps of the steps e1) to e6):

feed station for providing at least one decorative film, which in particular has at least one opaque coating at least partially;

processing station for introducing at least one decorative element of at least one decoration into the at least one decorative film;

inserting station for inserting the one or more punched-out film elements and the at least one decorative film into an injection-molding station, wherein the injection-molding station comprises a first mold half and a second mold half, wherein the first mold half and the second mold half, in particular in a closed state, make an injection-molding cavity for molding at least one plastic body, wherein the at least one punched-out film element is attached to a first wall of the injection-molding cavity and/or the at least one decorative film is attached to a second wall of the injection-molding cavity, in particular wherein the second wall is arranged lying opposite the first wall;

injection-molding station for injection molding the one or more punched-out film elements and the at least one decorative film with a plastic material to make a plastic component comprising the at least one plastic body in such a way that the one or more punched-out film elements make a first surface of the plastic component and the at least one decorative film makes a second surface of the plastic component, in particular wherein the first surface lies opposite the second surface;

demolding station for removing the plastic component.

Further, it is possible for the device to comprise the following further station, in particular for carrying out step e7):

processing station for inserting a first punched-out film element of the one or more punched-out film elements and/or a second punched-out film element of the one or more punched-out film elements into an injection-molding station.

Furthermore, it is possible for the device to comprise one or more stations of the following stations, in particular for carrying out one or more steps of the steps e8) to e10):

injection-molding station for injection molding the first punched-out film element and/or the second punched-out film element with a plastic material to make a plastic component comprising the at least one plastic body in such a way that the first punched-out film element a first surface of the plastic component and/or that the second punched-out film element a second surface of the plastic component, wherein the injection-molding station comprises a first mold half and a second mold half, wherein the first mold half and the second mold half, in particular in a closed state, make an injection-molding cavity for molding at least one plastic body, wherein the first punched-out film element is attached to a first wall of the injection-molding cavity and/or the second punched-out film element is attached to a second wall of the injection-molding cavity, in particular wherein the second wall is arranged lying opposite the first wall, in particular wherein the first surface lies opposite the second surface;

demolding station for removing the plastic component.

In particular, it is possible for the device to comprise one or more stations of the following further stations, in particular for carrying out one or more steps of the steps e11) to e15):

feed station for providing the one or more punched-out film elements and/or at least one section of at least one decorative film on the first mold half and/or on the second mold half in such a way that, when the first mold half and second mold half are closed, the one or more punched-out film elements and/or the at least one decorative film rest on an end face of the raised edge region bordering the first mold recess and surrounding the first mold recess;

injection-molding station for injection molding a plastic material through the injection duct into the injection-molding cavity made by the closed first and second mold halves, wherein the at least one decorative film and/or the one or more film elements are back-injection molded in the region enclosed by the raised edge region with the plastic material, in particular without plastic material seeping through the sealed gap, wherein a plastic component comprising the at least one plastic body is made, wherein the injection-molding station has a first mold half comprising a first mold recess and a second mold half, wherein the first mold half and/or the second mold half has at least one injection duct, wherein the first mold half and the second mold half, in particular in a closed state, make an injection-molding cavity for molding at least one plastic body;

demolding station for removing the plastic component.

Preferably, it is possible for the device to comprise one or more stations of the following further stations, in particular for carrying out one or more steps of the steps e16 to e21):

inserting station for inserting the one or more punched-out film elements and/or at least one decorative film into a first mold recess of a first mold half of an injection-molding station and for fixing the one or more punched-out film elements and/or the at least one decorative film;

further inserting station for inserting an in-mold labeling molded part or IML molded part into a second mold recess of a second mold half of an injection-molding station and fixing the IML molded part;

injection-molding station, which has a first mold half comprising a first mold recess and a second mold half comprising a second mold recess, wherein the first mold half is made movable and the second mold half is made not movable;

demolding station for removing the plastic component.

After being removed from the demolding station, the plastic component preferably has a radius of curvature and/or a stretching, wherein the radius of curvature is smaller than 1000 mm, in particular smaller than 200 mm, further preferably smaller than 100 mm, at least in regions, and/or wherein the stretching is greater than or equal to 1%, in particular greater than or equal to 20%, preferably greater than or equal to 50%, in particular preferably greater than or equal to 300%.

It is further possible for the device to comprise one or more stations of the following further stations:

at least one laminating station, in particular for joining the formed and punched-out film elements to a final substrate, wherein the laminating station is preferably arranged after the punching station and further preferably comprises at least one heating element and one pressing-on element, at least one lining station, in particular for joining the formed and punched-out film elements to a final substrate, wherein the lining station is preferably arranged after the punching station and further preferably comprises at least one heating element and one pressing element.

The device can furthermore comprise a laminating station and/or a lining station. These stations are provided for joining the formed and punched-out film elements to a final substrate. The final substrate can be made, for example, by a housing of a device to which the plastic component or the film element is to be applied. The laminating station and/or lining station make a further processing of the formed, punched-out film elements by lamination or, respectively, lining possible. The laminating station and/or lining station thus represent stations of the device that are alternative to an injection-molding station. However, a laminating station and/or lining station can also be provided in combination with an injection-molding station.

Preferred embodiments of the plastic component are mentioned below.

The at least one formed film and/or the at least one formed sensor film preferably has polycarbonate (PC) as at least one thermoplastic material or as at least one thermoplastic polymer.

According to the invention, the at least one formed sensor film and/or the at least one formed film has polyethylene terephthalate (PET) as at least one thermoplastic material or as at least one thermoplastic polymer.

In particular, the at least one formed film has a thickness of from 250 μm to 3000 μm, in particular of from 300 μm to 2000 μm.

The at least one formed film preferably has a tensile strength of between 20 MPa and 100 MPa, in particular between 20 MPa and 80 MPa.

The at least one formed sensor film further preferably has a thickness of from 25 μm to 150 μm, in particular of from 25 μm to 125 μm.

In particular preferably, the at least one formed sensor film has a tensile strength of between 150 MPa and 500 MPa, in particular between 200 MPa and 500 MPa.

It is possible for the tensile strength of the at least one formed film to be at most the tensile strength of the at least one formed sensor film multiplied by a factor of 2/3.

Further, it is possible for the thickness of the at least one formed film to be at least the thickness of the at least one formed sensor film multiplied by a factor of 1/2.

However, the thickness of the film can also be thicker, for example the same size as the thickness of the sensor film. It is particularly advantageous if the thickness of the flexible film is greater than the thickness of the sensor film. In this case, the sensor film is thinner than the film. The film can be designed thicker than the sensor film, for example, by a factor of 2, 3, 4 or 5.

Furthermore, it is possible for the plastic component and/or the at least one film and/or the at least one sensor film to have at least one decoration and/or at least one decorative film in regions.

Further, it is possible for the at least one decorative film and/or the one or more film elements to have at least one decorative layer and/or at least one functional layer, in particular a layer with an electrical functionality, in particular a layer comprising one or more elements selected from touch sensor, antenna, capacitor, coil, electromagnetic shielding, electrically non-conductive metallic layers, in particular for avoiding electrostatic charge, display, LED, electric circuit, solar cell, at least one in particular post-curable protective layer and/or at least one barrier layer and/or at least one adhesion-promoting layer or adhesion-promoter layer.

At least one decorative layer of the at least one decorative layer preferably consists here of one or more or a combination of one or more decorative layers of the following decorative layers:

transparent or translucent or opaque varnish layer containing dyes and/or pigments, in particular organic/inorganic pigments, luminescent and/or fluorescent pigments and/or dyes, optically variable pigments, thermochromic pigments and/or dyes, metallic pigments, magnetically orientable pigments, volume hologram layer, layer with optically active surface relief, in particular a diffractive and/or refractively acting surface relief, a holographic surface relief, a surface relief containing refractive structures, diffractive structures, in particular lens structures, microlens arrays, microprisms, micromirrors, matte structures, in particular isotropic and/or anisotropic matte structures and/or a combination of any structures of this type;

reflective layers, in particular metallic or dielectric reflective layers;

high-refractive-index or low-refractive-index layers, in particular with refractive indices which differ by more than +/−0.2 from a refractive index of 1.5;

liquid crystal layers, in particular cholesteric and/or nematic liquid crystal layers;

thin-film layers which display an optically variable color change effect, in particular comprising an absorber layer, a dielectric spacer layer and an optional reflective layer or alternatively comprising a repeated sequence of alternating high-refractive-index and low-refractive-index transparent layers.

It is further possible for these decorative layers to be applied to one another and/or next to one another here in any desired sequence. In particular, each individual decorative layer is here made patterned over part of the surface, in order preferably to achieve a desired graphic decoration. The decorative layers are preferably arranged registered relative to one another.

At least one functional layer of the at least one functional layer preferably consists of one or more or a combination of one or more functional layers of the functional layers mentioned below:

layers with an electrical functionality, in particular comprising one or more elements selected from: touch sensor, antenna, electromagnetic shielding, electrically non-conductive metallic layers for avoiding electrostatic charge, display, LED (light emitting diode), electric circuit, solar cell, layer with a magnetic functionality, for example a magnetic barcode, layers with mechanical functionality, for example reinforcing elements or stiffening elements made of metal and/or plastic and/or woven and/or nonwoven fiber plies and/or fibrous additives and/or fibrous additional layers, layers with optical functionality, for example antireflection layers or reflective layers, layers with tactile functionality, for example soft-touch surface coatings.

BRIEF DESCRIPTION OF THE DRAWINGS

The invention is explained by way of example below with reference to several embodiment examples with the aid of the attached drawings. There are shown in:

FIG. 2 a schematic representation of a method step as well as a film and a sensor film, FIG. 3 a schematic representation of a method step as well as a film and a sensor film, FIG. 4 a schematic representation of a method step as well as a film and a sensor film, FIG. 5 a schematic representation of a method step as well as a station of a device as well as a film and a sensor film, FIG. 6 a schematic representation of a method step as well as of a station of a device as well as a film and a sensor film, FIG. 7 a schematic representation of a plastic component, FIG. 8 a schematic representation of a method step as well as of a station of a device as well as a film and a sensor film, FIG. 9 a schematic representation of a plastic component.

DETAILED DESCRIPTION

Figure 1:
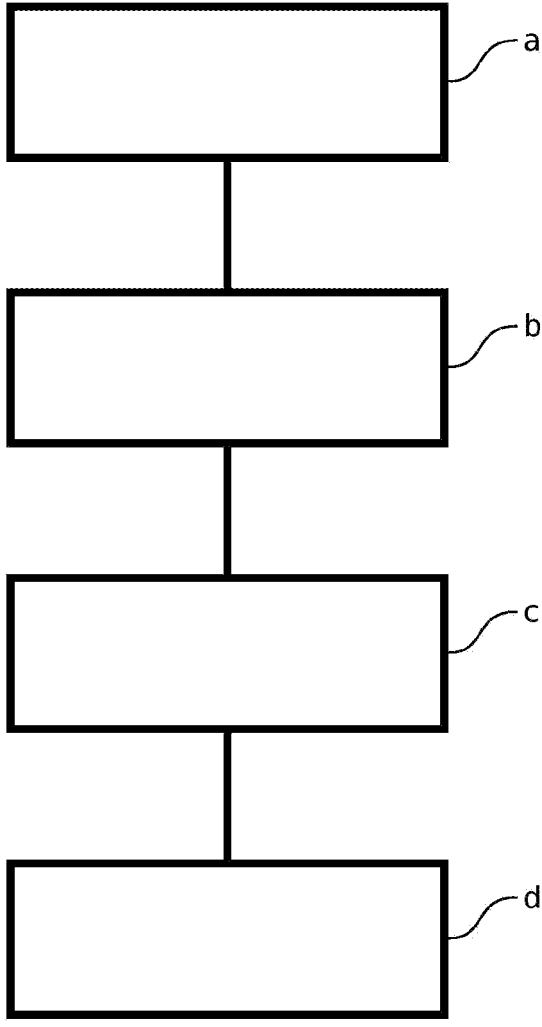
FIG. 1 a schematic representation of a method.

FIG. 1 shows a method for producing at least one plastic component 1, wherein in the method the following steps a, b, c and d, preferably in the following sequence, preferably cyclically in the following sequence, are carried out:

a providing at least one film 2 and at least one sensor film 3, wherein the at least one film 2 and/or the at least one sensor film 3 has at least one thermoplastic material or at least one thermoplastic polymer, b applying the at least one sensor film 3 to at least one first region of a surface of the at least one film 2, c forming the at least one film 2 comprising the at least one sensor film 3, wherein one or more formed film bodies 4 are made, d punching out one or more film elements 4a made from at least one second region of the one or more formed film bodies 4.

The at least one film 2 and/or the at least one sensor film 3 in step a preferably has polycarbonate (PC) as at least one thermoplastic material or as at least one thermoplastic polymer.

The at least one sensor film 3 and/or the at least one film 2 in step a further preferably has polyethylene terephthalate (PET) as at least one thermoplastic material or as at least one thermoplastic polymer.

FIG. 2 shows a film 2, in particular in the case of a provision according to step a, which preferably has a thickness of from 50 μm to 3000 μm, in particular of from 300 μm to 2000 μm, and/or a tensile strength of between 20 MPa and 100 MPa, in particular between 20 MPa and 80 MPa. The film 2 is preferably flexible at least in regions or over the whole surface.

It is possible for the film 2 to be provided as a film composite, which is flexible at least in regions or over the whole surface and/or which comprises one or more films, in particular comprises one or more films flexible at least in regions or over the whole surface.

FIG. 2 further shows a sensor film 3, in particular in the case of a provision according to step a, which preferably has a thickness of from 25 μm to 150 μm, in particular of from 25 μm to 125 μm, and/or a tensile strength of between 150 MPa and 500 MPa, in particular between 200 MPa and 500 MPa.

FIG. 3 shows a film 2 and a sensor film 3, in particular after application of the sensor film 3 to a region of a surface of the film 2 according to step b.

The at least one film 2 in step a preferably has a thickness of from 50 μm to 3000 μm, in particular of from 300 μm to 2000 μm, and/or a tensile strength of between 20 MPa and 100 MPa, in particular between 20 MPa and 80 MPa. The at least one film 2 in step a is preferably flexible at least in regions or over the whole surface. In particular, the at least one film 2 in step a is provided as a film composite, which is flexible at least in regions or over the whole surface and/or which comprises one or more films, in particular comprises one or more films flexible at least in regions or over the whole surface.

It is possible for the at least one sensor film 3 in step a to have a thickness of from 25 μm to 150 μm, in particular of from 25 μm to 125 μm, and/or for the at least one sensor film 3 in step a to have a tensile strength of between 150 MPa and 500 MPa, in particular between 200 MPa and 500 MPa.

Further, it is possible for the tensile strength of the at least one film 2 in step a and/or b to be at most the tensile strength of the at least one sensor film 3 in step a and/or b multiplied by a factor of 2/3 and/or for the thickness of the at least one film 2 in step a and/or b to be at least the thickness of the at least one sensor film 3 in step a and/or b multiplied by a factor of 1/2.

In the embodiment represented, the thickness of the film 2 is greater than the thickness of the sensor film 3. In the embodiment represented, the thickness of the at least one film 2 in step a and/or b is at least the thickness of the at least one sensor film 3 in step a and/or b multiplied by a factor of approx. 3.

Furthermore, it is possible for the at least one film 2 in step a to be transparent, translucent or opaque at least in regions or over the whole surface and/or for the at least one sensor film 3 in step b to be transparent, translucent or opaque at least in regions.

The at least one sensor film 3 in step b is preferably applied to the at least one film 2 by means of hot lamination and/or by means of hot stamping and/or cold lamination and/or adhesive bonding, in particular cold bonding.

It is possible for step b to comprise one or more steps of the following further steps, in particular for producing the at least one sensor film 3 and/or for applying the at least one sensor film 3 to the at least one film 2, in particular wherein the following further steps are carried out in the following sequence, preferably wherein the following further steps are carried out in a cyclic sequence:

b1 providing at least one carrier substrate 30;

b2 applying at least one electrically conductive layer 31 to the carrier substrate 30, wherein the at least one electrically conductive layer 31 makes an electrical functional structure in at least one functional region 32, wherein the at least one electrically conductive layer 31, in at least one contacting region 34, makes at least one contacting structure for contacting the electrical functional structure;

b3 applying at least one adhesion-promoting layer 35 for applying the at least one sensor film 3 to the at least one film 2 in such a way that the adhesion-promoting layer 35, when observed perpendicular to a plane spanned by the at least one carrier substrate 30, does not cover the at least one contacting region 34 at least in regions or wherein the at least one adhesion-promoting layer 35, when observed perpendicular to a plane spanned by the at least one carrier substrate 30, is applied over the whole surface.

Further, it is possible for the at least one electrically conductive layer 31 in step b2 and/or b3 at least one metal layer and/or a layer of ITO and/or AZO and/or PEDOT and/or conductive varnishes, in particular wherein step b comprises one or more steps of the following further steps, in particular wherein the following further steps are carried out in the following sequence, preferably wherein the following further steps are carried out in a cyclic sequence:

b4a applying the at least one electrically conductive layer in one or more partial steps;

b4b structuring the at least one electrically conductive layer by removing the at least one electrically conductive layer at least in regions in one or more partial steps; and/or b5 applying the at least one electrically conductive layer in structured form in one or more partial steps.

In particular, the at least one sensor film of the at least one sensor film 3 in step b has one or more sensors and/or electrical components, in particular LEDs, in particular one or more touch sensors and/or one or more display devices.

At least one sensor film of the at least one sensor film 3 in step b preferably has one or more contact regions, in particular wherein one or more contact regions of the one or more contact regions are covered at least in regions by no film or layer, preferably wherein one or more contact regions of the one or more contact regions are arranged on a surface of the at least one sensor film of the at least one sensor film 3 facing away from the at least one film 2.

The at least one film 2 in step a and/or the at least one sensor film 3 in step b and/or the at least one film 2 and/or the at least one sensor film 3 a further step further preferably has at least one decoration and/or at least one decorative film 5 at least in regions.

The forming of the at least one film 2 comprising the at least one sensor film 3 in step c is preferably carried out by means of one or more forming processes, in particular selected from the following forming processes: deep drawing, thermoforming, High Pressure Forming, injection-molding process.

The radius of curvature of the at least one film 2 and/or of the at least one sensor film 3 after step c is preferably smaller than 1000 mm, in particular smaller than 200 mm, further preferably smaller than 100 mm, at least in regions, and/or the stretching of the at least one film 2 and/or of the at least one sensor film 3 after step c is greater than or equal to 1%, in particular greater than or equal to 20%, preferably greater than or equal to 50%, in particular preferably greater than or equal to 300%.

It is possible for the method and/or step d to comprise the following further step:

e injection molding the one or more punched-out film elements 4a.

In particular, in step d one or more holes or through punches are introduced into the one or more film elements 4a, in particular wherein one or more holes of the one or more holes have the function of an injection duct for a plastic material during the injection molding in step e.

It is possible for step e to comprise one or more steps of the following further steps, in particular wherein the following further steps are carried out in the following sequence, preferably wherein the following further steps are carried out in a cyclic sequence:

e1 providing at least one decorative film 5a, which in particular has at least one opaque coating 50 at least partially;

e2 introducing at least one decorative element of at least one decoration into the at least one decorative film 5a by processing in at least one processing station;

e3 inserting the one or more punched-out film elements 4a and the at least one decorative film 5a into an injection-molding station 15, wherein the injection-molding station 15 comprises a first mold half 15a and a second mold half 15b, wherein the first mold half 15a and the second mold half 15b, in particular in a closed state, make an injection-molding cavity 15c for molding at least one plastic body 7a, wherein the at least one punched-out film element 4a is attached to a first wall 15aa of the injection-molding cavity 15c and/or the at least one decorative film 5a is attached to a second wall 15bb of the injection-molding cavity 15c, in particular wherein the second wall 15bb is arranged lying opposite the first wall 15aa;

e4 injection molding the one or more punched-out film elements 4a and the at least one decorative film 5a with a plastic material to make a plastic component 1 comprising the at least one plastic body 7a in such a way that the one or more punched-out film elements 4a make a first surface of the plastic component 1 and the at least one decorative film 5a makes a second surface of the plastic component 1, in particular wherein the first surface lies opposite the second surface;

e5 opening the injection-molding station 15 by moving the first mold half 15a and the second mold half 15b apart, in particular at the end of a cooling time of the at least one plastic body 7a comprised in the plastic component 1;

e6 removing the plastic component 1.

Further, it is possible for step e to comprise one or more steps of the following further steps, in particular wherein the following further steps are carried out in the following sequence, preferably wherein the following further steps are carried out in a cyclic sequence:

e7 inserting a first punched-out film element 4aa of the one or more punched-out film elements 4a and/or a second punched-out film element 4ab of the one or more punched-out film elements 4a into an injection-molding station 16, wherein the injection-molding station 16 comprises a first mold half 16a and a second mold half 16b, wherein the first mold half 16a and the second mold half 16b, in particular in a closed state, make an injection-molding cavity 16c for molding at least one plastic body 7b, wherein the first punched-out film element 4aa is attached to a first wall 16aa of the injection-molding cavity 16c and/or the second punched-out film element 4ab is attached to a second wall 16bb of the injection-molding cavity 16c, in particular wherein the second wall 16bb is arranged lying opposite the first wall 16aa;

e8 injection molding the first punched-out film element 4aa and/or the second punched-out film element 4ab with a plastic material to make a plastic component 1 comprising the at least one plastic body 7b in such a way that the first punched-out film element 4aa makes a first surface of the plastic component 1 and/or that the second punched-out film element 4ab makes a second surface of the plastic component 1, in particular wherein the first surface lies opposite the second surface;

e9 opening the injection-molding station 16 by moving the first mold half 16a and the second mold half 16b apart, in particular at the end of a cooling time of the at least one plastic body 7b comprised in the plastic component 1;

e10 removing the plastic component 1.

It is further possible for steps d and/or e to be carried out using an injection-molding station 17, wherein the injection-molding station 17 has a first mold half 17a comprising a first mold recess 170a and a second mold half 17b, wherein the first mold half 17a and/or the second mold half 17b has at least one injection duct 17d, wherein the first mold half 17a and the second mold half 17b, in particular in a closed state, make an injection-molding cavity 17c for molding at least one plastic body 7c, wherein steps d and/or e comprise one or more steps of the following further steps, in particular wherein the following further steps are carried out in the following sequence, preferably wherein the following further steps are carried out in a cyclic sequence:

e11 providing the one or more punched-out film elements 4a and/or at least one section of at least one decorative film 5b on the first mold half 17a and/or on the second mold half 17b in such a way that, when the first mold half 17a and second mold half 17b are closed, the one or more punched-out film elements 4a and/or the at least one decorative film 5b rest on an end face 17aa of the raised edge region 170b bordering the first mold recess 170a and surrounding the first mold recess 170a;

e12 closing the first mold half 17a and the second mold half 17b until, in the region of the end face 17aa of the raised edge region 170b between the first mold half 17a and the second mold half 17b, a gap is formed between the end face 17aa of the raised edge region 170b of the first mold half 17a and the corresponding end face 17bb of the second mold half 17b at least over a partial region, and the gap is sealed by the one or more punched-out film elements 4a squeezed in the region of the gap and/or the at least one interposed decorative film 5b squeezed in the region of the gap;

e13 injection molding a plastic material through the injection duct 17d into the injection-molding cavity 17c made by the closed first and second mold halves 17a, 17b, wherein the at least one decorative film 5b and/or the one or more film elements 4a are back-injection molded in the region enclosed by the raised edge region 170b with the plastic material, in particular without plastic material seeping through the sealed gap, wherein a plastic component 1 comprising the at least one plastic body 7c is made;

e14 opening the first and second mold halves 17a, 17b by moving the first and/or second mold halves 17a, 17b away from one another and removing the plastic component 1 comprising the at least one plastic body 7c from the injection-molding station 17;

e15 removing the remaining section of the at least one decorative film 5b and providing at least one further section of the at least one decorative film 5b.

Furthermore, it is possible for step e to be carried out using an injection-molding station 18, wherein the injection-molding station 18 has a first mold half 18a comprising a first mold recess 180a and a second mold half 18b comprising a second mold recess 180b, wherein the first mold half 18a is made movable and the second mold half 18b is made not movable, wherein step e comprises one or more steps of the following further steps, in particular wherein the following further steps are carried out in the following sequence, preferably wherein the following further steps are carried out in a cyclic sequence:

e16 inserting the one or more punched-out film elements 4a and/or at least one decorative film 5c into the first mold recess 180a of the first mold half 18a and fixing the one or more punched-out film elements 4a and/or the at least one decorative film 5c;

e17 inserting an in-mold labeling molded part 6 or IML molded part 6 into the second mold recess of the second mold half 18b and fixing the IML molded part 6, wherein the IML molded part 6 comprises an insert decorative ply 50b and a backing film 50c;

e18 closing the injection-molding station 18 by lowering the first mold half 18a onto the second mold half 18b, wherein an injection-molding cavity 18c for molding at least one plastic body 7d is made;

e19 injection molding a plastic material into the second mold recess 180b of the second mold half 18b, wherein the plastic material releases the IML molded part 6 from the second mold half 18b and presses it against the one or more punched-out film elements 4a and/or the at least one decorative film 5c in the first mold recess 180a of the first mold half 18a, wherein a plastic component 1 comprising the at least one plastic body 7d is made;

e20 opening the injection-molding station 18 by moving the first mold half 18a away from the second mold half 18b, in particular at the end of a cooling time of the at least one plastic body 7d comprised in the plastic component 1;

e21 removing the plastic component 1.

The radius of curvature of the plastic component 1 after step e is preferably smaller than 1000 mm, in particular smaller than 200 mm, further preferably smaller than 100 mm, at least in regions, and/or the stretching of the plastic component 1 after step e is greater than or equal to 1%, in particular greater than or equal to 20%, preferably greater than or equal to 50%, in particular preferably greater than or equal to 300%.

A device 10 for producing at least one plastic component 1, in particular for carrying out one method of the above methods, preferably has one or more stations of the following stations:

feed station 11, which is designed in such a way that the at least one feed station 11 provides at least one film 2 and provides at least one sensor film 3, wherein the at least one film 2 and/or the at least one sensor film 3 has at least one thermoplastic material or at least one thermoplastic polymer, applying station 12, which is designed in such a way that the at least one applying station 12 applies the at least one sensor film 3 to at least one first region of a surface of the at least one film 2, forming station 13, which is designed in such a way that the at least one forming station 13 forms the at least one film 2 comprising the at least one sensor film 3 to make at least one formed film body 4, punching station 14, which is designed in such a way that the at least one punching station 14 punches at least one film element 4a out of at least one second region of the at least one formed film body 4.

The at least one film 2 and/or the at least one sensor film 3 preferably has polycarbonate (PC) as at least one thermoplastic material or as at least one thermoplastic polymer.

The at least one sensor film 3 and/or the at least one film 2 further preferably has polyethylene terephthalate (PET) as at least one thermoplastic material or as at least one thermoplastic polymer.

The sensor film 3 preferably has one or more sensors, in particular one or more touch sensors and/or one or more displays or display devices.

The sensor film 3 preferably has one or more contact regions, in particular wherein one or more contact regions of the one or more contact regions are covered at least in regions by no film or layer, preferably wherein one or more contact regions of the one or more contact regions are arranged on a surface of the at least one sensor film of the sensor film 3 facing away from the film 2.

It is possible for the tensile strength of the film 2 to be at most the tensile strength of the sensor film 3 multiplied by a factor of 2/3 and/or for the thickness of the film 2 to be at least the thickness of the sensor film 3 multiplied by a factor of 1/2.

In particular, the film 2 is transparent, translucent or opaque at least in regions or over the whole surface and/or the sensor film 3 is transparent, translucent or opaque at least in regions.

It is possible for the sensor film 3 to be applied to the film 2 by means of hot lamination in at least one hot-laminating station and/or by means of hot lamination and/or by means of hot stamping and/or cold lamination and/or adhesive bonding, in particular cold bonding, in particular in at least one hot-stamping station and/or cold-laminating station and/or adhesive-bonding station.

It is possible for the device 10 to comprise one or more stations of the following further stations, in particular for making the sensor film 3:

feed station for providing at least one carrier substrate 30;

applying station for applying at least one electrically conductive layer 31 to the carrier substrate 30 in such a way that the at least one electrically conductive layer 31 makes an electrical functional structure in at least one functional region 32, wherein the at least one electrically conductive layer 31, in at least one contacting region 34, makes at least one contacting structure for contacting the electrical functional structure;

applying station for applying at least one adhesion-promoting layer 35, for applying the at least one sensor film 3 to the at least one film 2, in such a way that the adhesion-promoting layer 35, when observed perpendicular to a plane spanned by the at least one carrier substrate 30, does not cover the at least one contacting region 34 at least in regions or wherein the at least one adhesion-promoting layer 35, when observed perpendicular to a plane spanned by the at least one carrier substrate 30, is applied over the whole surface.

Furthermore, it is possible here for the at least one electrically conductive layer 31 to comprise at least one metal layer and/or a layer of ITO and/or AZO and/or PEDOT and/or conductive varnishes, in particular wherein the device 10 comprises one or more stations, preferably for carrying out one or more steps of the steps b4a, b4b and/or b5, of the following further stations:

applying station for applying the at least one electrically conductive layer;

structuring station for structuring the at least one electrically conductive layer by removing the at least one electrically conductive layer at least in regions;

applying station for applying the at least one electrically conductive layer in structured form.

It is possible for the film 2 and/or the sensor film 3 to have at least one decoration and/or at least one decorative film 5 at least in regions.

The forming station 13 and/or the device 10 for forming the at least one film 2 comprising the at least one sensor film 3 preferably has one or more of the following forming stations, in particular selected from: deep-drawing station, thermoforming station, High Pressure Forming station, injection-molding station.

It is possible for the film 2 and/or the sensor film 3 to be formed in the forming station 13 in such a way that the radius of curvature of the film 2 and/or of the sensor film 3 and/or of the formed film body 4 is smaller than 1000 mm, in particular smaller than 200 mm, further preferably smaller than 100 mm, at least in regions, and/or that the stretching of the film 2 and/or of the sensor film 3 is greater than or equal to 1%, in particular greater than or equal to 20%, preferably greater than or equal to 50%, in particular preferably greater than or equal to 300%.

FIG. 4 shows a formed film body 4, which has been formed in particular according to step c and comprises the film 2 shown in FIGS. 2 and 3 as formed film 2 and the sensor film 3 shown in FIGS. 2 and 3 as formed sensor film 3.

FIG. 5 shows the formed film body 4 shown in the in FIG. 4, out of which a film element 4a is punched, in particular according to step d, out of the formed film body 4 out of a second region 141, in particular wherein a punching tool 14a of a punching station 14 is used.

The device 10 preferably has at least one injection-molding station 15, which is designed in such a way that the at least one injection-molding station 15 back-injection molds the at least one punched-out film element 4a.

The at least one punching station 14 is preferably designed in such a way that the at least one punching station 14 introduces one or more holes or through punches into the one or more film elements 4a, in particular wherein one or more holes of the one or more holes have the function of an injection duct for a plastic material during the injection molding in the at least one injection-molding station 15.

Figure 6:
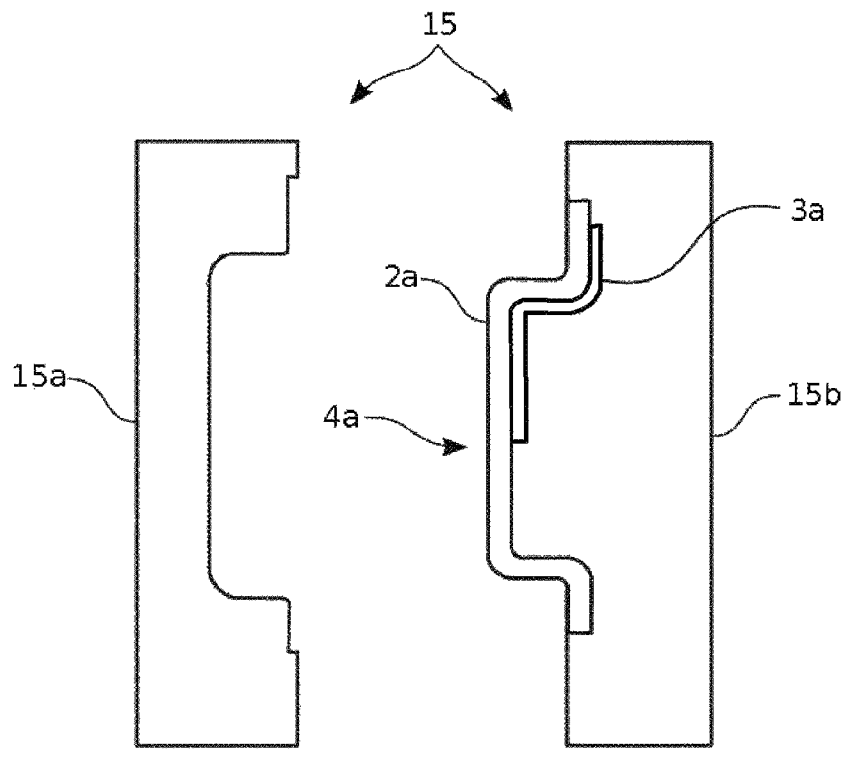

FIG. 6 shows the punched-out film body 4a shown in the in FIG. 5, which is located in a second mold half 15b of an injection-molding station 15. Further, the injection-molding station 15 comprises a first mold half 15a. A plastic body 7 is in the injection-molding station 15 according to step e.

Figure 8:
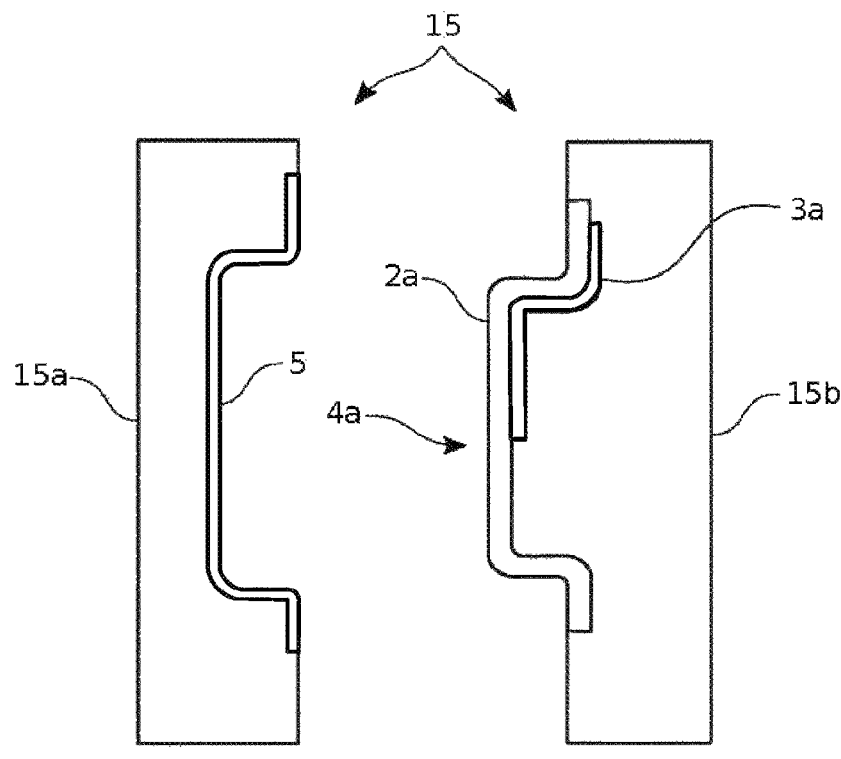

FIG. 8 shows the punched-out film body 4a shown in the in FIG. 5, which is located in a second mold half 15b of an injection-molding station 15. Further, the injection-molding station 15 comprises a first mold half 15a. A plastic body 7 is injection molded in the injection-molding station 15 according to step e.

It is possible for the device 10 to comprise one or more stations of the following further stations:

feed station for providing at least one decorative film 5a, which in particular has at least one opaque coating 50 at least partially;

processing station for introducing at least one decorative element of at least one decoration into the at least one decorative film 5a;

inserting station for inserting the one or more punched-out film elements 4a and the at least one decorative film 5a into an injection-molding station 15, wherein the injection-molding station 15 comprises a first mold half 15a and a second mold half 15b, wherein the first mold half 15a and the second mold half 15b, in particular in a closed state, make an injection-molding cavity 15c for molding at least one plastic body 7a, wherein the at least one punched-out film element 4a is attached to a first wall 15aa of the injection-molding cavity 15c and/or the at least one decorative film 5a is attached to a second wall 15bb of the injection-molding cavity 15c, in particular wherein the second wall 15bb is arranged lying opposite the first wall 15aa;

injection-molding station for injection molding the one or more punched-out film elements 4a and the at least one decorative film 5a with a plastic material to make a plastic component 1 comprising the at least one plastic body 7a in such a way that the one or more punched-out film elements 4a make a first surface of the plastic component 1 and the at least one decorative film 5a makes a second surface of the plastic component 1, in particular wherein the first surface lies opposite the second surface;

demolding station for removing the plastic component 1.

Further, it is possible for the device 10 to comprise the following further station:

processing station for inserting a first punched-out film element 4aa of the one or more punched-out film elements 4a and/or a second punched-out film element 4ab of the one or more punched-out film elements 4a into an injection-molding station.

Furthermore, it is possible for the device 10 to comprise the following further station:

injection-molding station 16 for injection molding the first punched-out film element 4aa and/or the second punched-out film element 4ab with a plastic material to make a plastic component 1 comprising the at least one plastic body 7b in such a way that the first punched-out film element 4aa a first surface of the plastic component 1 and/or that the second punched-out film element 4ab a second surface of the plastic component 1, wherein the injection-molding station 16 comprises a first mold half 16a and a second mold half 16b, wherein the first mold half 16a and the second mold half 16b, in particular in a closed state, make an injection-molding cavity 16c for molding at least one plastic body 7b, wherein the first punched-out film element 4aa is attached to a first wall 16aa of the injection-molding cavity 16c and/or the second punched-out film element 4ab is attached to a second wall 16bb of the injection-molding cavity 16c, in particular wherein the second wall 16bb is arranged lying opposite the first wall 16aa, in particular wherein the first surface lies opposite the second surface;

demolding station for removing the plastic component 1.

In particular it is possible for the device 10 to comprise one or more stations of the following further stations:

feed station for providing the one or more punched-out film elements 4a and/or at least one section of at least one decorative film 5b on the first mold half 17a and/or on the second mold half 17b in such a way that, when the first mold half 17a and second mold half 17b are closed, the one or more punched-out film elements 4a and/or the at least one decorative film 5b rest on an end face 17aa of the raised edge region 170b bordering the first mold recess 170a and surrounding the first mold recess 170a;

injection-molding station for injection molding a plastic material through the injection duct 17d into the injection-molding cavity 17c made by the closed first and second mold halves 17a, 17b, wherein the at least one decorative film 5b is back-injection molded in the region enclosed by the raised edge region 170b with the plastic material, in particular without plastic material seeping through the sealed gap, wherein a plastic component 1 comprising the at least one plastic body 7c is made, wherein the injection-molding station 17 has a first mold half 17a comprising a first mold recess 170a and a second mold half 17b, wherein the first mold half 17a and/or the second mold half 17b has at least one injection duct 17d, wherein the first mold half 17a and the second mold half 17b, in particular in a closed state, make an injection-molding cavity 17c for molding at least one plastic body 7c;

demolding station for removing the plastic component 1.

Further, it possible for the device 10 to comprise one or more stations of the following further stations:

inserting station for inserting the one or more punched-out film elements 4a and/or at least one decorative film 5c into a first mold recess 180a of a first mold half 18a of an injection-molding station 18 and for fixing the one or more punched-out film elements 4a and/or the at least one decorative film 5c;

further inserting station for inserting an in-mold labeling molded part 6 or IML molded part 6 into a second mold recess of a second mold half 18b of an injection-molding station 18 and fixing the IML molded part 6;

injection-molding station 18, which has a first mold half 18a comprising a first mold recess 180a and a second mold half 18b comprising a second mold recess 180b, wherein the first mold half 18a is made movable and the second mold half 18b is made not movable;

demolding station for removing the plastic component 1.

After being removed from the demolding station, the plastic component 1 preferably has a radius of curvature and/or a stretching, wherein the radius of curvature is smaller than 1000 mm, in particular smaller than 200 mm, further preferably smaller than 100 mm, at least in regions, and/or wherein the stretching is greater than or equal to 1%, in particular greater than or equal to 20%, preferably greater than or equal to 50%, in particular preferably greater than or equal to 300%.

Figure 7:
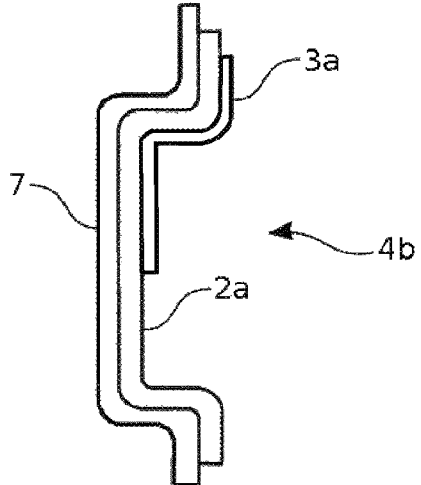

FIG. 7 shows a plastic component 1 in cross section, in particular produced according to one method of the above methods, preferably produced by one device of the above devices, wherein the plastic component 1 comprises a punched-out (see for example FIG. 4) and back-injection-molded (see for example FIG. 6 and/or FIG. 8) film element 4b comprising a formed film 2a and a formed sensor film 3a, wherein the at least one formed film 2a and/or the at least one formed sensor film 3a has at least one thermoplastic material or at least one thermoplastic polymer. Further, the plastic component 1 shown in FIG. 7 comprises a plastic body 7 on the surface facing away from the formed sensor film 3a, in particular wherein the plastic body 7 is made in method step e by injection molding in an injection-molding station.

The at least one formed film 2a and/or the at least one formed sensor film 3a preferably has polycarbonate (PC) as at least one thermoplastic material or as at least one thermoplastic polymer.

The at least one formed sensor film 3a and/or the at least one formed film 2a further preferably has polyethylene terephthalate (PET) as at least one thermoplastic material or as at least one thermoplastic polymer.

The plastic body 1 shown in FIG. 7 has, in particular in at least four regions, a radius of curvature smaller than 1000 mm, in particular smaller than 200 mm, further preferably smaller than 100 mm, and/or a stretching greater than or equal to 1%, in particular greater than or equal to 20%, preferably greater than or equal to 50%, in particular preferably greater than or equal to 300%.

The formed film 2a shown in FIG. 7 preferably has a thickness of from 250 μm to 3000 μm, in particular of from 300 μm to 2000 μm, and/or a tensile strength of between 20 MPa and 100 MPa, in particular between 20 MPa and 80 MPa.

The formed sensor film 3a shown in FIG. 7 further preferably has a thickness of from 25 μm to 150 μm, in particular of from 25 μm to 125 μm, and/or a tensile strength of between 150 MPa and 500 MPa, in particular between 200 MPa and 500 MPa.

The tensile strength of the formed film 2a shown in FIG. 7 is in particular at most the tensile strength of the formed sensor film 3a shown in FIG. 7 multiplied by a factor of 2/3. Further, the thickness of the formed film 2a shown in FIG. 7 is preferably at least the thickness of the formed sensor film 3a shown in FIG. 7 multiplied by a factor of 1/2.

In the embodiment represented, the thickness of the film 2 is greater than the thickness of the sensor film 3. In the embodiment represented, the thickness of the at least one film 2 in step a and/or b is at least the thickness of the at least one sensor film 3 in step a and/or b multiplied by a factor of approx. 3.

Figure 9:
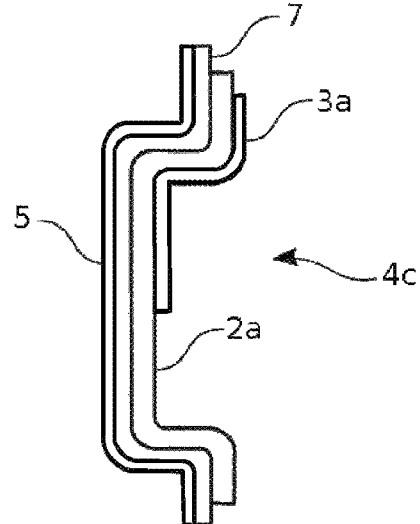

FIG. 9 shows the plastic component 1 shown in FIG. 7, except that the plastic component 1 comprising a film element 4c and which has a decorative film 5 on the surface of the plastic body 7 facing away from the formed sensor film 3a.

It is possible for the plastic component 1 and/or the formed film 2a and/or the formed sensor film 3a to have at least one decoration and/or at least one decorative film 5 in regions.

LIST OF REFERENCE NUMBERS 1 plastic component
2 film

2*a* formed film
3 sensor film
30 carrier substrate
31 electrically conductive layer
32 functional region
34 contacting region
35 adhesion-promoting layer
3*a* formed film
4 formed film body
4*a* punched-out film element
4*b* punched-out and back-injection-molded film element
4*c* punched-out, back-injection-molded and decorated film
element
5, 5*a*, 5*b*, 5*c* decorative film
50*a* opaque coating
50*b* insert decorative ply
50*c* backing film
6 in-mold labeling or IMD molded part
7, 7*a*, 7*b*, 7*c*, 7*d* plastic body
10 device
11 feed station
12 applying station
13 forming station
14 punching station
14*a* punching tool
141 punching region
15, 16, 17, 18 injection-molding station
15*a*, 16*a*, 17*a*, 18*a* first mold half
15*b*, 16*b*, 17*b*, 18*b* second mold half
15*c*, 16*c*, 17*c*, 18*d* injection-molding cavity
15*aa* first wall
15*bb* second wall
17*aa*, 17*bb* end face
17*d* injection duct
170*a*, 180*a* first mold recess
170*b* edge region
180*b* second mold recess
a, b, c, d, e method steps
b1, b2, b3, b4*a*, b4*b*, b5 method steps
e1, e2, e3, e4, e5, e6 method steps
e7, e8, e9, e10, e11 method steps
e12, e13, e14, e15 method steps
e16, e17, e18, e19 method steps
e20, e21 method steps

The invention claimed is:

1. A plastic component wherein the plastic component comprises:

a film element; and a plastic body back-injection molded to the film element, wherein the film element comprises at least one formed film and at least one formed sensor film punched-out together from a formed film body, the at least one formed sensor film comprising an electrically conductive component, and wherein the at least one formed film or the at least one formed sensor film has at least one thermoplastic material or at least one thermoplastic polymer, and wherein the stretching of the plastic component is greater than or equal to 1%, and wherein the at least one formed sensor film has polyethylene terephthalate as the at least one thermoplastic material or as at least one thermoplastic polymer, and wherein the tensile strength of the at least one formed film is at most the tensile strength of the at least one formed sensor film multiplied by a factor of 2/3, and wherein the thickness of the at least one formed film is at least the thickness of the at least one formed sensor film multiplied by a factor of 1/2, and wherein the plastic component has a sub-region defined by a first bend and a second bend, the first bend having a first radius of curvature with respect to a first center of curvature and the second bend having a second radius of curvature with respect to a second center of curvature, the first center of curvature and the second center of curvature being disposed on opposites of the plastic film component whereby the first bend and the second bend bend in opposite directions, and wherein the at least one formed sensor film is disposed in the sub-region of the plastic component defined by the first bend and the second bend, and wherein at least one of the first radius of curvature and the second radius of curvature of the plastic component is smaller than 1000 mm.

2. The plastic component according to claim 1, wherein the at least one formed film has polycarbonate as the at least one thermoplastic material or at least one thermoplastic polymer.

3. The plastic according to claim 1, wherein the at least one formed film has a thickness of from 250 μm to 3000 μm.

4. The plastic component according to claim 1, wherein the at least one formed sensor film has a thickness of from 25 μm to 150 μm.

5. The plastic component according to claim 1, wherein the thickness of the at least one formed film is at least the thickness of the at least one formed sensor film multiplied by a factor of 2, 3, 4 or 5.

6. The plastic component according to claim 1, wherein the at least one formed film has a tensile strength of between 20 MPa and 100 MPa.

7. The plastic component according to claim 1, wherein the at least one formed sensor film has a tensile strength of between 150 MPa and 500 MPa.

8. The plastic component according to claim 1, wherein the plastic component or the at least one formed film or the at least one formed sensor film has at least one decoration and at least one decorative film in regions.

9. The plastic component according to claim 1, wherein the at least one formed sensor film comprises a touch sensor.

* * * * *